United States Patent [19]
Yokoi et al.

[11] Patent Number: 5,973,656
[45] Date of Patent: Oct. 26, 1999

[54] IMAGE DISPLAY DEVICE

[75] Inventors: Gunpei Yokoi; Yoshinobu Mantani, both of Kyoto, Japan

[73] Assignee: Nintendo Co., Ltd., Kyoto-fu, Japan

[21] Appl. No.: 08/678,066

[22] Filed: Jul. 10, 1996

[30] Foreign Application Priority Data

Jul. 13, 1995 [JP] Japan ................................. 7-177510

[51] Int. Cl.$^6$ .............................. G09G 3/32; G09G 5/00; A63F 9/24
[52] U.S. Cl. .................................. 345/82; 345/7; 463/34; 463/44; 463/45
[58] Field of Search .............................. 345/3–8; 463/34, 463/44, 45

[56] References Cited

U.S. PATENT DOCUMENTS

| | | |
|---|---|---|
| 4,902,083 | 2/1990 | Wells . |
| 4,934,773 | 6/1990 | Becker . |
| 5,003,300 | 3/1991 | Wells . |
| 5,552,799 | 9/1996 | Hashiguchi .................................. 345/3 |
| 5,683,297 | 11/1997 | Raviv et al. .............................. 463/44 |
| 5,808,591 | 9/1998 | Mantani .................................... 345/82 |

FOREIGN PATENT DOCUMENTS

| | | |
|---|---|---|
| 63-127777 | 5/1988 | Japan . |
| 63-314990 | 12/1988 | Japan . |
| 01206798 | 8/1989 | Japan . |
| 2042476 | 2/1990 | Japan . |
| 2063379 | 3/1990 | Japan . |
| 04035491 | 2/1992 | Japan . |
| 06023149 | 2/1994 | Japan . |
| 06038246 | 2/1994 | Japan . |
| 06068238 | 3/1994 | Japan . |

OTHER PUBLICATIONS

"The Private Eye" by Reflection Technology, Waltham, MA 02154. (Untitled).

*Primary Examiner*—Bipin H. Shalwala
*Assistant Examiner*—David L Lewis
*Attorney, Agent, or Firm*—Nixon & Vanderhye P.C.

[57] ABSTRACT

LED arrays where a plurality of LEDs are vertically arranged are lit up in luminance corresponding to tone values on digital image data. Light beams in line emitted from the LED arrays are scanned in a horizontal direction to display a two-dimensional image. Clocks A, B, C are selectively gated according to the tone values D0, D1 on the digital image data to generate a drive pulse for driving each of the LEDs on the LED arrays. Each LED thus emits light in luminance corresponding to the tone value on the digital image data. Pulse widths of the clocks A, B, C are changed by one screen. Luminance of each light emitting element corresponding to the tone data on the digital image data is thus changed to increase the substantially representable number of tones.

11 Claims, 49 Drawing Sheets

FIG. 5

PROGRAM MEMORY 41

| |
|---|
| GAME PROGRAM — 411 |
| BG MAP — 412 |
| CHARACTER DATA — 413 |
| WORLD ATTRIBUTES — 414 |
| OBJ ATTRIBUTES — 415 |
| COLUMN TABLE — 416 |
| PARAMETERS — 417 |
| SHUT DOWN PROGRAM — 418 |
| OTHERS — 419 |

FIG. 6

BACK-UP MEMORY 42

| |
|---|
| GAME DATA AT SAVE POINT (VARIOUS VALUES INDICATING STATE OF GAME) |

WORK MEMORY 222

IMAGE WORK MEMORY 225

FIG. 15

| | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|
| 1 | JLON | JRON | | | | | | JX(−7 << 383) | | | | | | | | | |
| 2 | | | | | | | | JP(−256 << 255) | | | | | | | | | |
| 3 | | | | | | | | JY(−7 << 223) | | | | | | | | | |
| 4 | JPLTS | | | JHFLP | JVFLP | 0 | | JCA(11BITS = 2048) | | | | | | | | | |

FIG. 17

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | LON | RON | BGM | | SCX | | SCY | | OVER | END | 0 | 0 | BGMAP BASE | | | |
| 1 | GX (0 << 383) | | | | | | | | | | | | | | | |
| 2 | GP (-256 << 255) | | | | | | | | | | | | | | | |
| 3 | GY (0 << 223) | | | | | | | | | | | | | | | |
| 4 | MX (0 << 4095) | | | | | | | | | | | | | | | |
| 5 | MP (-256 << 255) | | | | | | | | | | | | | | | |
| 6 | MY (0 << 4095) | | | | | | | | | | | | | | | |
| 7 | W | | | | | | | | | | | | | | | |
| 8 | II | | | | | | | | | | | | | | | |
| 9 | PARAM_BASE | | | | | | | | | | | 0 | 0 | 0 | 0 | 0 |
| 10 | OVERPLANE_CHARACTER | | | | | | | | | | | | | | | |
| 11 | WRITING FORBIDDEN | | | | | | | | | | | | | | | |
| 12 | WRITING FORBIDDEN | | | | | | | | | | | | | | | |
| 13 | WRITING FORBIDDEN | | | | | | | | | | | | | | | |
| 14 | WRITING FORBIDDEN | | | | | | | | | | | | | | | |
| 15 | WRITING FORBIDDEN | | | | | | | | | | | | | | | |

FIG. 18
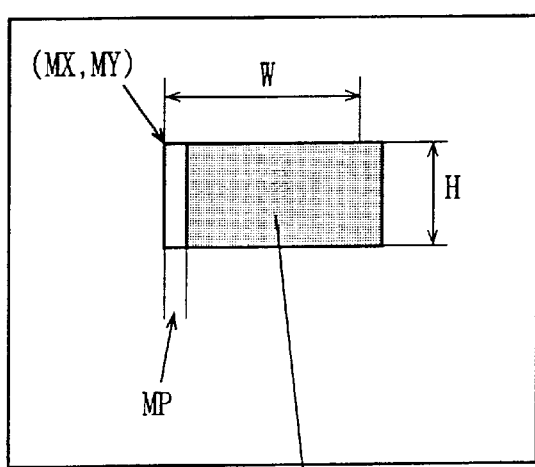
BG MAP
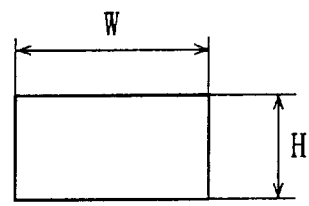
AREA TO BE DISPLAYED ON SCREEN
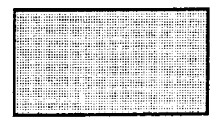
AREA ACTUALLY CUT OUT FROM BG MAP, SHIFTED BY PARALLAX AMOUNT MP
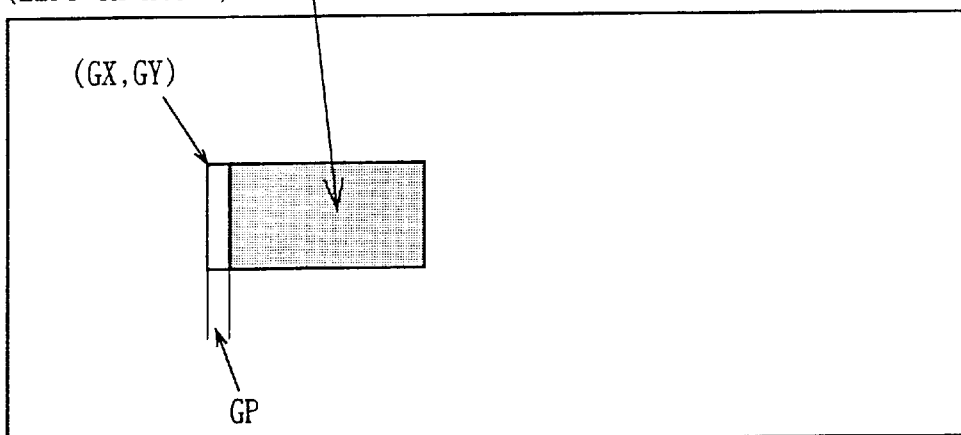
DISPLAYED IMAGE (LEFT OR RIGHT)

DOT PATTERN  OBJ ATTRIBUTES

No. 20

J X = 8
J Y = 4
J P = 0
J L O N = 1
J R O N = 1
J C A = 2 0

No. 8

J X = 1 6
J Y = 4
J P = 0
J L O N = 1
J R O N = 1
J C A = 8

No. 1 0

J X = 8
J Y = 1 2
J P = 0
J L O N = 1
J R O N = 1
J C A = 1 0

No. 1 0 2 3

J X = 1 6
J Y = 1 2
J P = 0
J L O N = 1
J R O N = 1
J C A = 1 0 2 3

|  | DOT PATTERN | OBJ ATTRIBUTES |
|---|---|---|
| FIG. 21(a) | 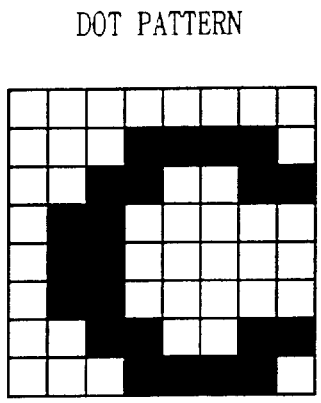 | JX = 8<br>JY = 4<br>JP = −1<br>JLON = 1<br>JRON = 1<br>JCA = 20 |
| FIG. 21(b) | 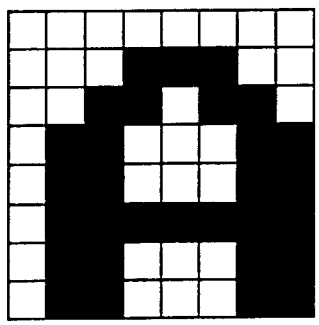 | JX = 20<br>JY = 4<br>JP = 0<br>JLON = 1<br>JRON = 1<br>JCA = 8 |
| FIG. 21(c) | 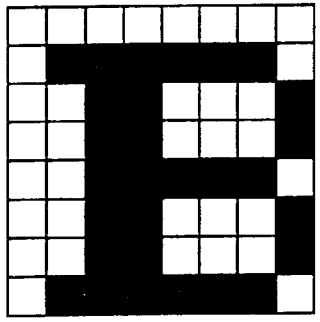 | JX = 8<br>JY = 18<br>JP = 1<br>JLON = 1<br>JRON = 1<br>JCA = 10 |
| FIG. 21(d) | 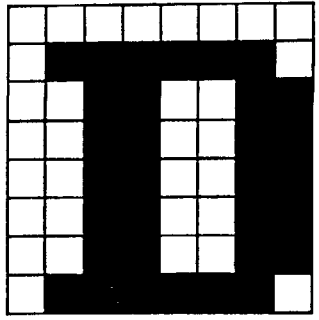 | JX = 20<br>JY = 18<br>JP = 2<br>JLON = 1<br>JRON = 1<br>JCA = 1023 |

DISPLAY PICTURE COORDINATES FOR LEFT EYE

DISPLAY PICTURE COORDINATES FOR RIGHT EYE

F I G. 25
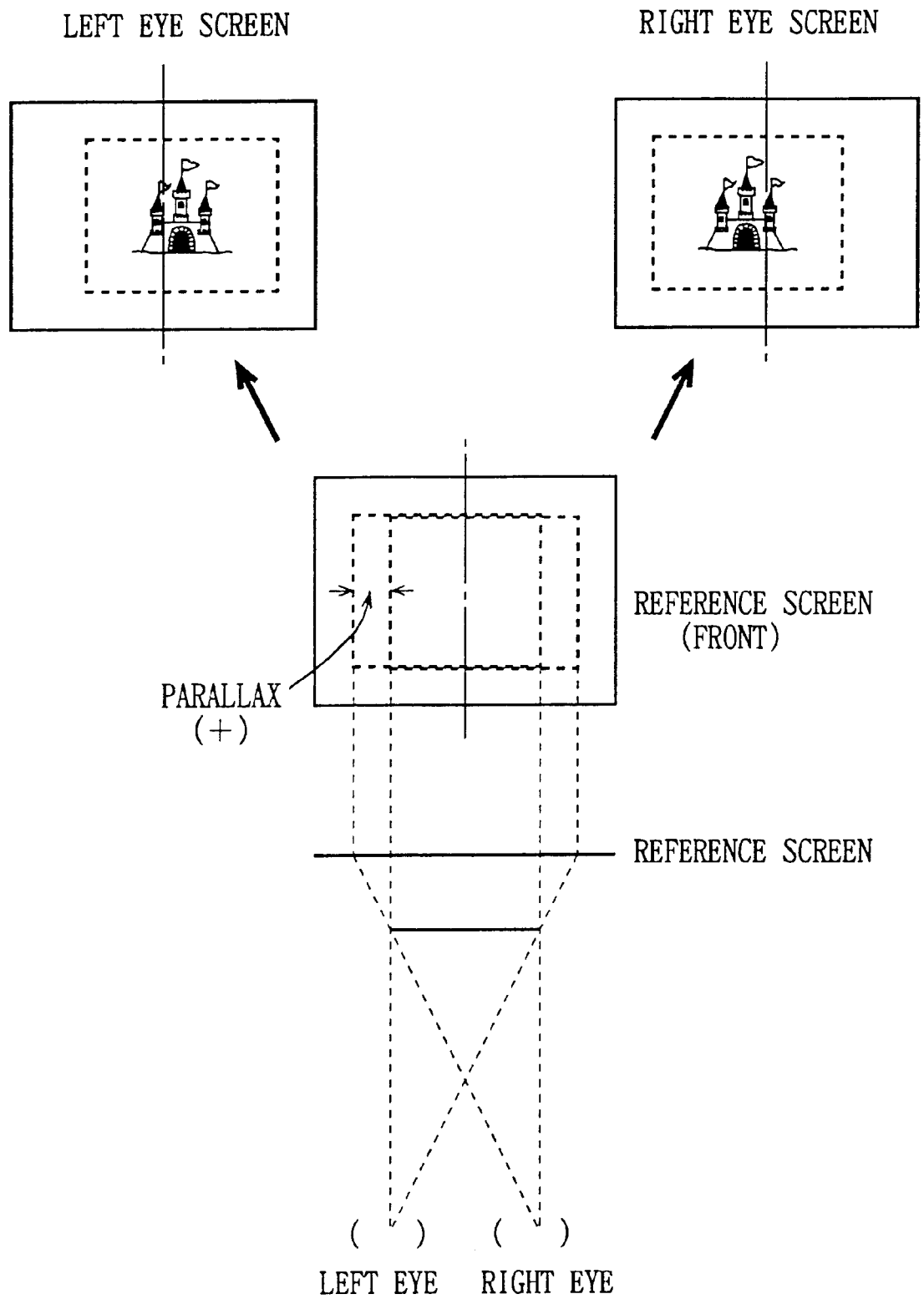

PICTURE DRAWING WORK OF NORMAL BG

PICTURE DRAWING WORK OF H-BIAS BG

PICTURE DRAWING WORK OF AFFINE BG

WIDTH OF FLAG 73   74

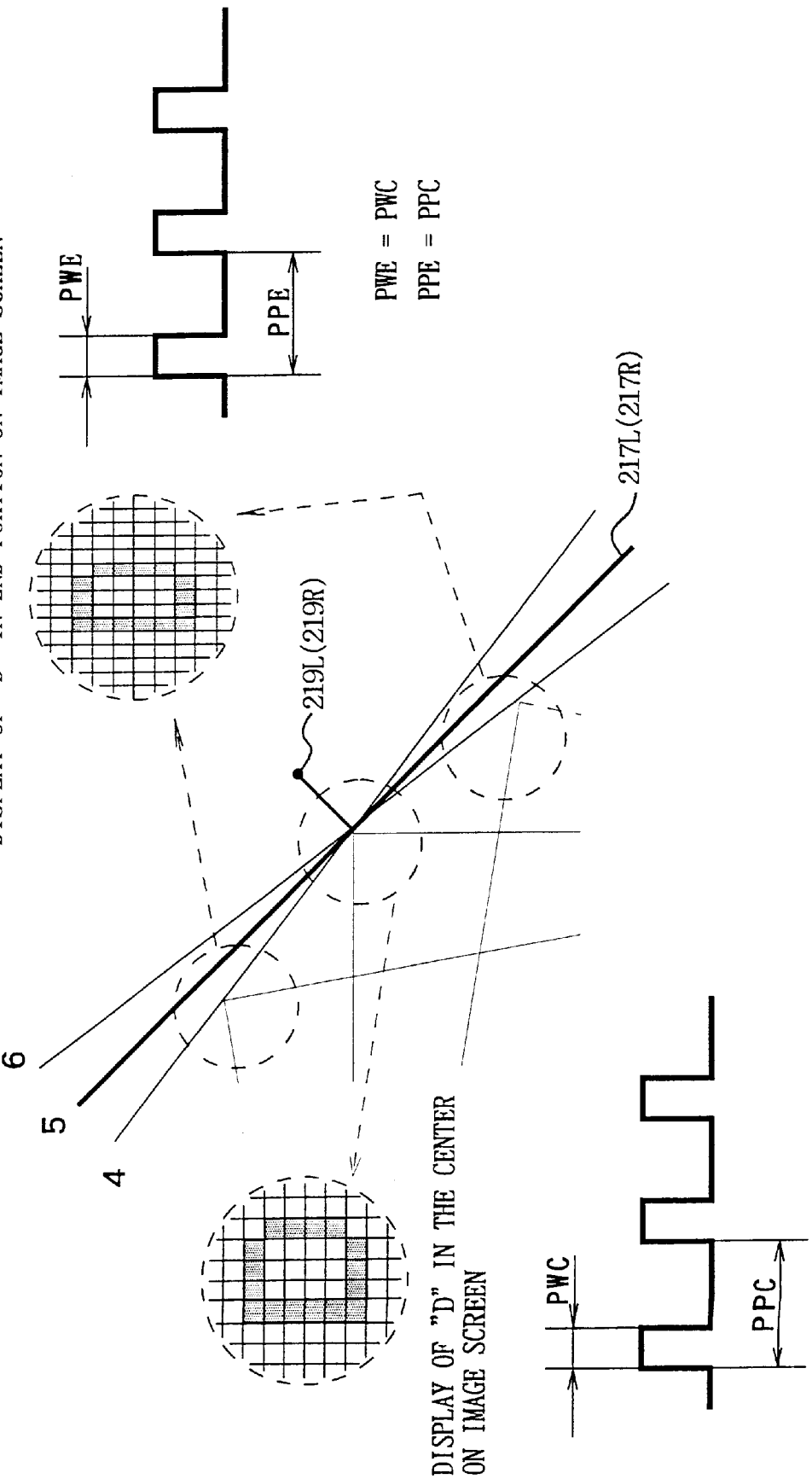

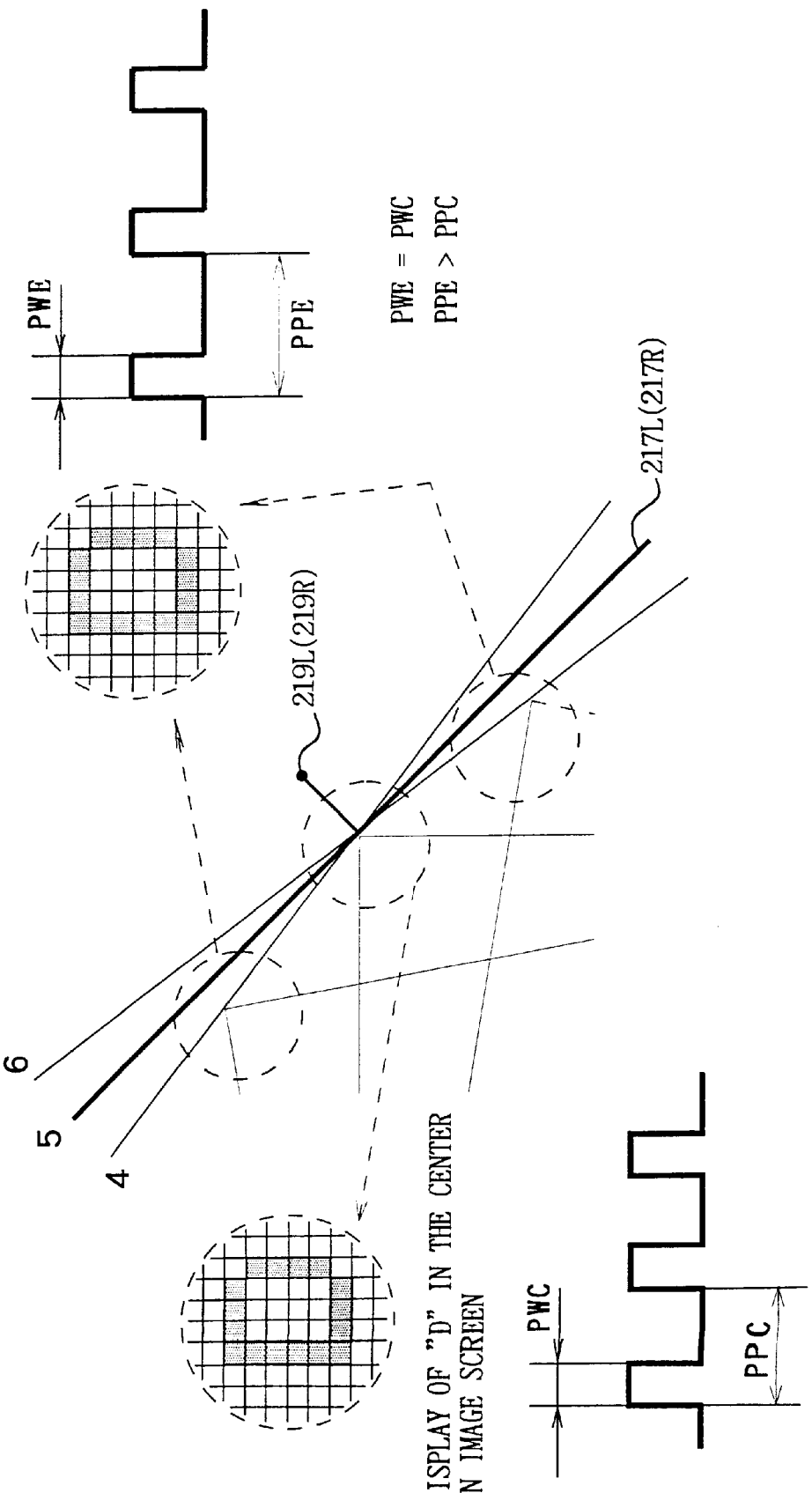

| D1 | D0 | STATE OF LIGHTING OF LED |
|----|----|--------------------------|
| 0 | 0 | BLACK (LED DOES NOT LIGHT UP) |
| 0 | 1 | LED LIGHTING WITH CLKA WIDTH |
| 1 | 0 | LED LIGHTING WITH CLKB WIDTH |
| 1 | 1 | LED LIGHTING WITH CLKA + CLKB + CLKC WIDTH |

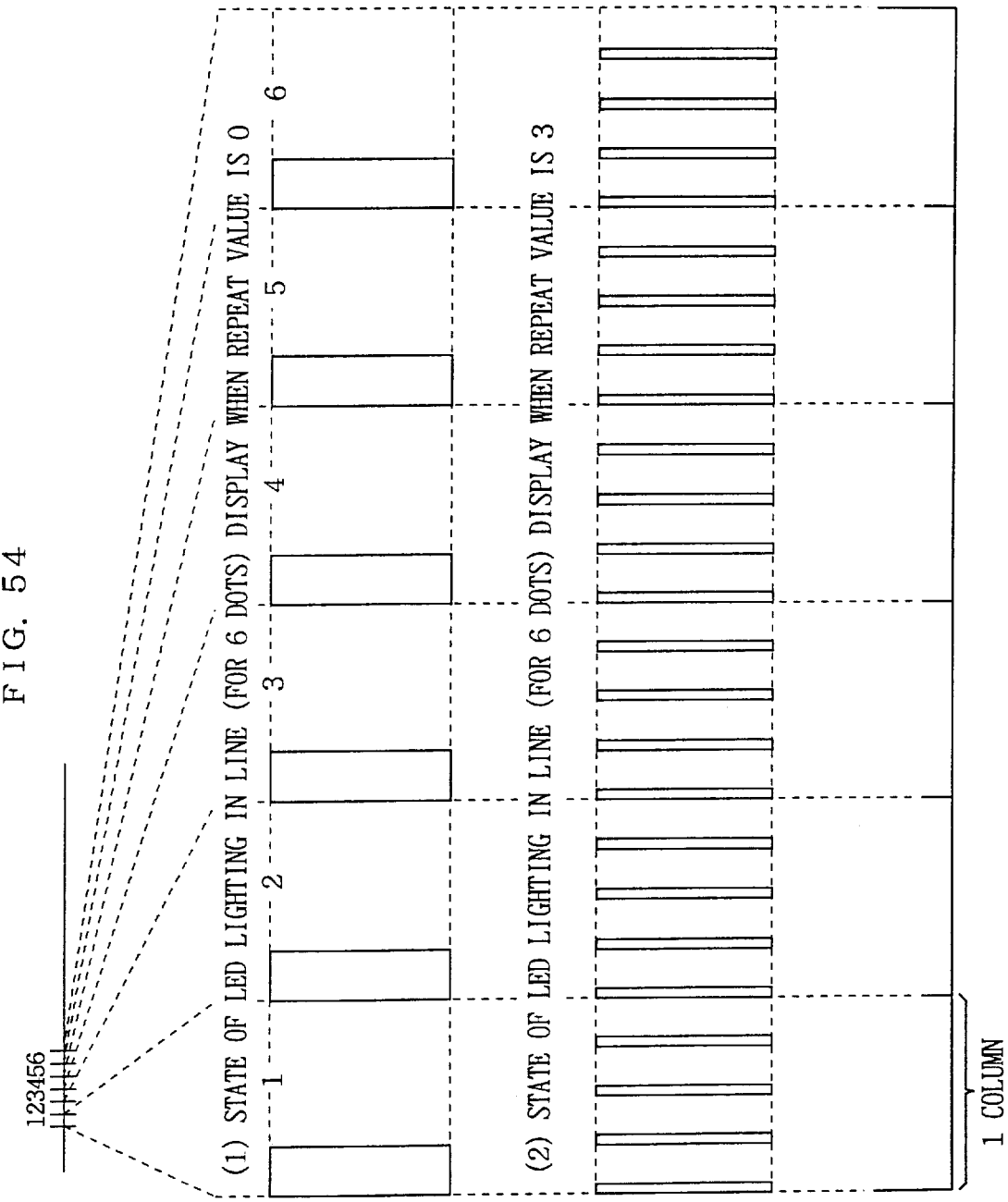

IMAGE DISPLAY DEVICE

CROSS REFERENCE TO RELATED APPLICATIONS

The present application is related to application Ser. No. 08/554,888, filed Nov. 9, 1995 for IMAGE DISPLAY DEVICE, IMAGE DISPLAY SYSTEM, AND PROGRAM CARTRIDGE USED THEREWITH; application Ser. No. 08/555,828, filed Nov. 9, 1995 for STEREOSCOPIC IMAGE DISPLAY DEVICE AND STORAGE DEVICE USED THEREWITH; and application Ser. No. 08/555,748, filed Nov. 9, 1995 for IMAGE DISPLAY DEVICE, IMAGE DISPLAY SYSTEM, AND PROGRAM CARTRIDGE USED THEREWITH.

BACKGROUND OF THE INVENTION

1. Field of the Invention

The present invention relates to an image display device, and more particularly to an image display device for displaying a two-dimensional image on the basis of digital image data.

2. Description of the Background Art

In a conventional information processing device generating a picture signal by digital control such as a personal computer or an electronic game device, the number of tones that may be represented in one screen is determined by the number of bits (N) of luminance data included with the image data. Specifically, since the number of tones the conventional information processing device can represent is $2^N$, more tones cannot be displayed in one screen.

In the above conventional information processing device, the number of bits of the luminance data for each pixel (or dot) has to be increased in order to increase the representable number of tones, resulting in massive amounts of data as a whole. Furthermore, a bus line and a circuit block in the device must be changed to accomodate the data with additional numbers of bits in the image data.

SUMMARY OF THE INVENTION

Accordingly, it is an object of the present invention to provide an image display device which can easily increase the number of tones without adding massive amounts of data or requiring substantial changes to a circuit, thereby allowing expressive image representation.

The preferred embodiment of the present invention has the following characteristics to attain the above object.

In accordance with the present invention, an image display device is provided for displaying an image on the basis of digital image data. The image display device preferably includes a plurality of light emitting elements arranged in a regular manner and a lighting time control portion which provides a lighting time for each of the light emitting elements according to tone values included in the digital image data. A lighting time changing portion acts on the lighting time control portion and changes the lighting time of each of the light emitting elements in accordance with each of the tone values in the digital image data.

In the preferred embodiment, the lighting time control portion controls each of the light emitting elements according to the tone values in the digital image data. Each of the light emitting elements thus emits light in luminance corresponding to the tone value in the digital image data. At this time, the lighting time changing portion acts on the lighting time control portion to change the lighting time of each light emitting elements. The luminance of each of the light emitting elements corresponding to the tone value on the digital image data is thus changed to increase the substantially representable number of tones. That is to say, in the preferred embodiment, since the lighting time of each of the light emitting elements corresponding to each tone value on the digital image data can be freely changed, the substantially representable number of tones increases and various image representations can be achieved.

In one embodiment, the image display device also includes a lighting number of times control portion controlling the lighting number of times that each of the light emitting elements displays one dot, and a tone for one dot is decided on the basis of combination of the lighting time for each of the light emitting elements (controlled by the lighting time control portion and lighting time changing portion) and the lighting number of times for each of the light emitting elements (controlled by the lighting number of times control portion). In this structure, since the lighting number of times that each of the light emitting elements displays one dot can be changed separately from the tone value on the digital image data, the substantially representable number of tones can be further increased and various image representations can be achieved. Furthermore, by increasing the lighting number of times when each of the light emitting elements displays one dot, a hard image quality can be changed to a soft image quality, thereby also allowing various image representations in image quality.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram showing a memory map of a program memory 41 in FIG. 2;

FIG. 6 is a diagram showing a memory map of a backup memory 42 in FIG. 2;

FIG. 15 is a diagram showing an example of a data format for the OBJ attributes;

FIG. 17 is a diagram showing an example of data format of world attributes;

FIG. 18 is a diagram showing the relation between a position at which a BG is cut out developed on the BG map and a position at which the BG is displayed developed on the display screen, according to the world attributes;

FIGS. 21(a) to 21(d) are diagrams showing examples of character blocks prepared to display a plurality of OBJs with parallax to each other;

FIG. 25 is a diagram showing a BG displayed on the left and right screens when there is positive (+) parallax on the screen;

FIG. 40 is a diagram showing a letter "D" displayed in the center and in the end part on the image screen before correction;

FIG. 41 is a diagram showing a letter "D" displayed in the center and in the end part on the image screen after correction;

FIG. 54 is a diagram comparing the state of display with one-time LED lighting when the repeat value is set to 0 with the state of display with four-time LED lighting when the repeat value is set to 3;

DESCRIPTION OF THE PREFERRED EMBODIMENTS

Humans can see two pictures with parallax separately with the left and right eyes, and then fuse the two pictures in the brain to perceive depth. An electronic game device of an embodiment described hereinafter is configured to display stereoscopic images to an observer by utilizing the image fusion action.

Generally speaking, a display screen for the game includes two general types of components. The first type of components includes displayed objects having relatively large display areas and which do not move incrementally on the screen, such as mountains, rivers, forests, sky, buildings, etc. The second type of components include displayed objects having relatively small display areas and which move incrementally and rapidly on the screen, such as a hero, enemies, bullets, missiles, etcetera. In the electronic game device of the embodiment described hereinafter, displayed objects which belong to the first type of components are called backgrounds (hereinafter referred to as BG), and displayed objects which belong to the second components are called objects (hereinafter referred to as OBJ).

Figure 1:
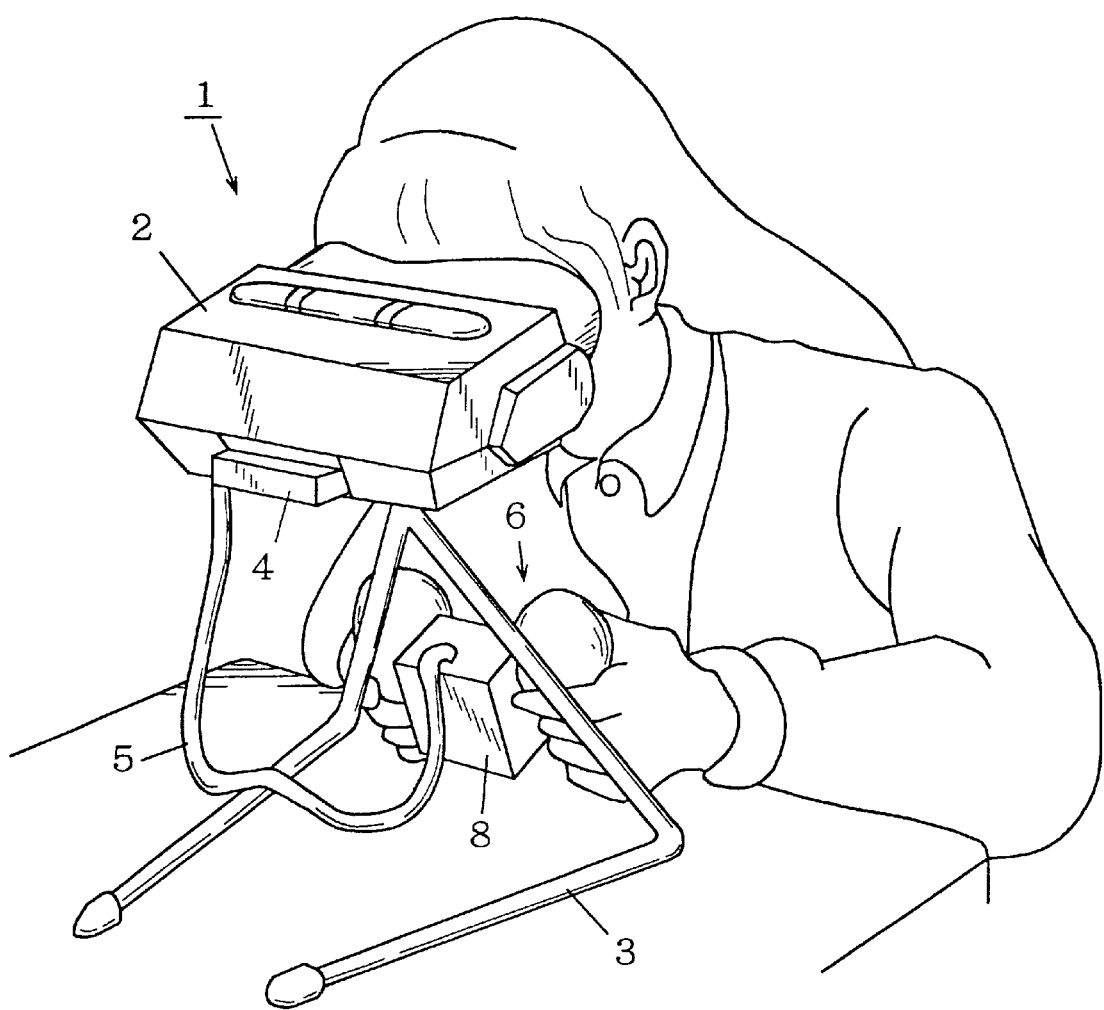
FIG. 1 is a perspective view showing an electronic game device in use according to an embodiment of the present invention.
Figure 2:
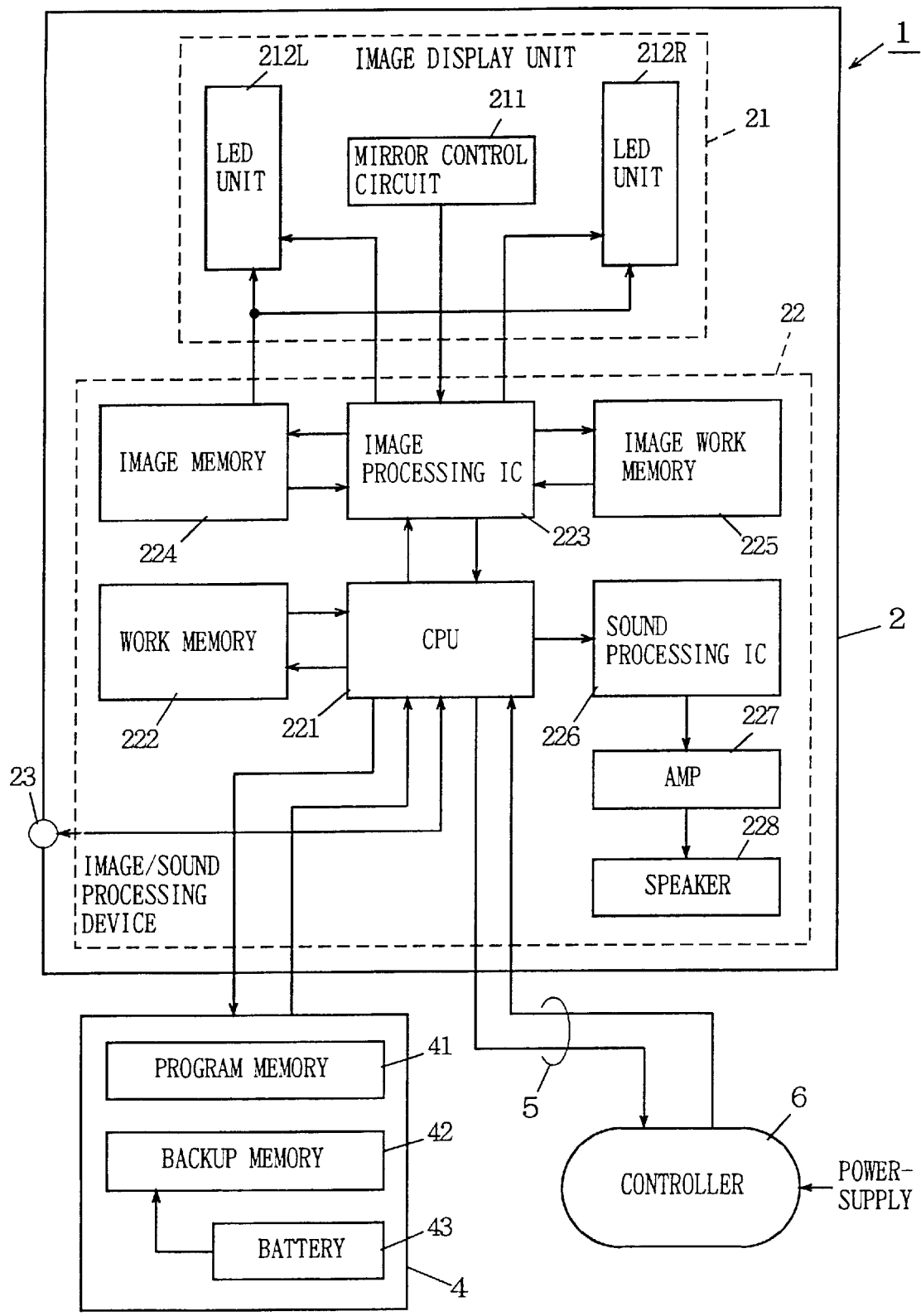
FIG. 2 is a block diagram showing the circuit structure of the electronic game device according to one embodiment of the present invention.

FIG. 1 is a perspective view showing an electronic game device in use according to one embodiment of the present invention. FIG. 2 is a block diagram showing the circuit structure of the electronic game device shown in FIG. 1. Referring to FIG. 1 and FIG. 2, the structure of this embodiment will be described below.

An electronic game device 1 includes a body unit 2, a support stand 3 coupled to the bottom of the body unit 2, a program cartridge 4 detachably connected to the body unit 2, and a controller 6 connected to the body unit 2 through a cord 5. The body unit 2 is supported on a desk or the like by the support stand 3. A player looks into the supported body unit 2 to see a game display.

Figure 3:
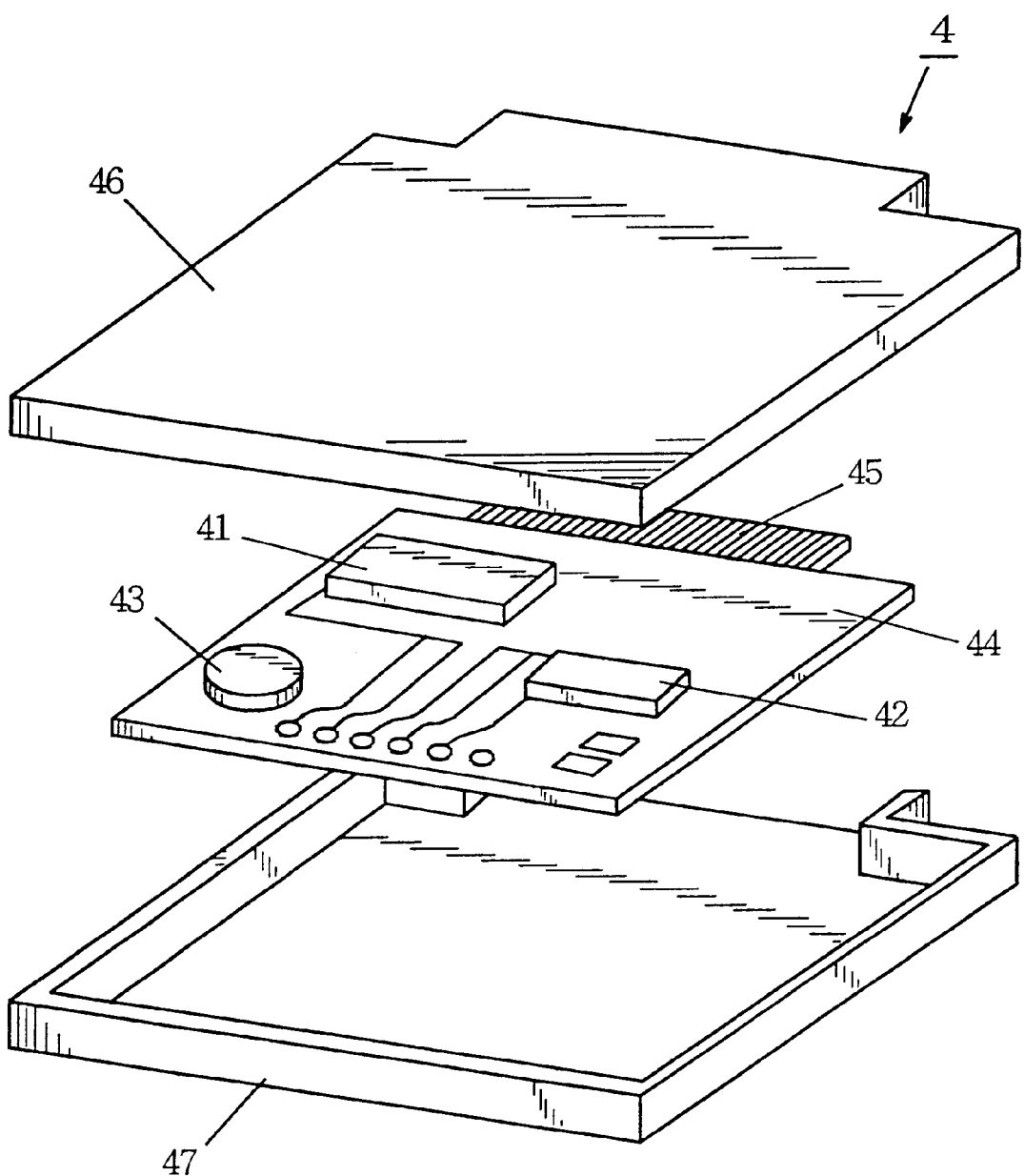
FIG. 3 is an exploded perspective view showing an example of the structure of the program cartridge 4 in FIG. 1.

The program cartridge 4 includes a program memory 41 formed of a non-volatile storage medium, such as ROM or CD-ROM, a backup memory 42 formed of a rewritable storage element, such as RAM, and a battery 43 such as a lithium battery or the like. As shown in FIG. 3, the program memory 41, the back-up memory 42 and the battery 43 are packaged on a substrate 44 having a terminal 45, for example. The substrate 44 is accommodated in a case formed of an upper housing 46 and a lower housing 47.

Preferably, the controller 6 is equipped with a battery pack 8 which is attachable and detachable. This battery pack 8 has a battery accommodated therein for spontaneously supplying driving power to the body unit 2. Accordingly, the electronic game device of this embodiment can be used in places where no commercial power is supplied (outdoors, on vehicles, etc.) An AC adapter or the like may be attached to the controller 6 to supply external commercial power to the body unit 2 when battery power is not used.

The body unit 2 includes an image display unit 21, an image/sound processing device 22, and a transfer port 23. The image/sound processing device 22 includes a CPU 221, a work memory 222, an image processing IC 223, an image memory 224, an image work memory 225, a sound processing IC 226, an amplifier 227 and a speaker 228. The CPU 221 executes a game program stored in the program memory 41 of the program cartridge 4. The transfer port 23 is connected to the CPU 221.

Figure 4:
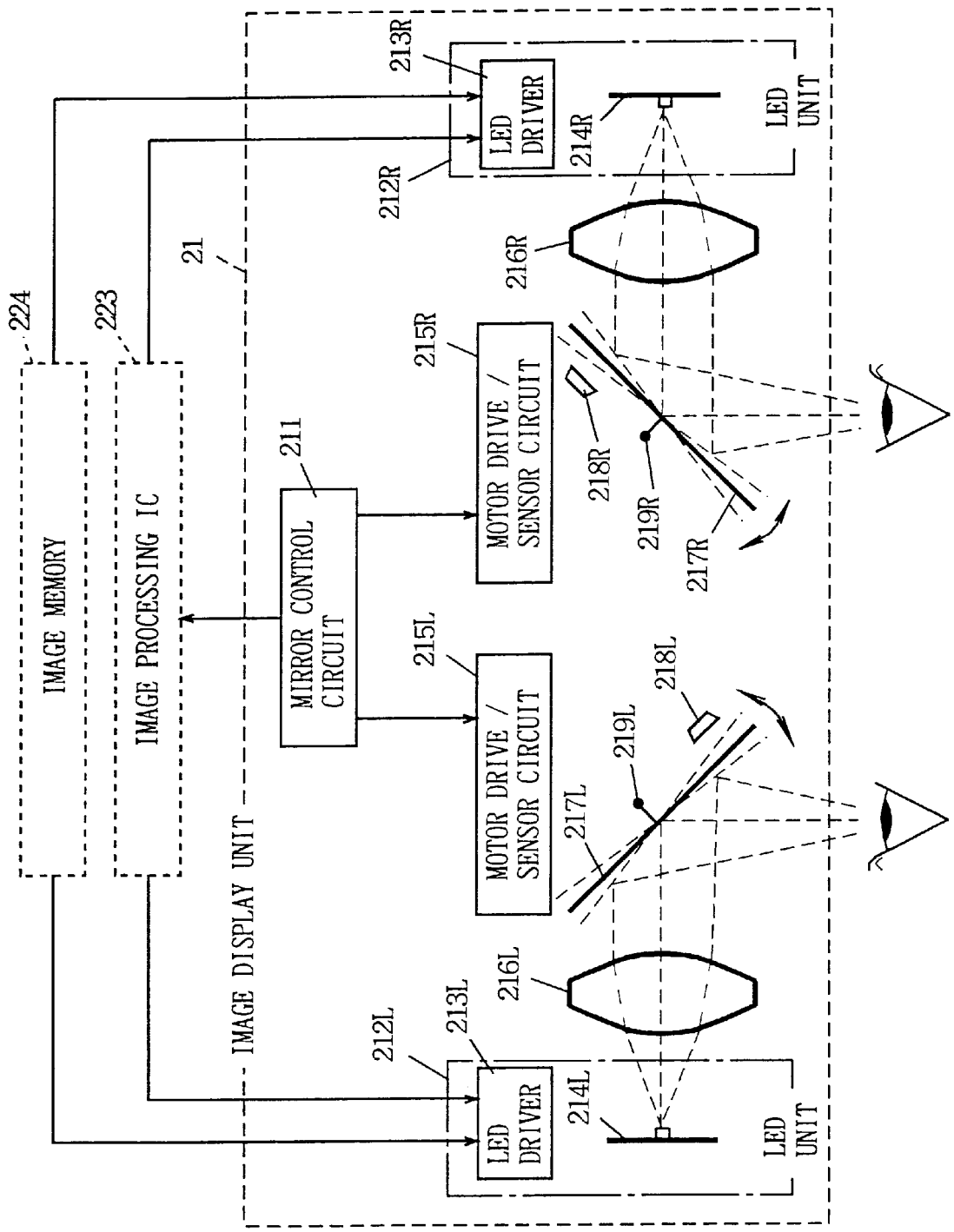
FIG. 4 is a diagram showing more detailed structure of the image display unit 21 in FIG. 2.

The image display unit 21 generally includes a mirror control circuit 211 and a pair of LED (light emitting diode) units 212L and 212R on the left and right. More detailed structure of the image display unit 21 is shown in FIG. 4. As shown in FIG. 4, the image display unit 21 further includes a pair of, left and right, motor drive/sensor circuits 215L and 215R, a pair of, left and right, lens systems 216L and 216R, a pair of, left and right, mirrors 217L and 217R, and a pair of, left and right, voice coil motors 218L and 218R. The LED units 212L and 212R include LED drivers 213L and 213R and LED arrays 214L and 214R, respectively.

The image display unit 21 displays one picture with 384 dots in the X-axis direction (in the horizontal direction with respect to the visual field) and 224 dots in the Y-axis direction (in the vertical direction with respect to the visual field). Accordingly, the LED arrays 214L and 214R are formed of 224 LEDs placed in a row in the Y-axis direction, respectively. Light beams in columns emitted from the LED arrays 214L and 214R impinge upon the mirrors 217L and 217R through the lens systems 216L and 216R, respectively, and are reflected by the mirrors 217L and 217R, and then enter the left and right eyes of the player. The mirror control circuit 211 drives the voice coil motors 218L and 218R, using the motor drive/sensor circuits 215L and 215R. Thus, the mirrors 217L and 217R pivotally reciprocate with a certain period about the supporting points 219L and 219R. As a result, the light beam in columns emitted from each LED array is scanned in the horizontal direction, respectively. The image processing IC 223 transfers image data for 384 columns from the image memory 224 to the LED driver 213L or 213R while the mirror 217L or 217R turns once. Accordingly, the player recognizes an image formed of 384 (transverse)×224 (vertical) dots due to the after image phenomenon.

FIG. 5 is a diagram schematically showing the structure of the program memory 41 in FIG. 2. In FIG. 5, the program memory 41 includes areas 411–419. The area 411 stores a game program. BG maps are stored in the area 412. In the BG maps, data for character codes (codes corresponding to character data shown below) for BG (background) display are described. A plurality (tens of thousands, for example) of character data are stored in the area 413. Each character data is 8×8 dot bit map data, and all BG's and OBJ's (objects) are represented by combining the character data. One dot is represented with 2 bits to represent 4-gradation display. World attributes are stored in the area 414. As will be described later, the electronic game device of this embodiment forms one image by superposing 32 planes of worlds on the maximum. The world attributes are attribute information necessary to draw each world. OBJ attributes are stored in the area 415. The OBJ attributes are attribute information necessary to draw OBJ'S. A column table is stored in the area 416. This column table includes timing information described therein for correcting unevenness of dot pitch in the X-axis direction caused by sine-wave vibration of the mirrors 217L and 217R in the image display unit 21. Stored in the area 417 are various parameters necessary to execute the game (e.g., parameters used in special display modes, such as H-bias, affine, etc.) A shut-down program is stored in the area 418. The shut-down program is a program for automatically shutting down the progress of the game to prevent excess fatigue of the player when a certain time period passes after the game is started. The area 419 stores other data which are necessary to execute the game.

FIG. 6 is a diagram schematically showing the structure of the back-up memory 42 in FIG. 2. In FIG. 6, game data (various values indicating states of the game) at each save point are stored in the back-up memory 42. The back-up memory 42 is formed of RAM and is backed up by the battery 43 (refer to FIGS. 2 and 3). Accordingly, the game data stored in the back-up memory 42 are held even after the power of the body unit 2 is turned off.

Figure 7:
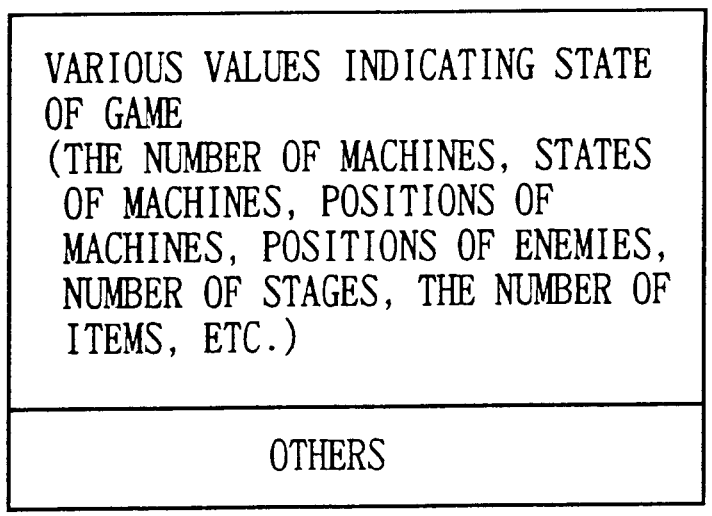
FIG. 7 is a diagram showing a memory map of a work memory 222 in FIG. 2.

FIG. 7 is a diagram schematically showing the structure of the work memory 222 in FIG. 2. In FIG. 7, the work memory 222 stores various values indicating states of the game (the number of machines on the player's side, states of the player's machines, positions of the machines on the player's side, positions of enemies, a number of stages, the number of items, etc.) and other data.

Figure 8:
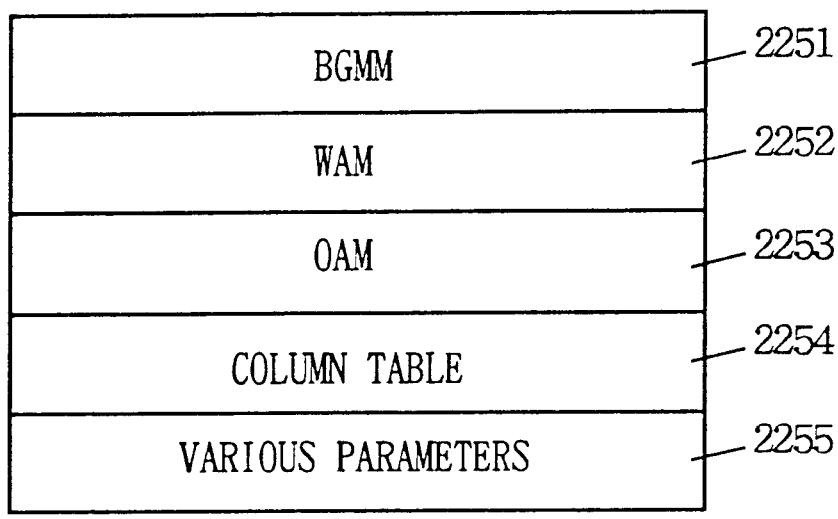
FIG. 8 is a diagram showing a memory map of the image work memory 225 in FIG. 2.

FIG. 8 is a diagram schematically showing the structure of the image work memory 225 in FIG. 2. In FIG. 8, the image work memory 225 includes areas 2251–2255. The area 2251 is used as a BGMM (BG map memory) for storing BG maps selectively read from the area 412 of the program memory 41 (refer to FIG. 5). The area 2252 is used as a WAM (World Attribute Memory) for storing world attributes for 32 worlds. The area 2253 is used as an OAM (OBJ Attribute Memory) for storing OBJ attributes selectively read from the area 415 of the program memory 41. Stored in the area 2254 is a column table read from the area 416 in the program memory 41. Stored in the area 2255 are various parameters necessary to execute the game (e.g., parameters used in special display modes, such as H-bias, affine, etc.)

Figure 9:
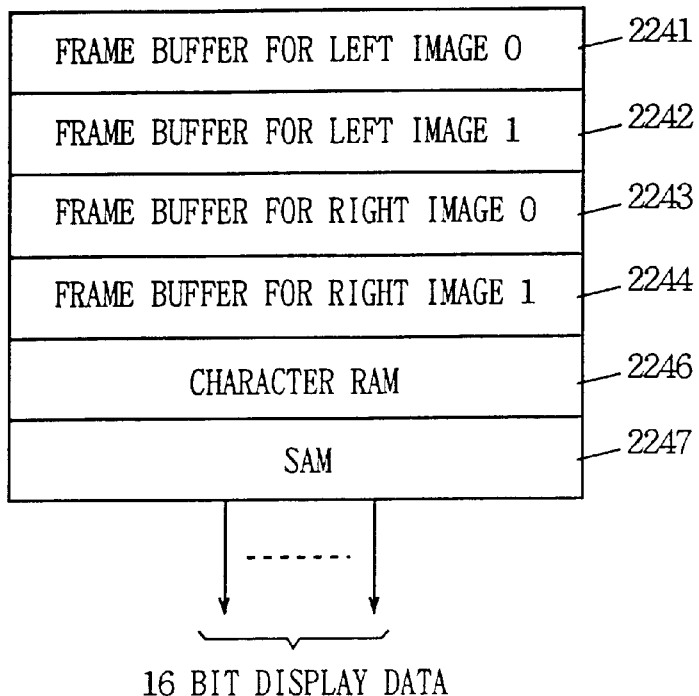
FIG. 9 is a diagram showing a memory map of the image memory 224 in FIG. 2.

FIG. 9 is a diagram schematically showing the structure of the image memory 224 in FIG. 2. In FIG. 9, the image memory 224 includes areas 2241–2247. The area 2241 is used as a frame buffer (0) for the left image. The area 2242 is used as a frame buffer (1) for the left image. The area 2243 is used as a frame buffer (0) for the right image. The area 2244 is used as a frame buffer (1) for the right image. Each frame buffer stores display data for one picture (display data of 384×224 dots, each bit having a depth of 2 bits). The area 2246 is used as a character RAM. Stored in the character RAM are the maximum of 2048 character data read from the area 413 of the program memory 41 (refer to FIG. 5). The area 2247 is used as a SAM (Serial Access Memory). Display data stored in each frame buffer are stored in the SAM 2247 by every four vertical columns (for every 224× 4×2=1792 bits). The SAM 2247 outputs accumulated display data to the image display unit 21 in units of 16 bits (8 dots).

Figure 10:
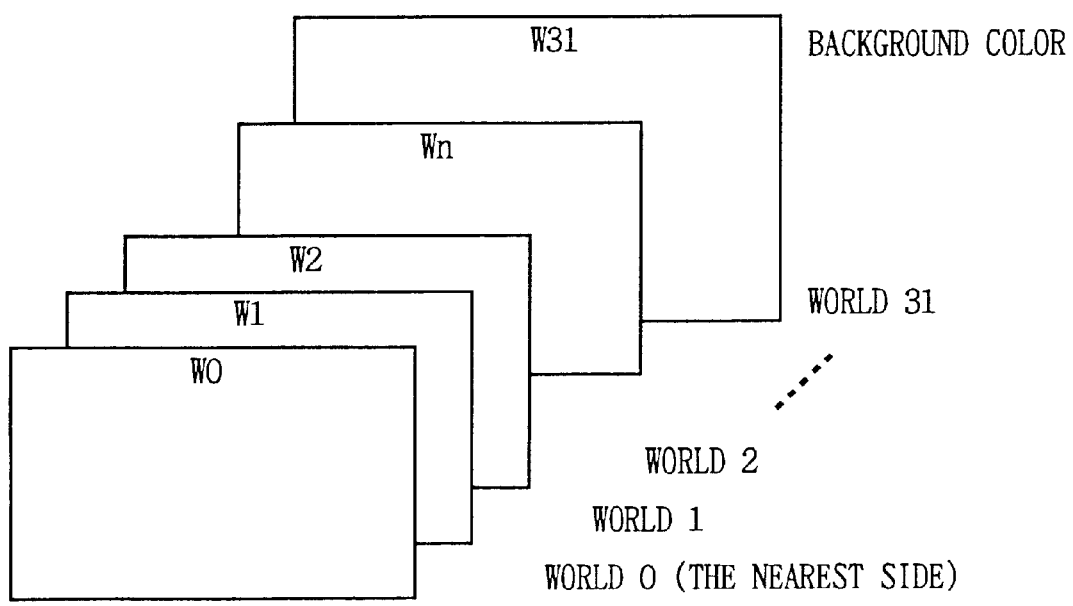
FIG. 10 is a schematic diagram for describing the concept of worlds.

Although this embodiment adopts the parallax providing method which is simplified to reduce the amount of information, it introduces the concept called worlds to obtain images with more sense of depth. The worlds mean virtual planes (WOW31) formed of 32 layers for controlling picture drawing which exist from this side toward the depths on the screen as shown in FIG. 10. In this embodiment, the maximum of 32 planes of worlds can be set, and one BG, or OBJ's formed of characters up to 1024 can be placed in each plane. The image processing IC 223 (refer to FIG. 2) sequentially refers to attribute information (world attributes) set for each world from the deepest world W31 to perform picture drawing processing of each world to the image memory 224. That is to say, one image is formed by superposing the maximum of 32 planes of worlds.

In this embodiment, it is possible to determine the display priority order between BG/BG, OBJ/BG, OBJ/OBJ by setting the worlds. That is to say, a BG or an OBJ placed on a world on the relatively nearer side (with a smaller number) has a higher order of display priority than a BG or an OBJ on a world on the relatively deeper side (with a larger number). For example, a BG or an OBJ placed on the N-th world is written over a BG or an OBJ placed on the N+1-th world adjacent in the depth direction. Accordingly, if the BG or OBJ has an overlapping portion between adjacent worlds, the BG or OBJ on the deeper world is covered with the BG or OBJ on the nearer world in the overlapping portion and is not visible on the screen, unless the BG or OBJ on the nearer world has a transparent portion. The display priority order is set according to the write order of OBJ attributes on the OAM 2253 also between OBJ/OBJ placed on the same world, but the display priority order among worlds has a higher degree of priority.

In this embodiment, the BG and OBJ are displayed by different methods, considering differences in nature between the BG and the OBJ. The methods of displaying the BG and OBJ will now be described.

First, a description will be made on a method of displaying the BG. The BG is displayed by cutting a picture in a necessary area out of a BG map developed in the BGMM 2251 (refer to FIG. 8) and pasting the cut-out picture in an arbitrary position on the display screen. It is possible to cut out a picture in units of one dot in a range from the minimum of 1 (transverse)×8 (vertical) dots to the maximum of 384 (transverse)×224 (vertical) from the BG map. The coordinates at which cutting-out is started can also be specified in units of one dot in both X and Y coordinates.

Figure 11:
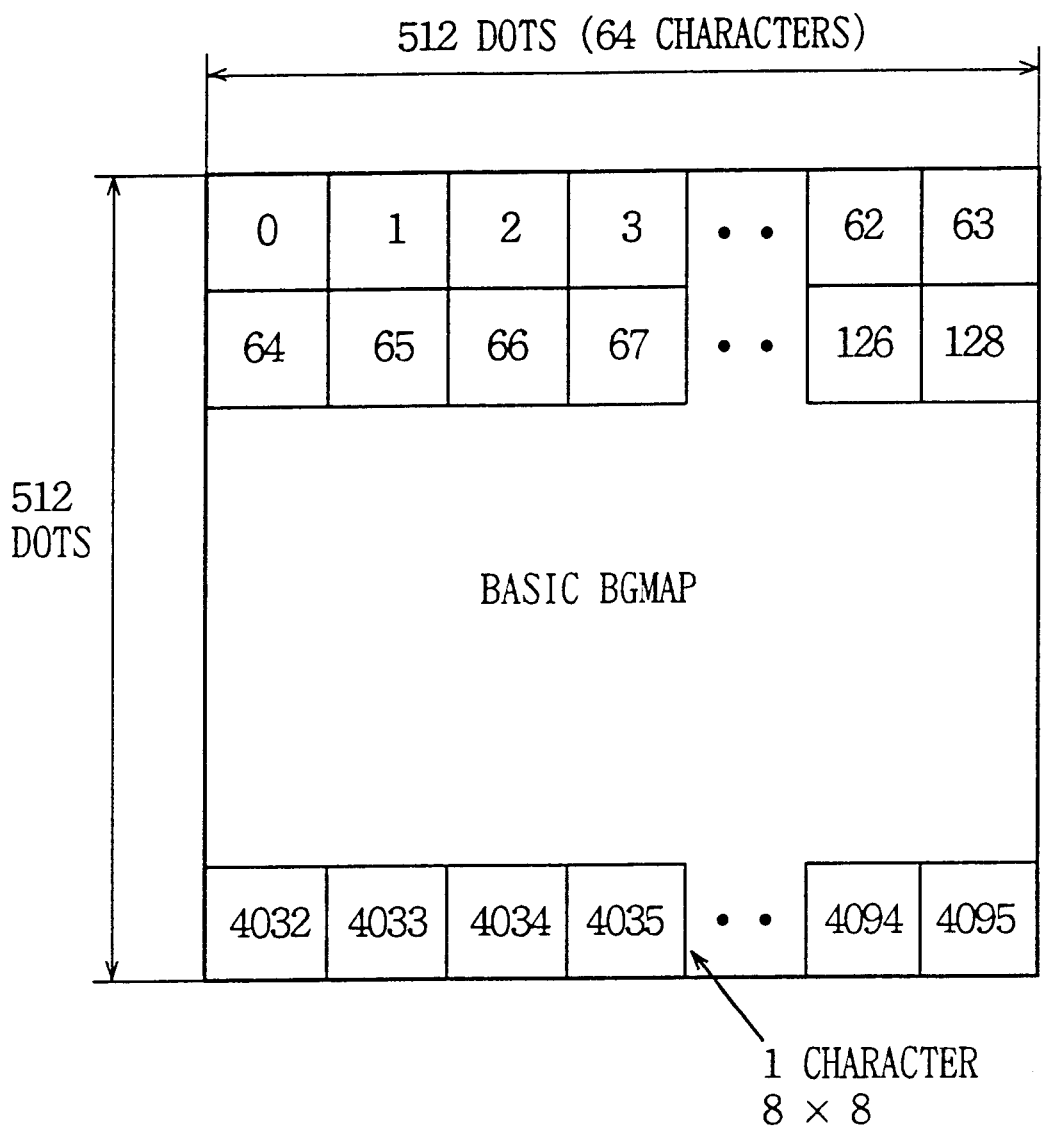
FIG. 11 is a schematic diagram of a basic background ("BG") map.
Figure 12:
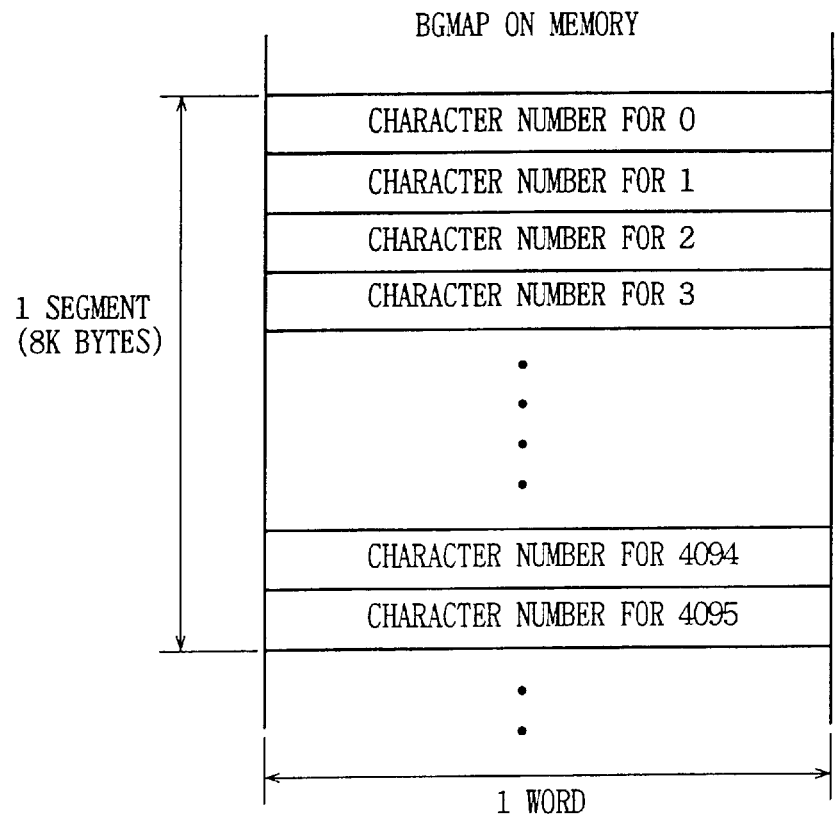
FIG. 12 is a diagram showing the structure of the BG map in the memory.

The BG map has a BG image for 512×512 dots as a basic unit, as shown in FIG. 11. In this embodiment, the basic unit of the BG is referred to as a segment. One segment is formed by collecting 64×64 character blocks of 8×8 dots, i.e. 4096. FIG. 11 schematically shows the BG map, and on the actual BGMM 2251, as shown in FIG. 12, numbers of the respective characters are stored in the order of the position numbers (0–4095) on the BG map in FIG. 11. The numbers are allotted to the respective characters on the character RAM 2246 in the image memory 224 (refer to FIG. 9). That is to say, the character RAM 2246 stores 2048 character data selectively transferred from the area 413 of the program memory 41 (refer to FIG. 5), each character data having a character number selected from 0 to 2047. Accordingly, on the BG map, the BG image is represented using the 2048 kinds of characters.

In this embodiment, the BGMM 2251 has an area which can store BG maps for 14 segments. Hence, the electronic game device of this embodiment can use the maximum of 14 BG maps to create one picture. It is also possible to handle a combination of a plurality of segments as one BG map. The maximum number of combinable segments is 8.

Although the image display method called a character method for forming the BG map by specifying numbers of characters is shown in this embodiment, the present invention may use the bit map method of forming the BG map with groups of dots.

Figure 13:
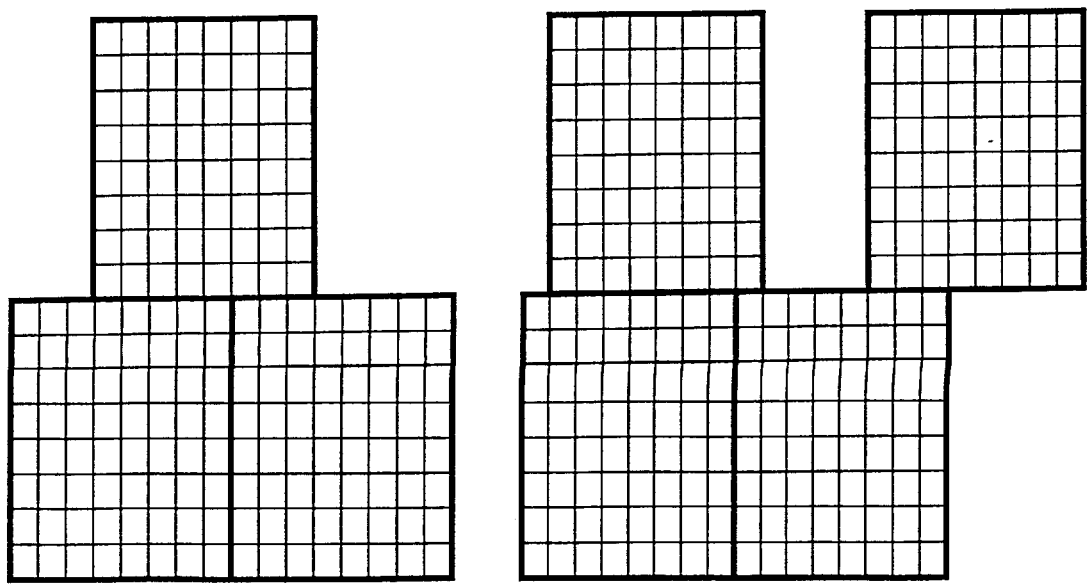
FIG. 13 is a diagram showing an example of an object ("OBJ") created by combining character blocks.

Next, a method of displaying an OBJ will be described. The OBJ is formed by freely combining 8×8 dots character blocks, as shown in FIG. 13. In other words, by properly controlling display coordinates of selected character blocks, the selected character blocks are connected on the display screen. The maximum number of characters usable on one display screen is 1024. The 1024 characters are selected from the 2048 characters registered in the character PAM 2246 (refer to FIG. 9) of the image memory 224 and used.

The OBJs as displayed objects have a property that a large number of small objects are disposed discontinuously on the display screen. Accordingly, controlling coordinate positions of character blocks required for display and appropriately disposing the character blocks on the screen provide efficient use of memory. If the OBJ is to be displayed by cutting rectangular pictures out of the BG map and pasting them on the display screen, like the BG, a lot of undisplayed character blocks must be disposed on the map, which will wastefully consume memory capacity. However, a basic size of the OBJ is 8×8 dots, and no objects smaller than the basic size can be displayed. Also, when displaying an object larger than the basic size, the size increases in units of 8 dots.

On the other hand, the BG has a large display area on the display screen. Additionally, BGs are continuously disposed with few changes in state. Accordingly, the method of cutting out rectangular blocks from a previously prepared BG map and pasting them at arbitrary positions on the display screen is suitable. If coordinates of a BG are to be controlled for each display character, like the OBJ, attribute information increases so much that overload will be put on the picture drawing processing.

Figure 14:
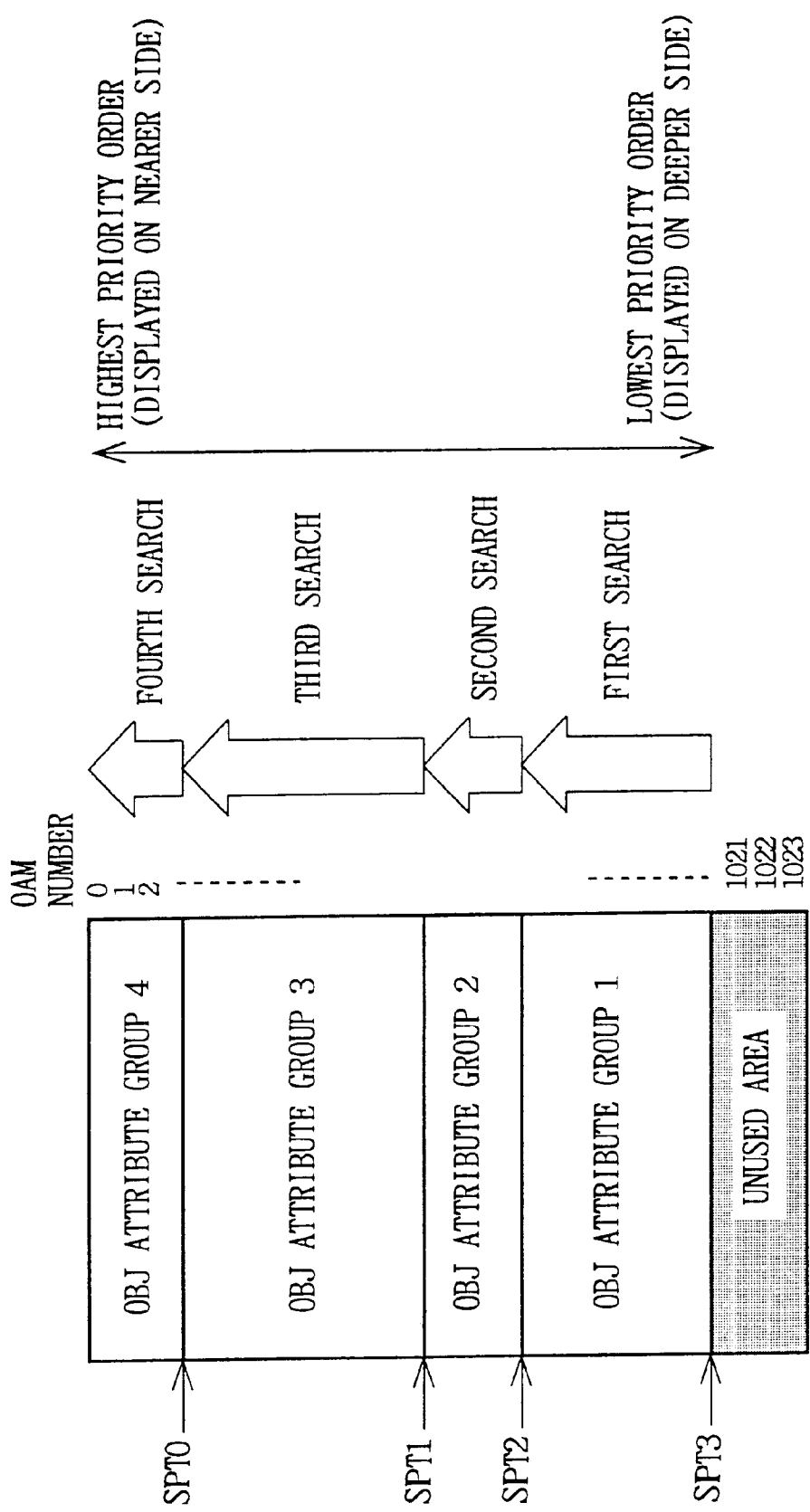
FIG. 14 is a schematic diagram for describing arrangement of OBJ attribute groups in the object attribute memory ("OAM") and the order of searching them.

FIG. 14 schematically shows arrangement of OBJ attributes stored in the OAM 2253 (refer to FIG. 8). As stated before, the OBJ can be set in the maximum of four planes in the 32 worlds. Hence, OBJ attributes are registered while being divided into the maximum of four groups in accordance with planes in which they are set, as shown in FIG. 14. The image processing IC 223 (refer to FIG. 2) searches the world attributes, and when it finds a world in which the OBJ is set, it searches the OAM 2253 to draw the OBJ registered therein. The search of the OAM 2253 is performed in the order starting from an OBJ registered in a position with a larger OAM number (0–1023), and a corresponding OBJ is drawn. An OBJ drawn later has a higher display priority order in the worlds. The boundaries between the four groups are specified by OBJ controlling registers SPT0, SPT1, SPT2 and SPT3 (not shown). Set in an OBJ controlling register SPTX (x=0–3) is an OAM number (0 to 1023) at a position with the lowest priority order (with a larger address) in each group. If the OAM number 1023 is set in the OBJ controlling register SPT3, no unused area exists in the OAM.

FIG. 15 is a diagram showing the structure of the OBJ attributes for one character block written in the OAM 2253. The OBJ attributes are formed of four words (one word includes 2 bytes or 16 bits). In FIG. 15, JX is a 16-bit integer with a sign (positive or negative), which indicates a display position (−7 to 383) of the OBJ in the X-axis direction on the display screen. JY is a 16-bit integer with a sign, which indicates a display position of the OBJ in the Y-axis direction (−7 to 223) on the display screen. JP is a 14-bit integer with a sign, which indicates the quantity of parallax (−256 to 255) in the coordinate system in which the OBJ is displayed. JLON is a 1-bit flag, which indicates whether the OBJ is to be displayed in the left screen or not. JRON is a 1-bit flag, which indicates whether the OBJ is to be displayed on the right screen or not. JCA is a 11-bit integer, which indicates a character number from 0 to 2047. Other attribute information in FIG. 15 has no direct relation with the present invention, so that a description thereof is not made herein.

Figure 16:
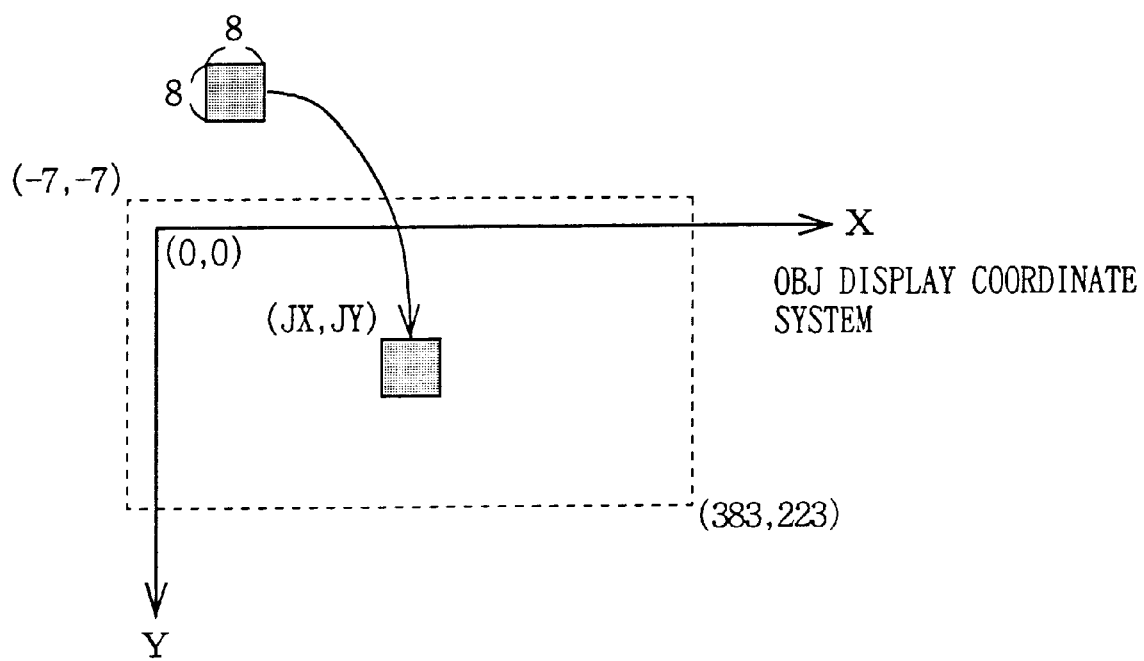
FIG. 16 is a diagram showing an OBJ display coordinate system on the display screen.
Figure 19A:
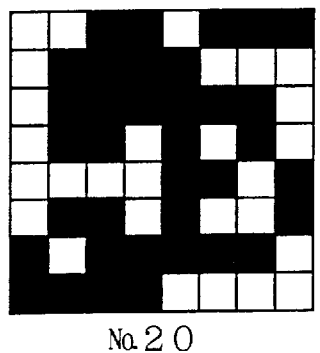
FIGS. 19(a) to 19(d) are diagrams showing an example of character blocks and object attributes prepared to display an OBJ.
Figure 19B:
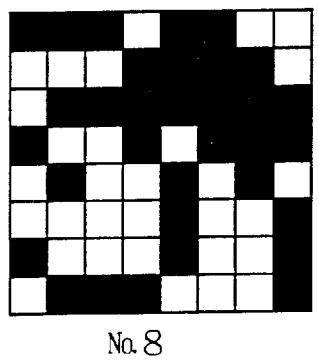
Figure 19C:
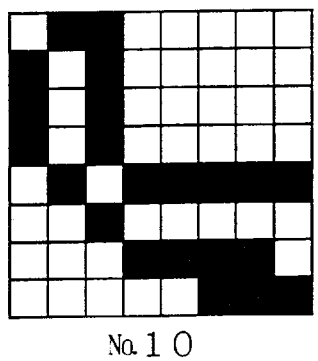
Figure 19D:
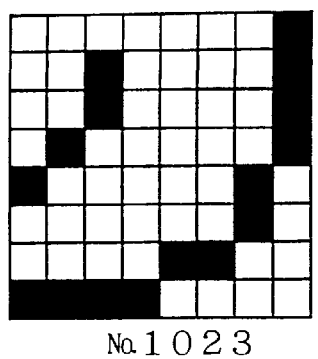

FIG. 16 shows an OBJ display coordinate system in each frame buffer 2241–2244 (refer to FIG. 9) or on the display screen. The OBJ display coordinate system has an area from (0, 0) to (383, 223). The origin (0, 0) is chosen to be at the uppermost point on the left end on the display screen. On the other hand, the space represented by JX, JY of the OBJ attributes has an area from (−7, −7) to (383, 223). This is due to the fact that when a hero appears from the left end on the screen and walks to the right, for example, it is necessary to display the character so that the contents gradually appear on the left end on the screen. The same is true in the case where a hero appears from the upper end on the screen and walks downward. The image processing IC 223 of FIG. 2 reads character data corresponding to the JCA (character number) in the OBJ attributes of FIG. 15 from the character RAM of FIG. 9 and draws the read character data in a predetermined position or predetermined positions (the position defined by JX, JY, JP) on the frame buffer or buffers for the left image and/or the right image. At this time, the image processing IC 223 subtracts or adds the value of the parallax amount JP from or to the JX to determine the X coordinates of display on the left and right screens (i.e. the X coordinates of picture drawing in the right and left frame buffers). Concerning the JY, the quantity of parallax JP is neither subtracted nor added. The description above can be represented in more detail using equations as:

$JXL=JX-JP$ (JXL=X coordinate on the left screen)

$JXR=JX+JP$ (JXR=X coordinate on the right screen)

$JYL=JYR=JY$ (JYR, JYL=Y coordinate on the right and left screens)

FIG. 17 is a diagram showing the structure of world attributes for one world written in the WAM 2252 of FIG. 8. Now, the structure of the world attributes will be described referring to FIG. 17. As shown in FIG. 17, each world attribute is set on an attribute table of 16 words. The 32 worlds from W0 to W31 (refer to FIG. 10) can be set in the WAM 2252. By setting the world attributes, setting can be made as to whether a BG is to be drawn, an OBJ is to be drawn, a BG or an OBJ is to be drawn on both of the right and left screens, or to be drawn on one of them, etc. Any one of 1: one BG (BG world)

2: one to 1024 OBJ(S) (OBJ world)

3: nothing (dummy world: nothing displayed)

4: controlling world (end world)

can be set in each world. As has been stated previously, the image processing IC 223 of FIG. 2 draws pictures on worlds set in the order from an image existing in the deepest in the screen, as W31→W30→W29 ... W0. The world W0 has the highest display priority order, followed by W1, W2 ... W31. Depending on the software, when all the worlds are not required, controlling worlds can be set to efficiently draw required worlds only. For example, when three worlds are used, setting as follows is possible.

W31, W30, W29→used as worlds for picture drawing

W28→set as an end world

Setting as above allows the image processing IC 223 to skip processing for W28–W0 and the processing speed is increased. Of course, if the processing speed permits, the three worlds can be set on arbitrary worlds. In this case, unused worlds are set as dummy worlds.

In FIG. 17, the world attributes include attribute information GX, GY, GP for defining where in the display screen the BG image taken out of the BG map is to be displayed. The GX is a 16-bit integer with a sign (positive or negative), which indicates a position in the X-axis direction (0–383) in the coordinate system in which the BG is displayed. The GY is a 16-bit integer with a sign, which indicates a position in the Y-axis direction (0–223) in the coordinate system in which BG is displayed. The GP is a 16-bit integer with a sign, which indicates the quantity of parallax (−256 to 255) in the coordinate system in which the BG is displayed. The image processing IC 223 calculates coordinate positions for actual display on the display screen as:

X coordinate for the left eye $(dstXL)=GX-GP$;

X coordinate for the right eye $(dstXR)=GX+GP$.

The world attributes also include attribute information MX, MY, MP for defining a starting position of image data taken out from the BG map. MX is a 16-bit integer with a sign (positive or negative), which indicates a position in the X-axis direction (0 to 4095) in the source coordinate system of the BG. The MY is a 16-bit integer with a sign, which indicates a position in the Y-axis direction (0 to 4095) in the source coordinate system of BG. The MP is a 16-bit integer with a sign, which indicates the quantity of parallax (−256 to 255) in the source coordinate system of the BG. The image processing IC 223 calculates a coordinate position of data actually taken out from the BG map as:

Y coordinate for the left eye $(srcYL)=MY-MP;$

Y coordinate for the right eye $(srcYR)=MY+MP.$

Furthermore, the world attributes include attribute information W, H for defining the BG size (window size) on the display screen. W indicates the number of bits in the X-axis direction of the BG on the display screen. H indicates the number of bits in the Y-axis direction of the BG on the display screen. For the left eye, the BG is cut out in the area of (srcXL, MY) to (srcXL+W, MY+H), and displayed from the position of (dstXL, GY) on the display screen. For the right eye, the BG is cut out in the area from (srcXR, MY) to (srcXR+W, MY+H) and displayed from the position of (dstXR, GY) on the display screen.

Furthermore, the world attributes include attribute information LON, RON for defining in which of the left image frame buffer (2241 or 2242) and the right image frame buffer (2243 or 2244) the BG image cut out from the BG map is to be drawn, or whether it is to be drawn in both, that is, for which of the left eye and the right eye the BG image is to be displayed, or, whether the BG image is to be displayed for both. The LON, RON are 1-bit flags, respectively, which indicate states below according to set values.

LON=0: not draw in the frame buffer for the left image

LON=1: draw in the frame buffer for-the left image

RON=0: not draw in the frame buffer for the right image

RON=1: draw in the frame buffer for the right image

When the LON and RON are both 0, nothing is drawn on that world.

Furthermore, the world attributes include attribute information BGM for defining a display mode of the BG image. The BGM is formed of 2 bits and represents four modes below, according to the set values.

BGM=00 the normal BG display mode

BGM=01 the H-bias BG display mode

BGM=10 the affine BG display mode

BGM=11 the OBJ display mode

The normal BG display mode is a mode for displaying a normal BG image. The H-bias display mode is a mode for displaying a BG image with each line in the X-axis direction having offset for each line. The affine BG display mode is a mode for displaying a BG image while being enlarged/reduced/rotated. The OBJ display mode is a mode for displaying an OBJ, and in this case, the image processing IC 223 refers to the OBJ attributes set in the OAM 2253.

Furthermore, the world attributes include attribute information SCX, SCY for defining a screen size of the target BG map. The SCX is formed of 2 bits, and defines the size of the BG map in the X-axis direction according to the set values as follows. The SCY is formed of 2 bits, and defines the size of the BG map in the Y-axis direction according to the set values as follows.

SCX : Screen Size X

SCX = 00  512 dots (1 segment)
    = 01  1024 dots (2 segments)
    = 10  2048 dots (4 segments)
    = 11  4096 dots (8 segments)

SCY : Screen Size Y

SCY = 00  512 dots (1 segment)
    = 01  1024 dots (2 segments)
    = 10  2048 dots (4 segments)
    = 11  4096 dots (8 segments)

A combination of the SCX and SCY above defines the size of one BG map combined in the range of 1 to 8 segments.

Moreover, the world attributes include attribute information END for defining whether that world is a final world (an end world) or not. END is a 1-bit flag, which defines two states below according to its set value.

END=0 The world to be processed this time is not a final world

END=1 The world to be processed this time is a final world

Furthermore, the world attributes include 4-bit attribute information BGMAP_BASE. A base address of the BG map, i.e., a number (0 to 13) of a head segment of the target BG map is set in the BGMAP-BASE.

Furthermore, the world attributes include attribute information PARAM_BASE. Base addresses of a parameter table in which parameters used in the H-bias BG display mode, and in the affine BG display mode are stored in the attribute information PARAM_BASE.

Other attribute information in FIG. 17 has no direct relation with the present invention, and therefore a description thereof is not made herein.

A picture registered on the BG map is cut out in an arbitrary size (1×8 to 384×224) from an arbitrary position according to setting in the world attributes and drawn. When the normal BG display mode is set in the attribute information BGM, the quantity of parallax MP is referred to when cutting out the picture from the BG map, in addition to the quantity of parallax GP on the display screen. The quantity of parallax MP is for considering that different areas of a picture are seen through the left eye and the right eye if the cut out BG is superposed as a window. As shown in FIG. 18, a picture is cut out from a position (MX±MP, MY) which is shifted from the cut out start point (MX, MY) by the quantity of parallax MP in the X-axis direction. Also, on the display screen, the picture cut out from the BG map is displayed being shifted by the quantity of parallax GP in the X-axis direction from the display start point (GX, GY).

Now, the area 412 in the program memory 41 stores a large number of BG maps which are necessary to configure all the BGs appearing in the game. When the displayed contents change considerably as the game progresses (e.g., when a stage or a scene changes), BG maps required for the BG to be displayed in that stage or scene (the maximum of 14 segments) are selected from the area 412 and transferred to the BGMM 2251.

Stored in the area 414 in the program memory 41 is a plurality of world attributes required to draw initial images of stages and scenes where displayed contents change considerably. When the stage or scene changes, world attributes necessary to draw an initial image of that stage or scene are selected from the area 414 and transferred to the BGMM 2251. The world attributes set in the BGMM 2251 are rewritten by the CPU 221 and used according to the game program until the next change of stage or scene comes.

The present embodiment adopts two kinds of newly developed parallax providing methods to display stereoscopic images with less information. Basically, an attempt is made to reduce the amount of information by producing two pictures provided with parallax from one picture. The novel methods of providing parallax adopted in this embodiment will now be described.

First, the method of providing parallax for the OBJ will be described. Generally, the OBJ is provided with parallax by displaying the same picture on the screens on the left and right sides while shifted by a distance corresponding to the parallax quantity JP in the opposite directions along the X axis (horizontally).

Figure 20:
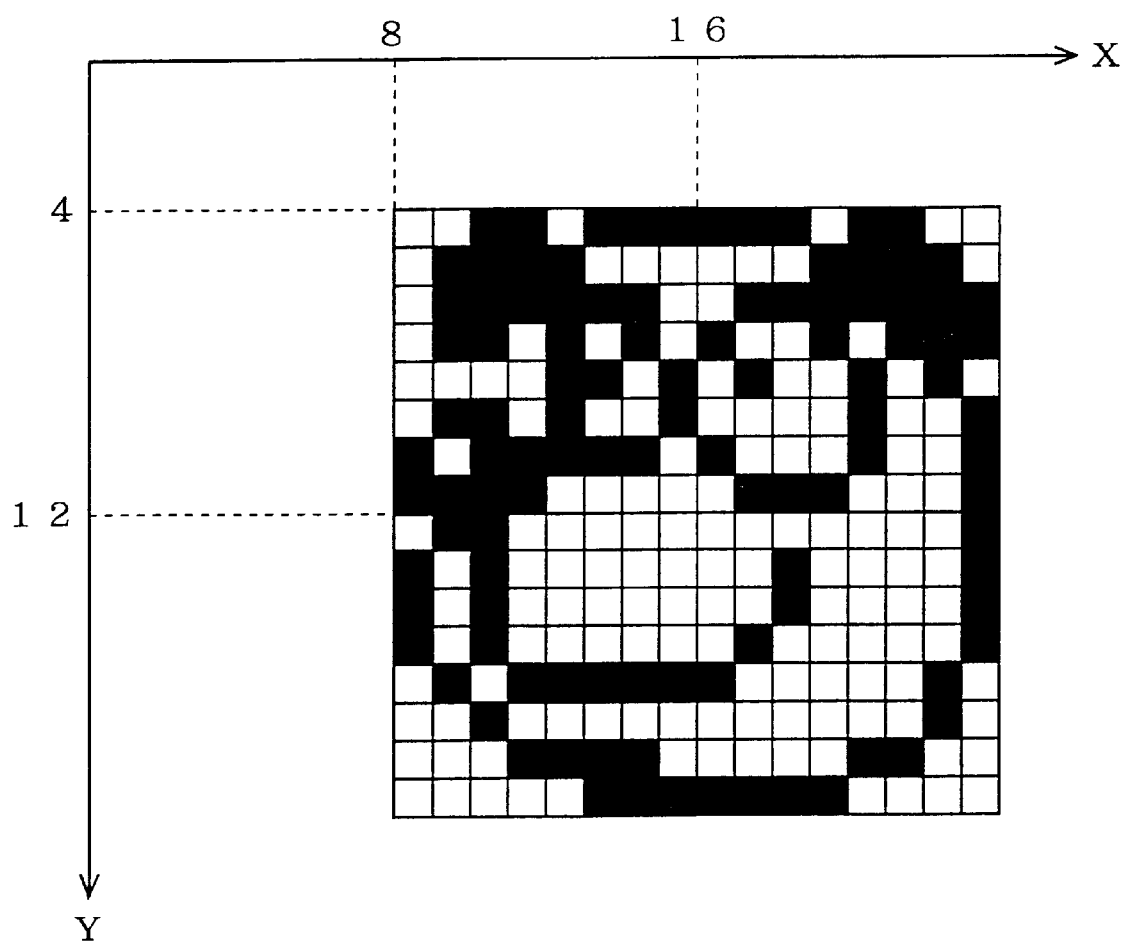
FIG. 20 is a diagram showing an OBJ without parallax displayed using the character blocks in FIG. 19.

Now, suppose that an OBJ is displayed using four characters having dot patterns as shown in FIG. 19 (*a*)–(*d*) The respective characters (a)–(d) are provided with character numbers (JCA) 20, 8, 10, 1023, respectively. The respective characters (a)–(d) are set with OBJ attributes as shown on the right side of the dot patterns, respectively. In the case of FIG. 19, as the quantities of parallax JP of the respective characters are 0, the characters are displayed at the positions themselves defined with (JX,JY) on the display screen. Accordingly, an OBJ as shown in FIG. 20 appears on the display screen.

Figure 22A:
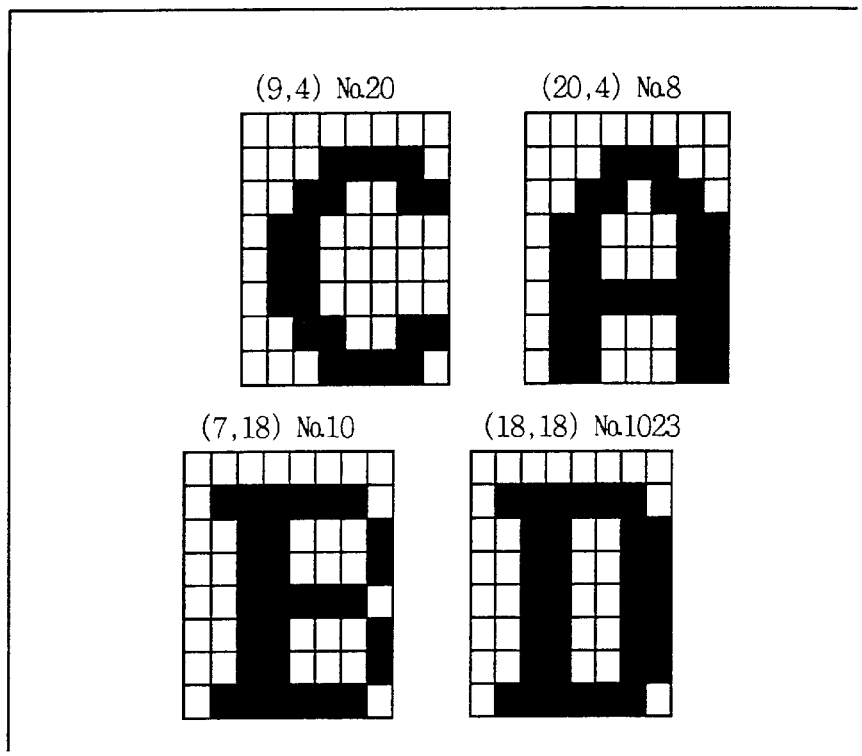
FIGS. 22(a) and 22(b) are diagrams showing the character blocks shown in FIG. 21 displayed on the left eye screen and the right eye screen according to the respective OBJ attributes.
Figure 22B:
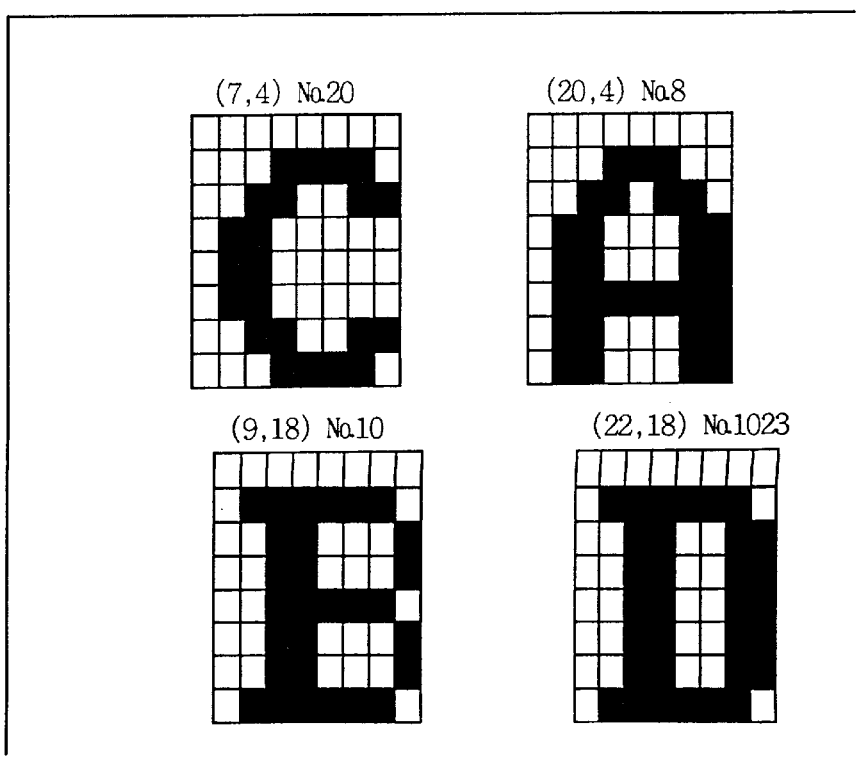
Figure 23:
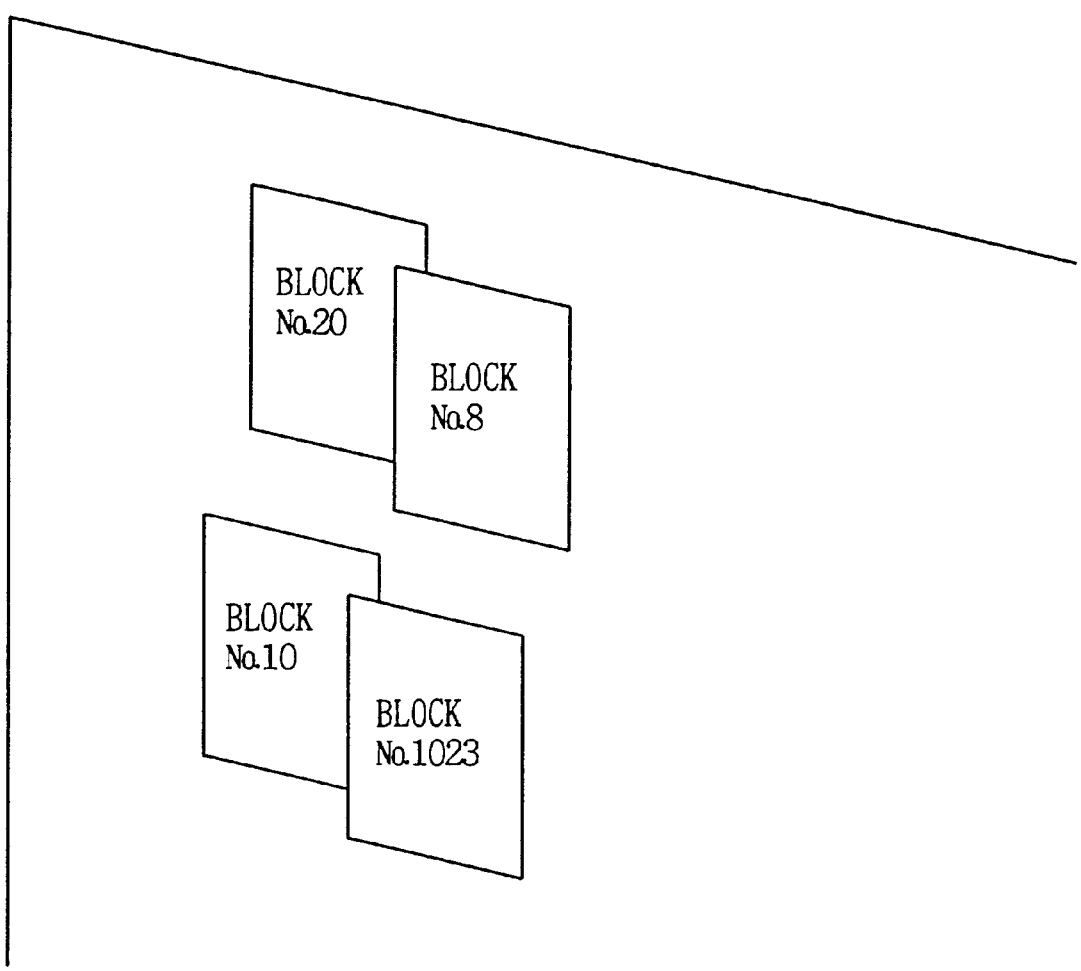
FIG. 23 is a schematic diagram for describing the stereoscopic sense when the left and right images shown in FIG. 22 are seen at the same time.

On the other hand, as shown in FIG. 21 (*a*)–(*d*), when parallax is set to the respective characters, the characters are displayed with display positions in the X-axis direction being shifted as (JX–JP) on the left screen (refer to FIG. 22(*a*)), and shifted as (JX+JP) on the right screen (refer to FIG. 22(*b*)). In this way, since the display positions in the X-axis direction are shifted in the opposite directions by a distance corresponding to the quantity of parallax JP on the left and right screens, the object looks as if it were protruding or distant. If the images shown in FIG. 22 (*a*) and (*b*) are seen with the left and right eyes, respectively, they are seen in the order of the block with the character number 20, the block with the character number 8, the block with the character number 10 and the block with the character number 1023 from this side, as shown in FIG. 23.

Figure 24:
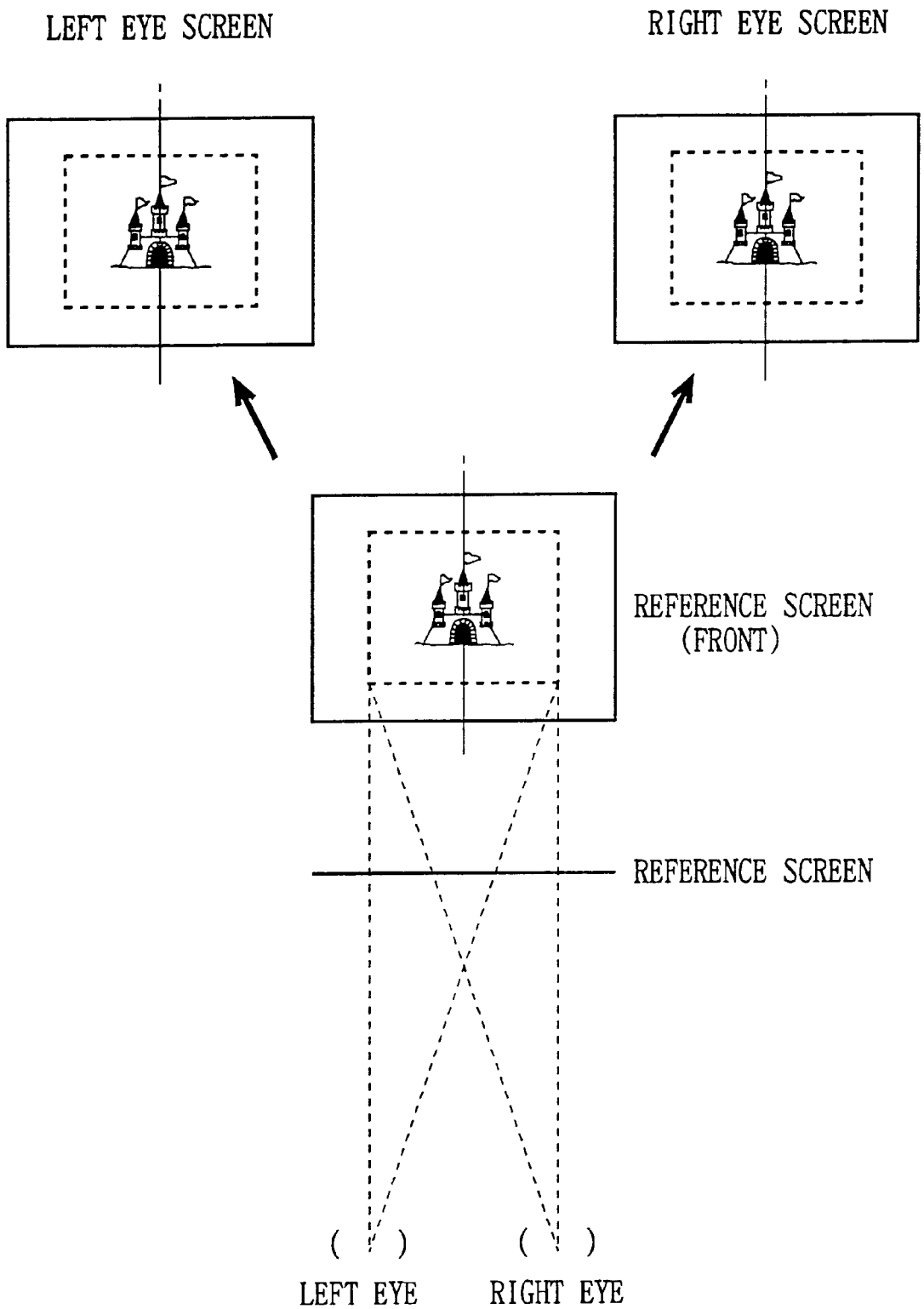
FIG. 24 is a diagram showing a BG displayed on the left and right screens when parallax on the screen is 0.
Figure 26:
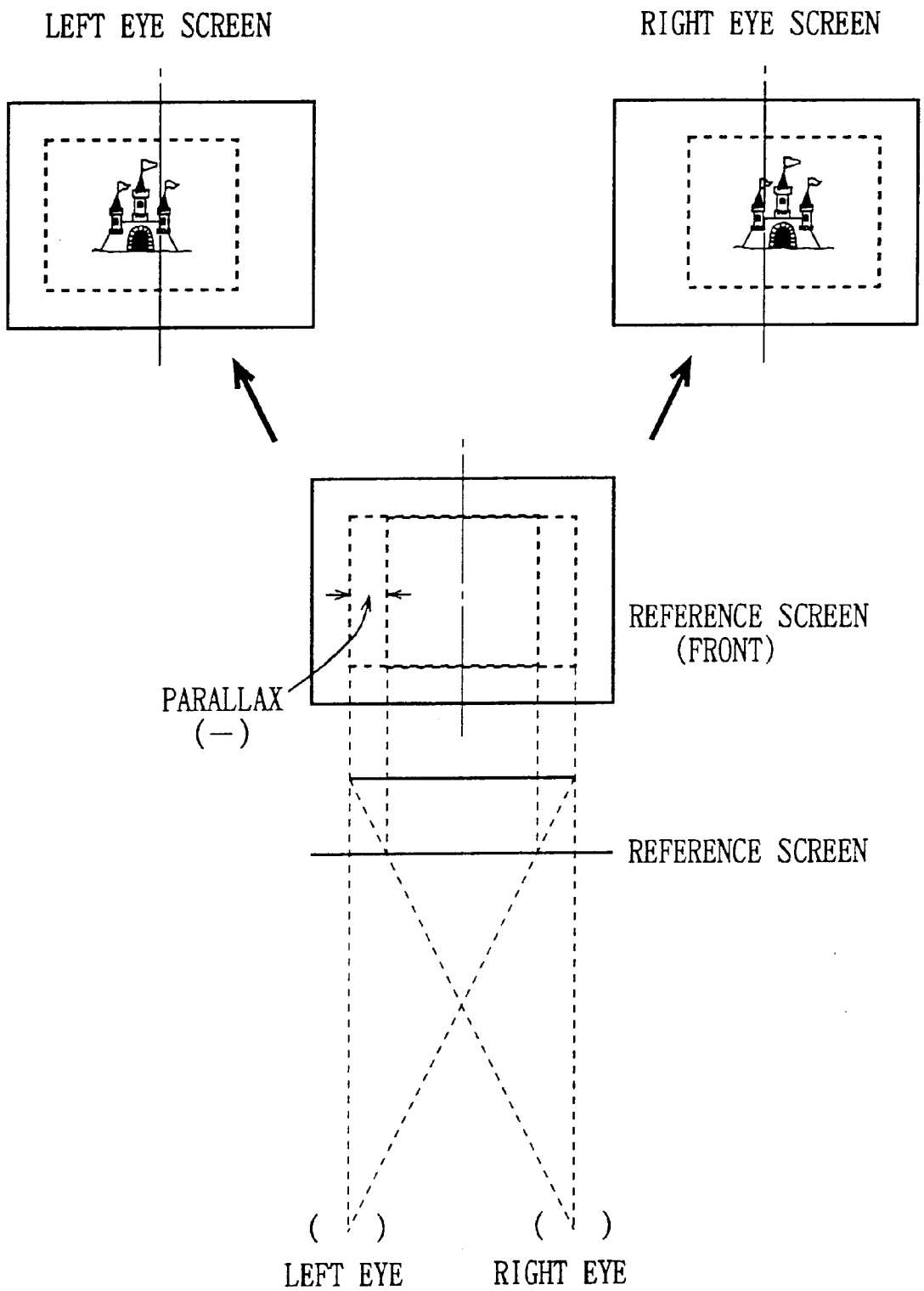
FIG. 26 is a diagram showing a BG displayed on the left and right screens when there is negative (−) parallax on the screen.

Describing the relation between the quantity of parallax and the perspective in more detail, if the quantity of parallax is 0, a player will feel as if the OBJ exists on the reference screen, as shown in FIG. 24. If the quantity of parallax is positive, the player will feel as if the OBJ exists closer than the reference screen, as shown in FIG. 25. If the quantity of parallax is negative, the player will feel as if the OBJ exists deeper than the reference screen, as shown in FIG. 26.

Next, the method of providing parallax for the BG will be described. In this embodiment, two kinds of parallax providing methods are used for the BG.

The first method of providing parallax to BG is the parallax providing method the same as that for the OBJ. That is to say, a picture cut out from a BG map is shifted by a distance corresponding to the quantity of parallax GP (refer to FIG. 17) in the opposite directions along the X-axis (horizontal) and displayed on left and right screens, thereby providing the parallax.

Figure 27:
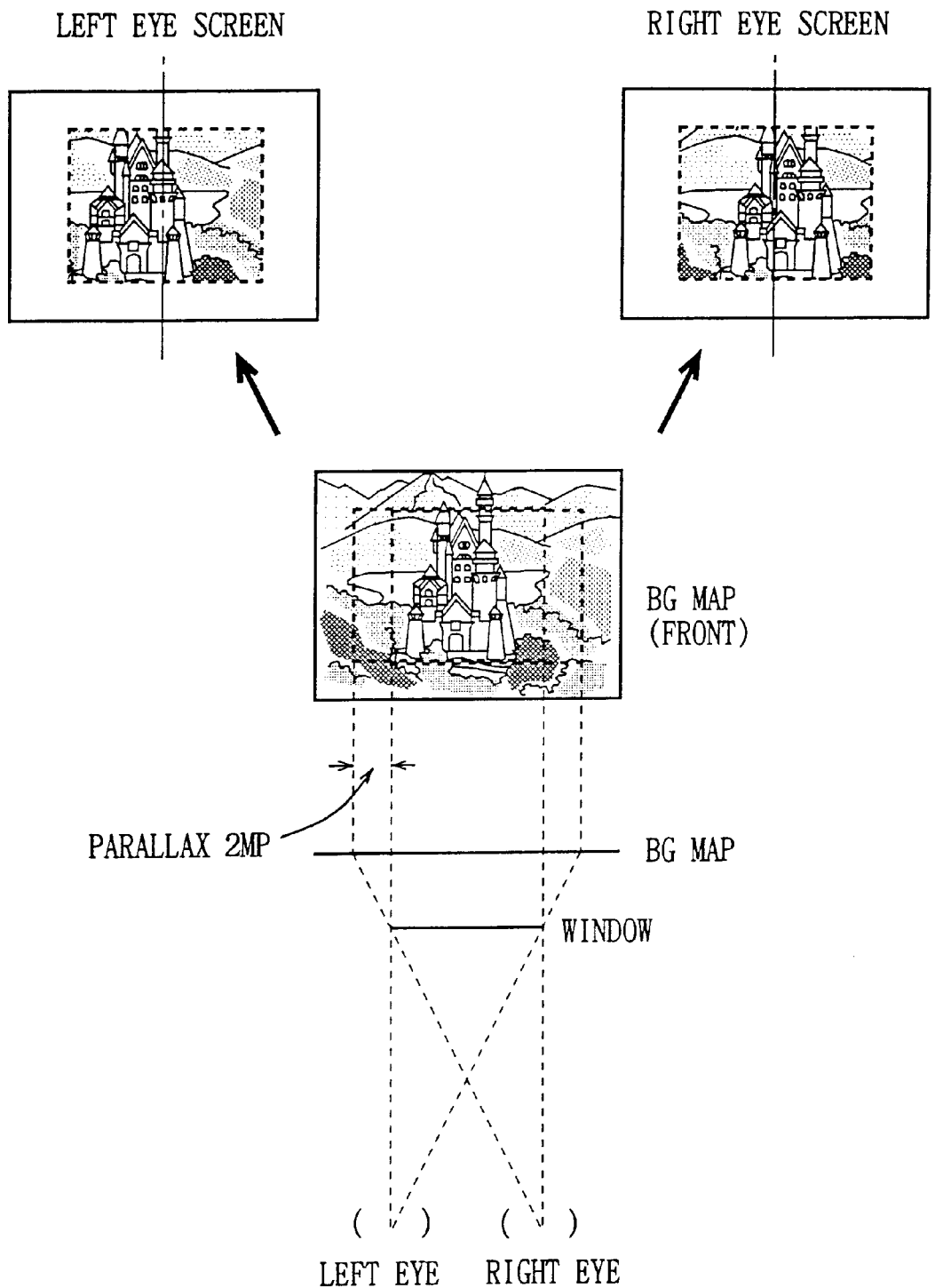
FIG. 27 is a diagram showing a BG cut out from the BG map and the BG displayed on the left and right screens when parallax MP is provided on the BG map.

The second parallax providing method for the BG is made according to an idea opposite to the first parallax providing method. That is to say, left and right pictures are cut out from a BG map while being shifted by a distance corresponding to the quantity of parallax MP in the opposite directions along the X-axis and the cut out two pictures are displayed at the same positions on the left and right screens, thereby to provide parallax (refer to FIG. 27). In this case, the quantity of parallax GP on the screen may be set to 0. This second method of providing parallax is used to display a distant object seen through a window, for example. As shown in FIG. 27, the left eye and the right eye will see different areas when seeing a distant scene through a window. This second method of providing parallax is effective when the distant object seen through the window is larger than the size of the window frame, however, and the first method of shifting coordinates on the display side may be used when the displayed object is smaller than the size of the window frame. The second method of providing parallax is also effective when cutting a BG image out of a BG map and displaying the BG image with full size (384×224 dots) because the four ends of the display screen can be regarded as a window.

Furthermore, the parallax may be provided using both the first parallax providing method and the second parallax providing method. Such a parallax providing method is used to display a distant object seen through a window and display also the window itself on the nearer or deeper side, for example.

Figure 28:
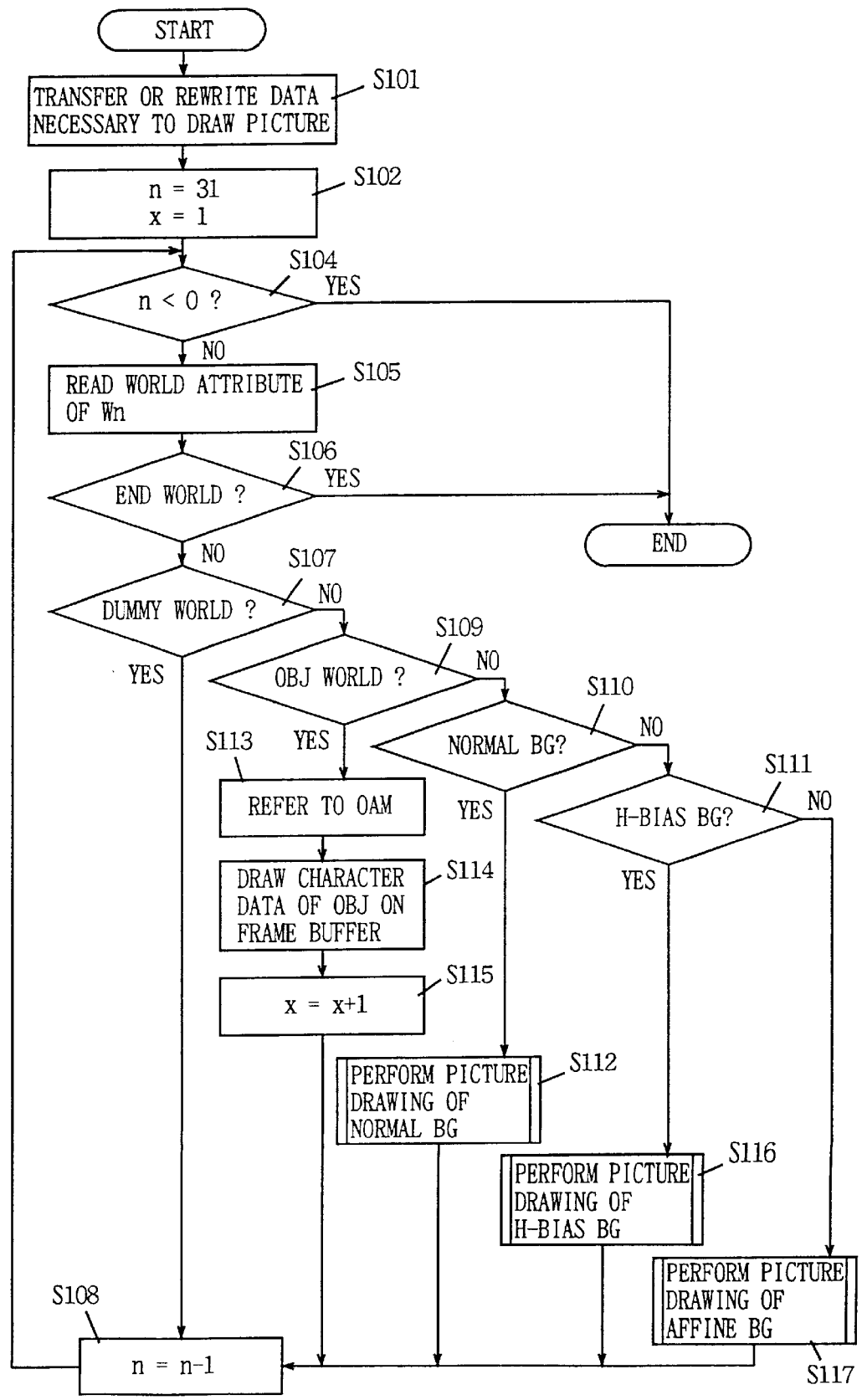
FIG. 28 is a flow chart showing the picture drawing operation in the embodiment of the present invention.
Figure 29:
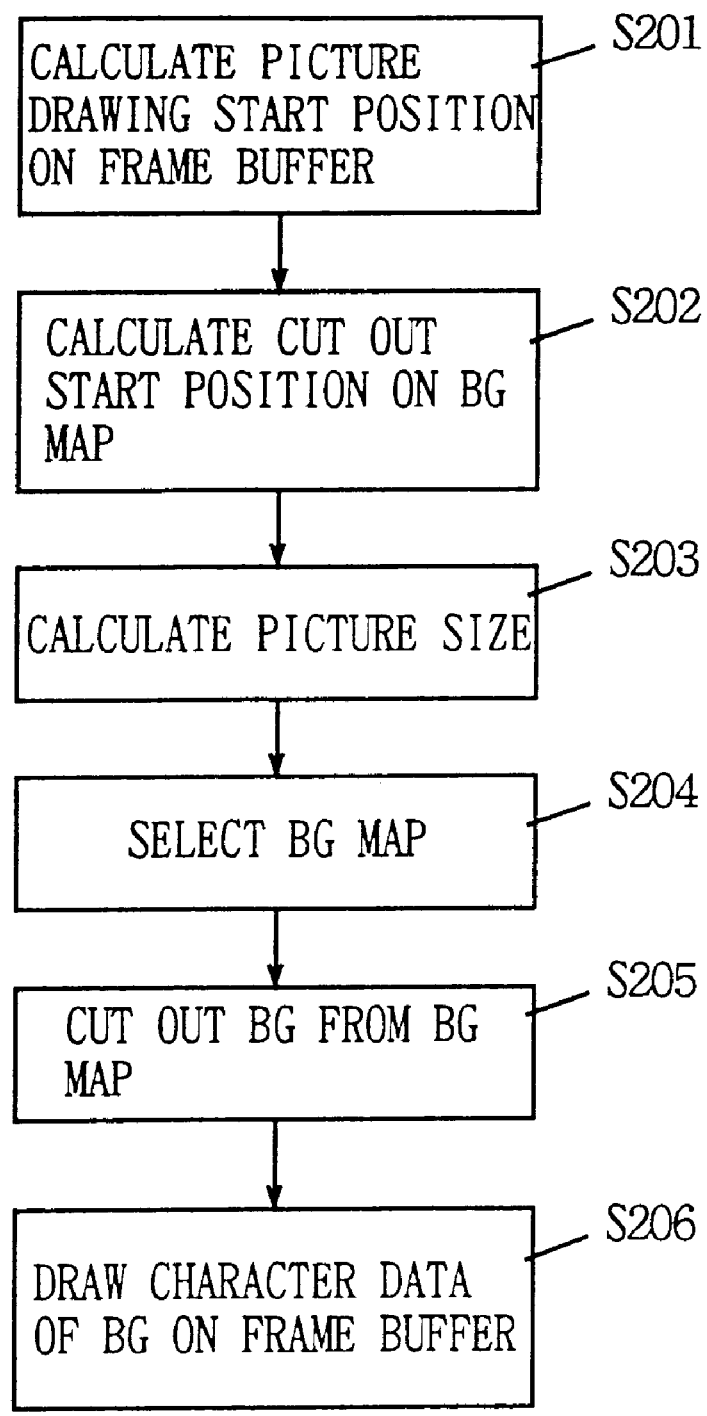
FIG. 29 is a flow chart showing details in the subroutine step S112 in FIG. 28.
Figure 30:
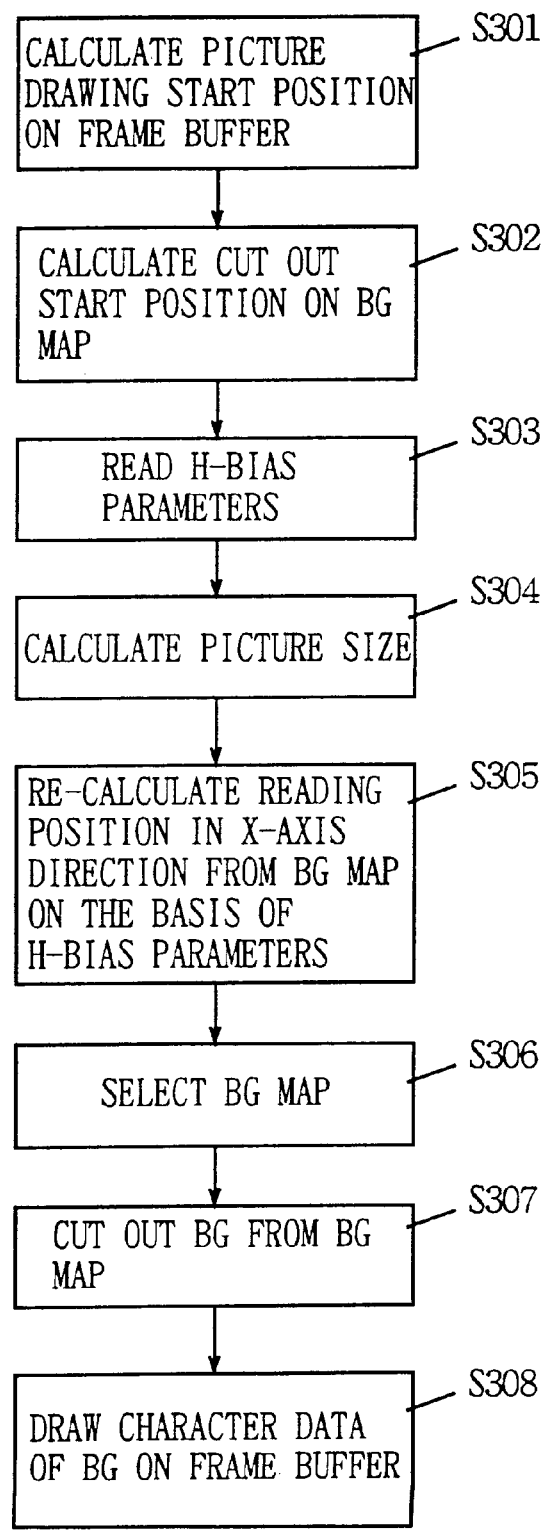
FIG. 30 is a flow chart showing details in the subroutine step S116 in FIG. 28.
Figure 31:
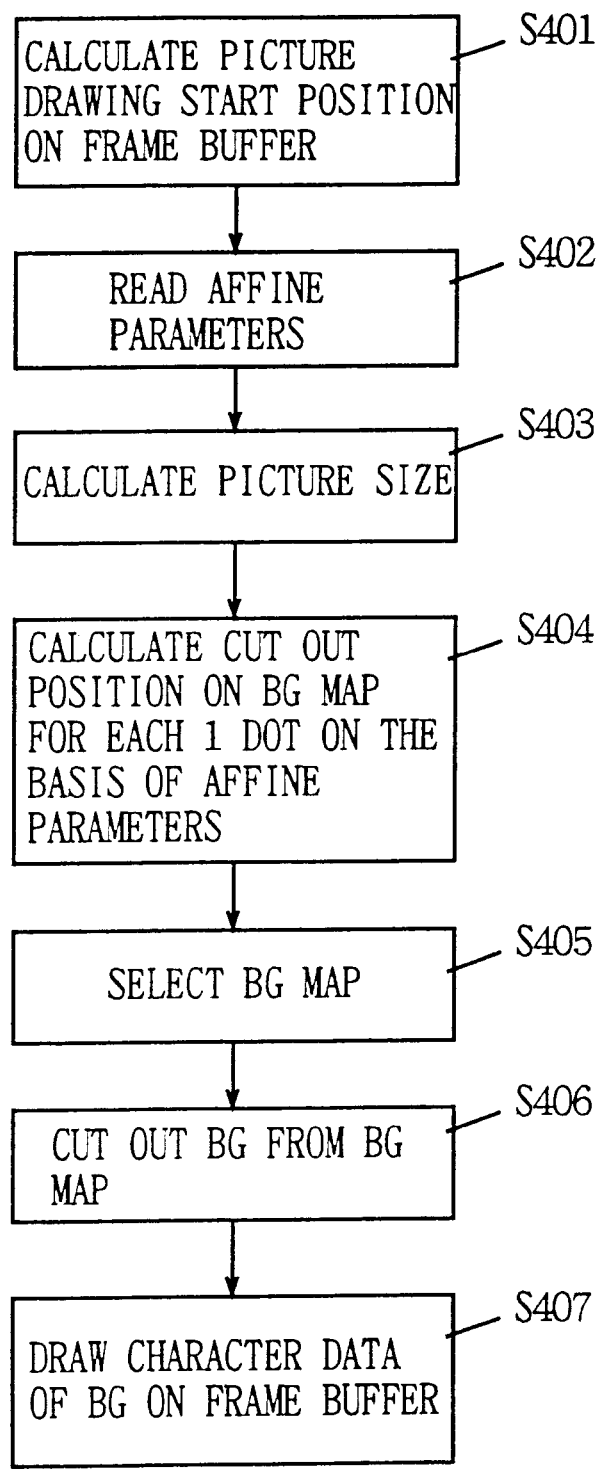
FIG. 31 is a flow chart showing details in the subroutine step S117 in FIG. 28.

FIG. 28 is a flow chart showing picture drawing operation in this embodiment. FIGS. 29–31 are flow charts showing details of respective subroutine steps in FIG. 28. Referring to FIG. 28 to FIG. 31, the picture drawing operation performed in the image/sound processing device 22 of this embodiment will now be described.

First, the CPU 221 transfers or rewrites data necessary for picture drawing (Step 2101). That is to say, the CPU 221 refers to the program memory 41 in the program cartridge 4 when the power-supply is turned on or when stages or scenes are switched where the displayed contents change considerably to transfer required BG maps, world attributes, H-bias parameters, affine parameters, etc. to the image work memory 225 and transfer required character data etc. to the image memory 224. When the displayed contents do not change considerably from the preceding image, the CPU 221 rewrites the world attributes, the OBJ attributes, the H-bias parameters, the affine parameters, etc. stored in the image work memory 225 according to the game program stored in the program memory 41.

Next, the image processing IC 223 sets 31 in a counter n and sets 1 in a counter x (Step S102). The counter n is a counter for counting numbers of worlds subject to the processing, which is configured to be able to count negative values. The counter x is a counter for counting the order of OBJ worlds subject to the processing. Next, the image processing IC 223 determines whether the counted value of the counter n is smaller than 0 or not. If the counted value of the counter n is 0 or above, the image processing IC 223 reads world attributes of a world Wn corresponding to the counted value of the counter n from the image work memory 225 (Step S105).

Next, the image processing IC 223 determines whether the world subject to processing this time is an end world or not (Step S106). This determination is made on the basis of the attribute information END (refer to FIG. 17) included in the world attributes. If the world Wn is not an end world, the image processing IC 223 makes a determination as to whether the world Wn is a dummy world (world where no display is made; LON=0, RON=0) or not (Step S107). If the world Wn is a dummy world, the image processing IC 223 decrements the counted value of the counter n by 1 (Step S108) and returns to the operation in the Step S104. If the world Wn is neither an end world nor a dummy world, the image processing IC 223 determines whether the world Wn is an OBJ world, a normal BG world, or an H-bias BG world (Steps S109–S111). This determination is made on the basis of the attribute information BGM included in the world attributes.

First, processing when the world Wn is a normal BG world will be described. In this case, the image processing IC 223 performs picture drawing work of a normal BG on the basis of the various kinds of attribute information set in the world attributes (Step S112). Details of the subroutine processing in this Step S112 are shown in FIG. 29. FIG. 18 schematically shows the principle of this picture drawing work. Referring to FIG. 29 and FIG. 18, the image processing IC 223 calculates positions for starting picture drawing on the left and right frame buffers (refer to FIG. 9) on the basis of the attribute information GX, GY, GP (the X coordinate position, the Y coordinate position, the quantity of parallax on the display coordinate system of BG) set in the world attributes (Step S201). Next, the image processing IC 223 calculates a position for starting cutting out the BG from the BG map on the basis of the attribute information MX, MY, MP (the X-coordinate position, the Y-coordinate position and the quantity of parallax on the source coordinate system of BG) set in the world attributes (Step S202). Next, the image processing IC 223 calculates a cut-out size of the BG from the BG map on the basis of the attribute information W, H (the dot size in the X-axis direction and the dot size in the Y-axis direction on the source coordinate system of BG) set in the world attributes (Step S203). Next, the image processing IC 223 selects a necessary BG map from a plurality of BG maps in the BGMM 2251 (refer to FIG. 8) on the basis of the attribute information BGMAP_BASE set in the world attributes (Step S204). Next, the image processing IC 223 cuts out BG data (a character number in this stage) from a predetermined area (an area obtained by the calculations in Steps S202, S203) on the selected BG map (Step S205). Next, the image processing IC 223 reads the character data corresponding to the cut out character number from the character RAM 2246 (refer to FIG. 9) and draws a picture in a predetermined area (the area with the picture drawing starting position calculated in Step S201) on the frame buffers 2241, 2243 (or 2242, 2244) (Step S206).

Next, a description is made for the processing when the world Wn is an OBJ world. In this case, the image processing IC 223 refers to OBJ attributes in a group corresponding to the counted value of the counter x in the OAM 2253 (refer to FIG. 8)(Step S113; refer to FIG. 14). Next, the image processing IC 223 reads corresponding character data from the character RAM 2246 on the basis of the character number JCA set in the referred OBJ attributes (refer to FIG. 15) and draws the read character data in a predetermined area (an area having the picture drawing starting position defined by JX, JY, JP) on the frame buffers 2241, 2243 (or 2242, 2244) (Step S114). Next, the image processing IC 223 adds 1 to the counted value of the counter x (Step S115).

Next, processing in the case where the world Wn is an H-bias BG world will be described. In this case, the image processing IC 223 performs picture drawing processing of the H-bias BG on the basis of the attribute information set in the world attributes and the H-bias parameters stored in the area 2255 in the image work memory 225 (Step S116). Details of the subroutine processing of this Step S116 are shown in FIG. 30. Referring to FIG. 30, the image processing IC 223 calculates picture drawing starting positions on the left and right frame buffers (refer to FIG. 9) on the basis of the attribute information GX, GY, GP set in the world attribute (Step S301). Next, the image processing IC 223 calculates the cut-out starting position of the BG from the BG map on the basis of the attribute information MX, MY, MP set in the world attributes (Step S302). Next, the image processing IC 223 reads necessary H-bias parameters from the area 2255 in the image work memory 225 on the basis of the attribute information PARM_BASE set in the world attributes (Step S303). Next, the image processing IC 223 calculates a cut-out size of the BG from the BG map on the basis of the attribute information W, H set in the world attributes (Step S304).

Next, the image processing IC 223 re-calculates a read position in the X-axis direction from the BG map on the basis of the H-bias parameters read in Step S303 (Step S305). Here, if the X coordinates referred to when actually reading the source data of the BG map are taken as BGXL, BGXR, the H-bias parameters for the left screen are taken as HOFSTL and the H-bias parameters for the right screen are taken as HOFSTR, then the calculating processing of $$BGXL = MX - MP + HOFSTL$$

$$BGXR = MX + MP + HOFSTR,$$

are performed in Step S305. The H-bias parameters HOFSTL and HOFSTR, are 16-bit integers with signs (−512 to 511) indicating the quantity of offset in the X-axis direction. In this embodiment, since offset in each transverse line is possible, it is necessary to have the H-bias parameters for the lines in the horizontal direction of the BG. For example, when opening a full size BG, a parameter table as large as 224×2=448 words must be set in the area of the image work memory 225.

Next, the image processing IC 223 selects a required BG map from the plurality of BG maps in the BGMM 2251 (refer to FIG. 8) on the basis of the attribute information BGMAP_BASE set in the world attributes (Step S306). Next, the image processing IC 223 cuts out BG data (a character number in this stage) from a certain area (the area obtained by the calculations in the Steps S302, S304, S305) on the selected BG map (Step S307). At this time, the BG data is read from a position shifted from an original read position in the X-axis direction (MX±MP) by the values of HOFSTL, HOFSTR. Next, the image processing IC 223 reads character data corresponding to the cut out character number from the character RAM 2246 (refer to FIG. 9) and performs picture drawing processing in certain area (an area with a picture drawing starting position calculated in the Step S301) on the frame buffers 2241 and 2243 (or 2242, 2244) (Step S308).

Next, processing in the case in which the world Wn is not an OBJ world, a normal BG world, nor an H-bias BG world, i.e., when it is an affine BG world will be described. In this case, the image processing IC 223 performs picture drawing work of the affine BG on the basis of the various kinds of attribute information set in the world attributes and the affine parameters stored in the area 2255 of the image work memory 225 (Step S117). Details in a subroutine processing in this Step S117 are shown in FIG. 31. Referring to FIG. 31, the image processing IC 223 calculates picture drawing starting positions on the left and right frame buffers on the basis of the attribute information GX, GY, GP set in the world attributes (Step S401). Next, the image processing IC 223 reads required affine parameters from the area 2255 of the image work memory 225 on the basis of the attribute information PARAM_BASE set in the world attributes (Step S402). Next, the image processing IC 223 calculates the display size of the BG from the BG map on the basis of the attribute information W, H set in the world attributes (Step S403). Next, the image processing IC 223 calculates a cut-out position on the BG map for each one dot on the basis of the read affine parameters (Step S404). Accordingly, the attribute information MX, MY, MP in the world attributes are not used in this affine BG picture drawing mode.

Next, the image processing IC 223 selects a required BG map from the plurality of BG maps in the BGMM 2251 on the basis of the attribute information BGMAP_BASE set in the world attributes (Step S405). Next, the image processing IC 223 cuts out BG data (a character number in this stage) from a certain area (the area obtained by the calculation in Step S404) on the selected BG map (Step S406). Next, the image processing IC 223 reads the character data corresponding to the cut out character number and draws picture in a certain area (the area determined in Step S403, with the picture drawing starting position calculated in Step S401) on the frame buffers 2241, 2243 (or 2242, 2244) (Step S407).

The character data is alternately drawn to the two sets of frame buffers (the set of 2241, 2243 and the set of 2242, 2244). While the character data is drawn to one set, the display image data stored in the other set is read, and provided to the LED units 212L and 212R through the SAM 2247 and displayed.

As has been stated hereinabove, this embodiment is directed to a dual scanner system (a system which is seen with both eyes) wherein one-dimensional LED arrays 214L, 214R (with LEDs arranged in a vertical column for 224 dots, respectively) are made to emit light at appropriate timing in synchronization with vibration of the mirrors 217L, 217R, which is seen by a player through the mirrors 217L. 217R. Thus, the player sees as if a piece of screen were formed on each display system due to the after image effect of the eyes. To make the game stereoscopic, different images with parallax (images with different data on the left and the right) must be displayed on the left and right display systems. However, it is difficult from the point of processing ability to simultaneously transfer different image data to the display systems on both sides with a single image processing IC 223. Also, if different images are displayed at the same time on the left and right display systems, the peak consumption power increases to increase the maximum power consumption. Accordingly, in this embodiment, considering reduction of load on the image processing IC, distribution of the peak power consumption, etc., the display periods on the left and right display systems are shifted from each other so that they do not overlap.

Figure 32:
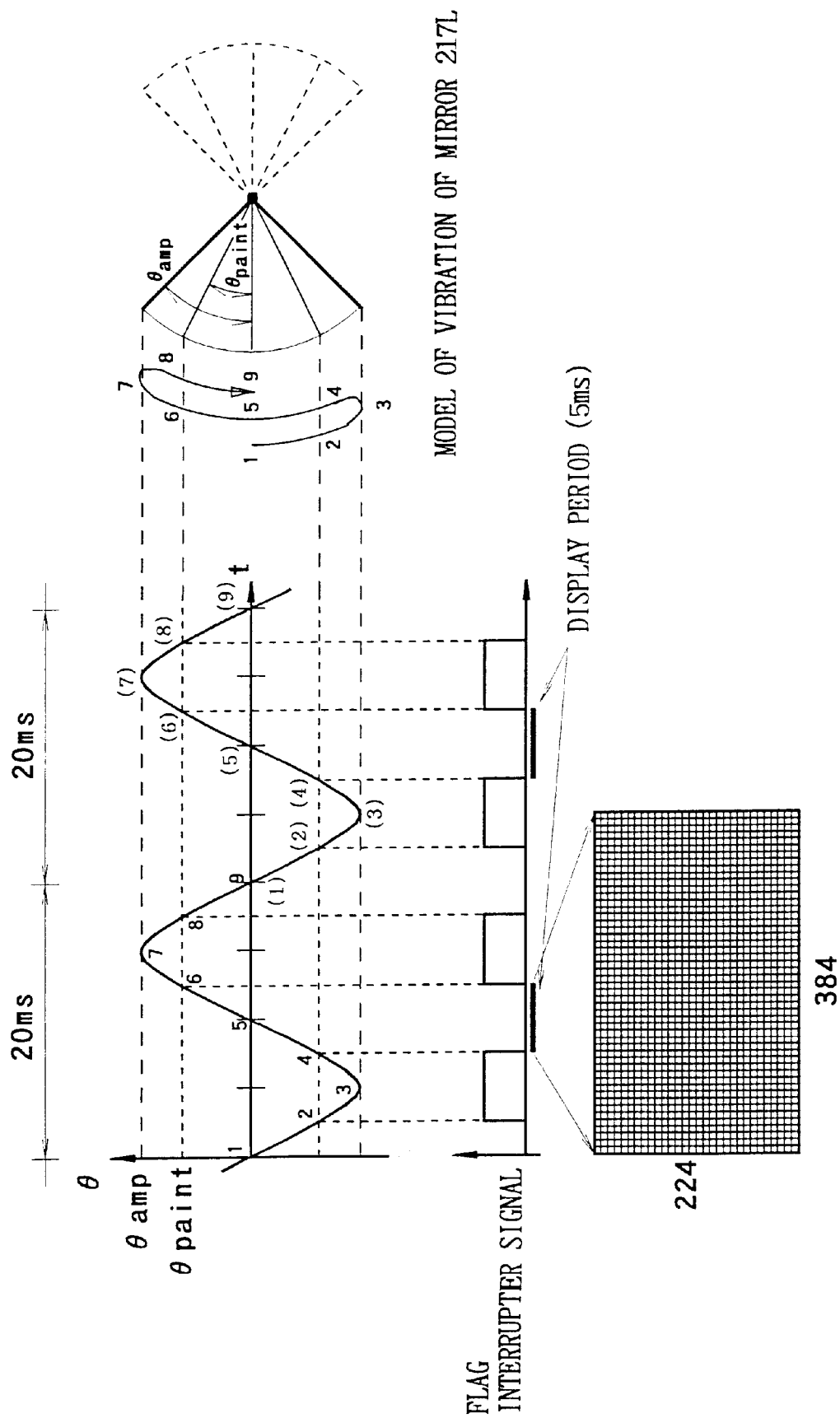
FIG. 32 is a diagram showing the relation between the vibration phase of the mirror and the display timing in the display system on the left side.
Figure 33:
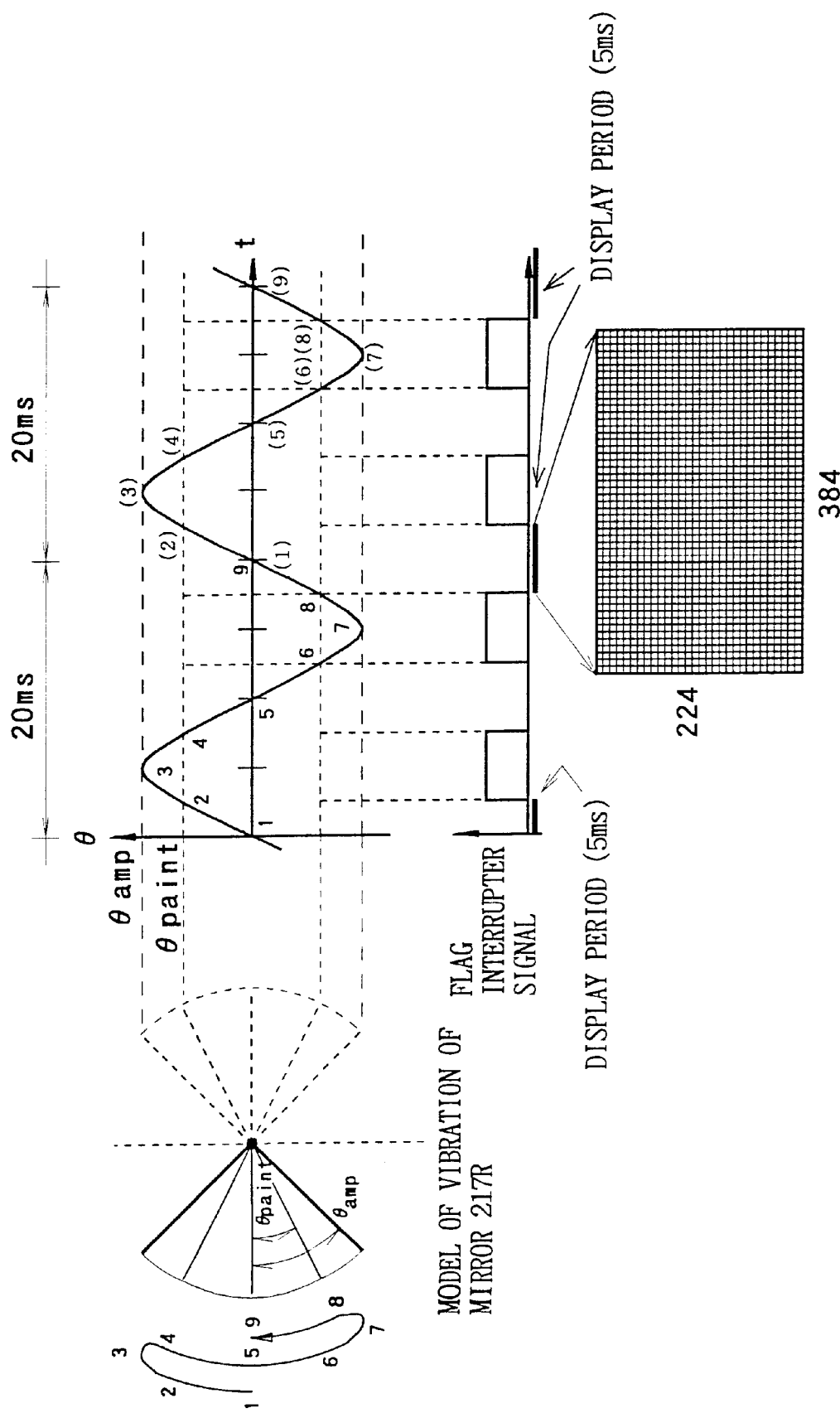
FIG. 33 is a diagram showing the relation between the vibration phase of the mirror and the display timing in the display system on the right side.

FIG. 32 and FIG. 33 show the relation between the vibration phase of the mirror and the display timing in the left and right display systems, respectively. If the vibration frequency of each mirror 217L and 217R is 50 Hz (one period is 20 ms), the abscissa shows a time and the ordinate shows the vibration angle, movements of the mirrors 217L and 217R are sine-wave vibrations shown in FIG. 32 and FIG. 33, respectively. The left and right mirrors vibrate in synchronization with each other, but their phases are shifted by 180° so that the left and right image display periods will not overlap. If one period 20 ms is equally divided into eight, the movement of the mirrors and the sine wave correspond as the numbers 1 to 9 in FIG. 32 and FIG. 33. When it vibrates repeating the movement from 1 to 9, the angular velocity of the mirror is not constant. However, when it moves from 4 to 6, or 8 to (2), the angular velocity is relatively stable. Display by the LED array is made in the period from 4 to 6 in the left display system, and in the period from 8 to (2) in the right display system to lessen distortion in the vicinity of left and right ends of the screen. The display period corresponds to ¼ of the period, which is about 5 ms. The number of dots of the LED array is 224. As the LED arrays 214L and 214R light 384 times with appropriate timing in the above display period, screens with transverse 384×vertical 224=86016 dots are formed in the left and right display systems. The screen is called an image screen.

Figure 34:
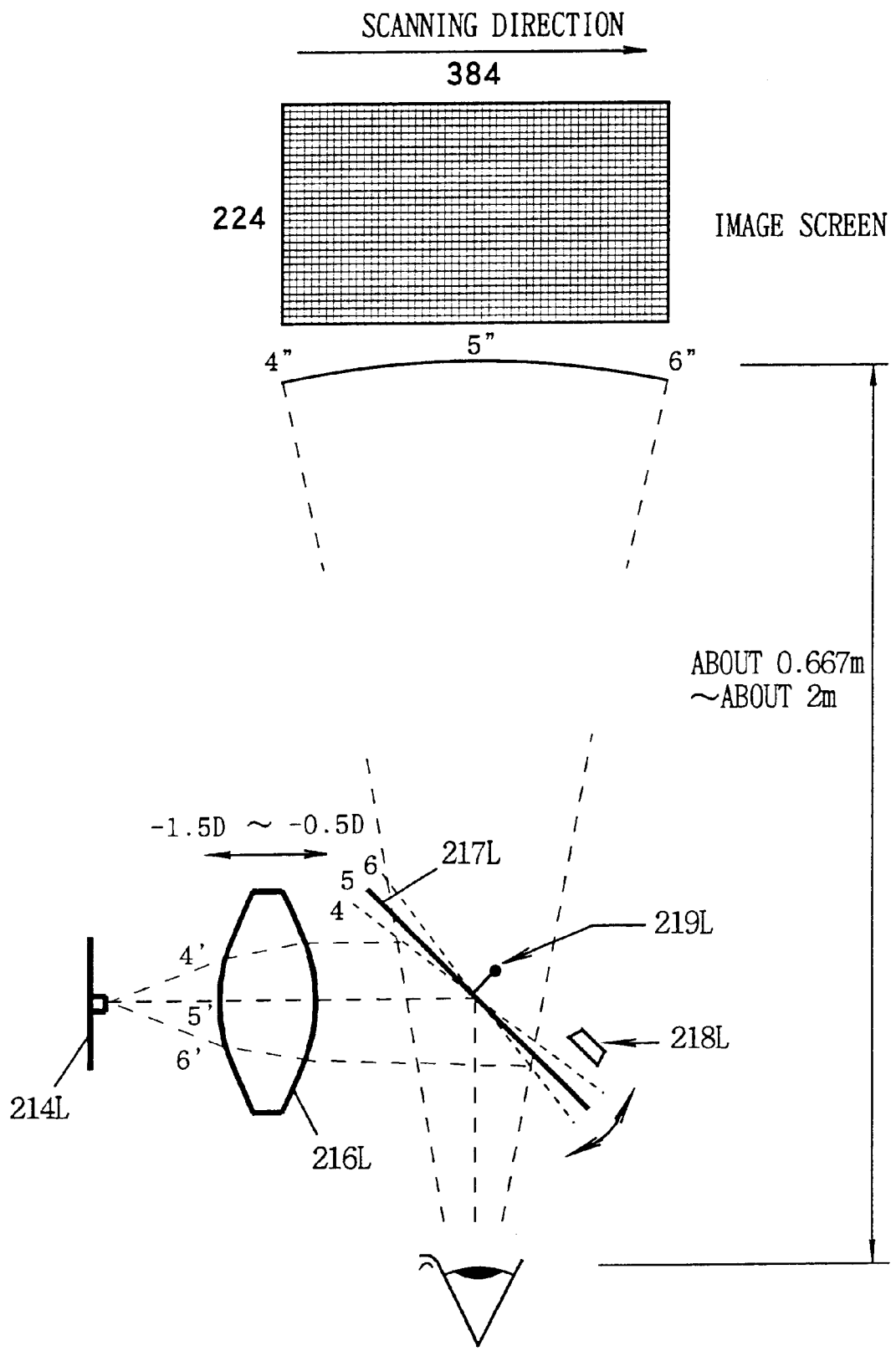
FIG. 34 is a diagram showing a position where the image screen is projected in the display system on the left side.

FIG. 34 shows a position where the image screen is projected in the left display system by way of example. In FIG. 34, numbers 4, 5 and 6 correspond to the position numbers in FIG. 32. The LED array 214L is turned on when the angular velocity of the mirror 217L is relatively stable, as stated above, so that the image screen will be scanned while the mirror 217L moves from 4 to 6. When the position of the mirror 217L is at 4, the light of the LED array 214L passes through the lens 216L at the position of 4' and draws an image screen at the position of 4". It is the same when the mirror 217L moves to the positions 5, 6, and it draws the image screen at 5", 6". Accordingly, the direction of scanning the screen is from the left to the right. Since human visibility (so called visual acuity) individually differs, it is necessary to move the lens 216L to focus upon the screen. This is referred to as visibility adjustment. Some kinds of positions of the lens for visibility adjustment are prepared. For example, if the lens 216L is moved to the position −1D, the image screen is seen about one meter distant. Although FIG. 34 shows the display system on the left side, it is the same in the display system on the right side, and the scanning direction of the screen is also from the left to the right.

Figure 35:
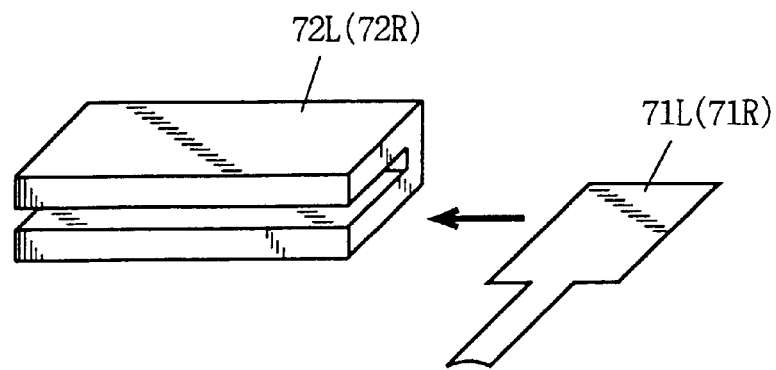
FIG. 35 is a diagram showing a photointerrupter and a flag.

The mirrors 217L, 217R a revibrated by the motor drive/sensor circuits 215L, 215R, respectively. The periods, amplitudes, phase, offset, etc., of the vibration of the mirrors can be detected with signal output from the motor drive/sensor circuits 215L and 215R. This signal is called a flag signal, which is generated by a flag 71L (or 71R) passing through a photointerrupter 72L (or 72R), as shown in FIG. 35. On the basis of the flag signal, the mirror control circuit 211 performs servo control for forming a stable screen (correction, stabilization of vibration of the mirrors) or informs the image processing IC 223 of timing for image display (in FIG. 32, the position of 4 is an image display start timing).

Figure 36:
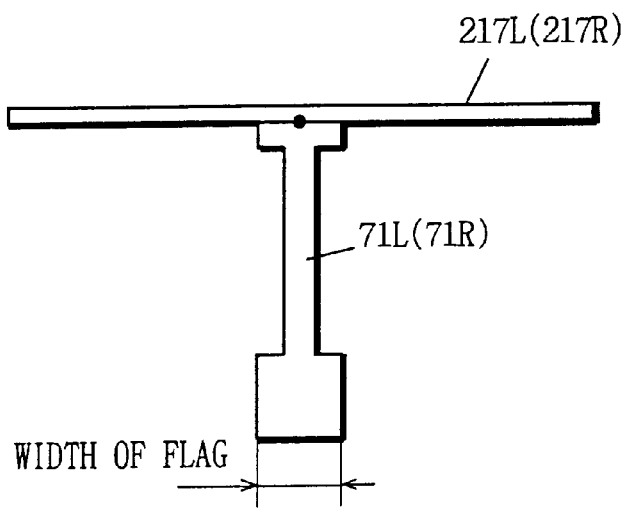
FIG. 36 is a diagram showing the flag attached to the mirror.

As shown in FIG. 36, the flag 71L (or 71R,) is a small piece made of resin attached to the mirror 217L (or 217R) for light shielding of the photointerrupter. The width of the flag is selected so that the period in which the flag shields the photointerrupter and the image display period correspond to each other. Thus, the number of vibrations of the mirrors, disorder of the amplitude, offset, phases of the mirrors and the image display start timing can be detected from the output waveform of the photointerrupter.

Figure 37:
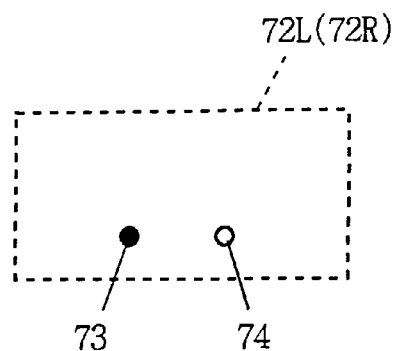
FIG. 37 is a diagram showing two interrupters provided in the photointerrupter.

The photointerrupter 72L (or 72R) has two sets of interrupters 73 and 74 inside, as shown in FIG. 37. Each interrupter includes a set of a light emitting element and a light receiving element disposed to face each other at a certain space, and passage of the flag between the light emitting element and the light receiving element shields the light receiving element and its output falls from a high level to a low level. Detection output of one interrupter (flag interrupter) 73 is used to detect a position of the flag, and detection output of the other interrupter (direction interrupter) 74 is used to detect a direction of movement of the flag. Accordingly, the space between the interrupters 73 and 74 is selected smaller than the width of the flag.

Figure 38A:
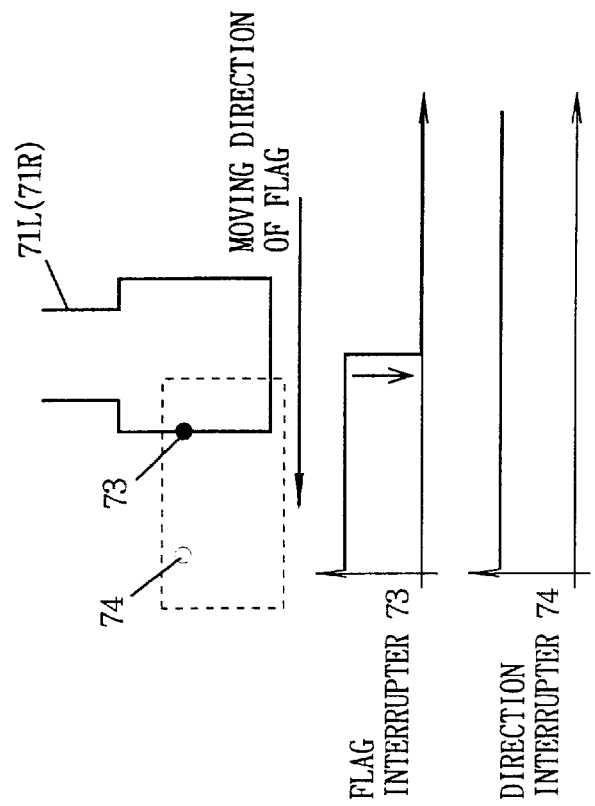
FIGS. 38(a) and 38(b) are diagrams showing the relation between an output state of the photointerrupter and a moving direction of the flag when an output of the flag interrupter falls.
Figure 38B:
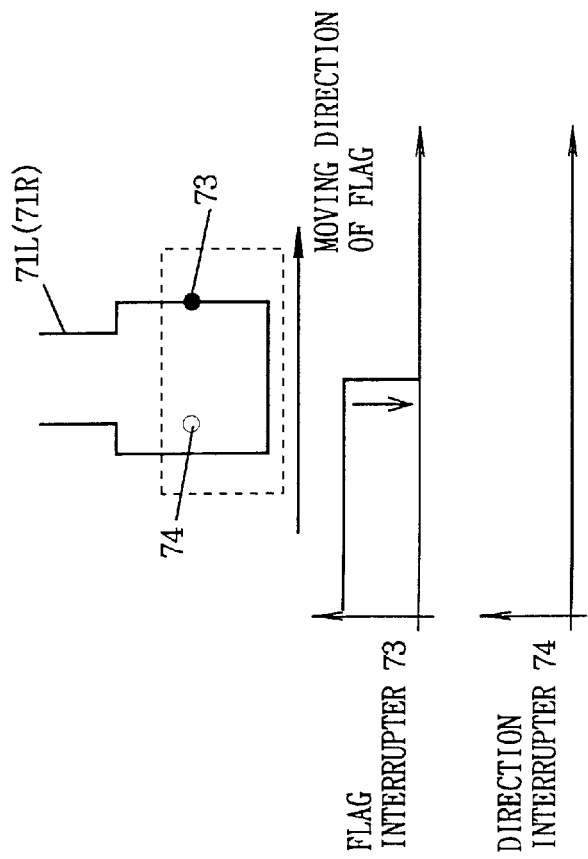
Figure 39A:
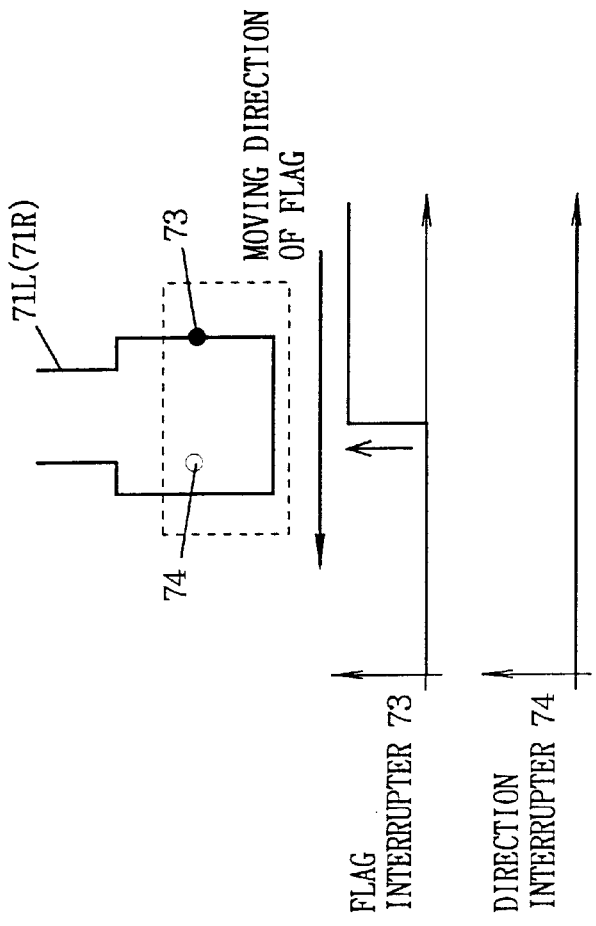
FIGS. 39(a) and 39(b) are diagrams showing the relation between an output state of the photointerrupter and a moving direction of the flag when an output of the flag interrupter rises.
Figure 39B:
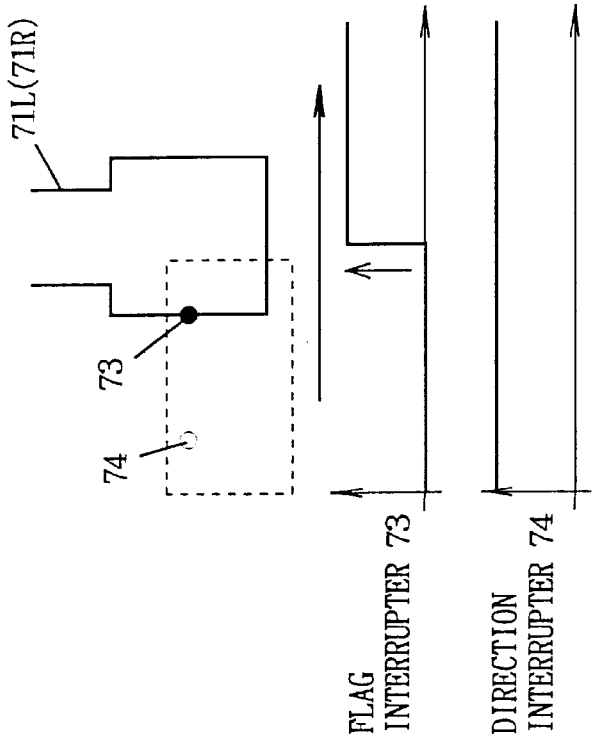

FIG. 38 and FIG. 39 show the relation between the output state of the photointerrupter and the direction of movement of the flag. FIG. 38 shows the direction detection when the output of the flag interrupter 73 falls, and FIG. 39 shows the direction detection when the output of the flag interrupter 73 rises. As shown in FIG. 38(a), if the output of the flag interrupter 73 falls when the output of the direction interrupter 74 is at a low level, it is determined that the moving direction of the flag is from the left to the right. As shown in FIG. 38(b), if the output of the flag interrupter 73 falls when the output of the direction interrupter 74 is at a high level, it its determined that the moving direction of the flag is from the right to the left. Also, as shown in FIG. 39(a), if the output of the flag interrupter 73 rises when the output of the direction interrupter 74 is at a high level, it is determined that the moving direction of the flag is from the left to the right. Further, as shown in FIG. 39(b), if the output of the flag interrupter 73 rises when the output of the direction interrupter 74 is at a low level, it is determined that the moving direction of the flag is from the right to the left.

As described above, screen display is made in a period in which the angular velocity of the mirrors is stable in this embodiment. More strictly, however, the angular velocity of the mirrors (scan speed) is not constant even in this period. Therefore, correction is needed.

A vertical line of the image screen is referred to as a column, and there are 384 columns in total. The column width (a space between vertical lines) on the image screen depends on the timing of lighting the LED. FIG. 40 shows a letter "D" displayed in the center and in an end portion on the image screen. If the timing pitch of lighting the LED array is the same in the center and the end on the image screen, it looks as if it were shrunken in the lateral direction in the end portion or, on the other hand, it looks as if it were elongated in the lateral direction in the center. This is due to the fact that the timing of turning on the LED is made with the same timing pitch, though the angular velocity (scan speed) of the mirror at 5 is faster than the angular velocity (scan speed) at 4, 6. That is to say, in FIG. 40, the timing pitch PPC of lighting the LED array in the center of the image screen is equal to the timing pitch PPE in the end portion.

It is necessary to change the LED light emitting timing pitch according to the scanning speed to display figures, letters, etc., without distortion with the same column width in the center and in the end portion on the image screen. That is to say, as shown in FIG. 41, correction is needed to make the LED light emitting timing pitch PPC shorter as it is closer to the center of the image screen and to make the timing pitch PPE longer as it gets closer to the end portion. This allows equal scan of widths of respective columns. The LED light emitting pulse width (PWC, PWE) is made constant in the case of the same luminance to make brightness in the end portion and in the center on the image screen uniform.

A table storing timing data for correcting the LED lighting timing pitch is called a column table. This column table is stored in the area 416 of the program memory 41 (refer to FIG. 5), which is transferred to the area 2254 in the image work memory 225 in the body device according to the program when the power is turned on. The image processing IC 223 controls the LED lighting timing referring to the column table developed in the image work memory 225. The start address of the column table is transferred as 8-bit serial data from the mirror control circuit 211 which controls movement of the mirrors.

The column table includes extra timing data for about 68 columns×2, supposing offset of the mirror, or external disorder, as well as the timing data for 384 columns. In this embodiment, the LED lighting timing pitch can be set for every 4 columns. Accordingly, if 4 columns are taken as 1 entry, the number of entries of the column table is 17+96+17=130 (=520 columns).

Figure 42:
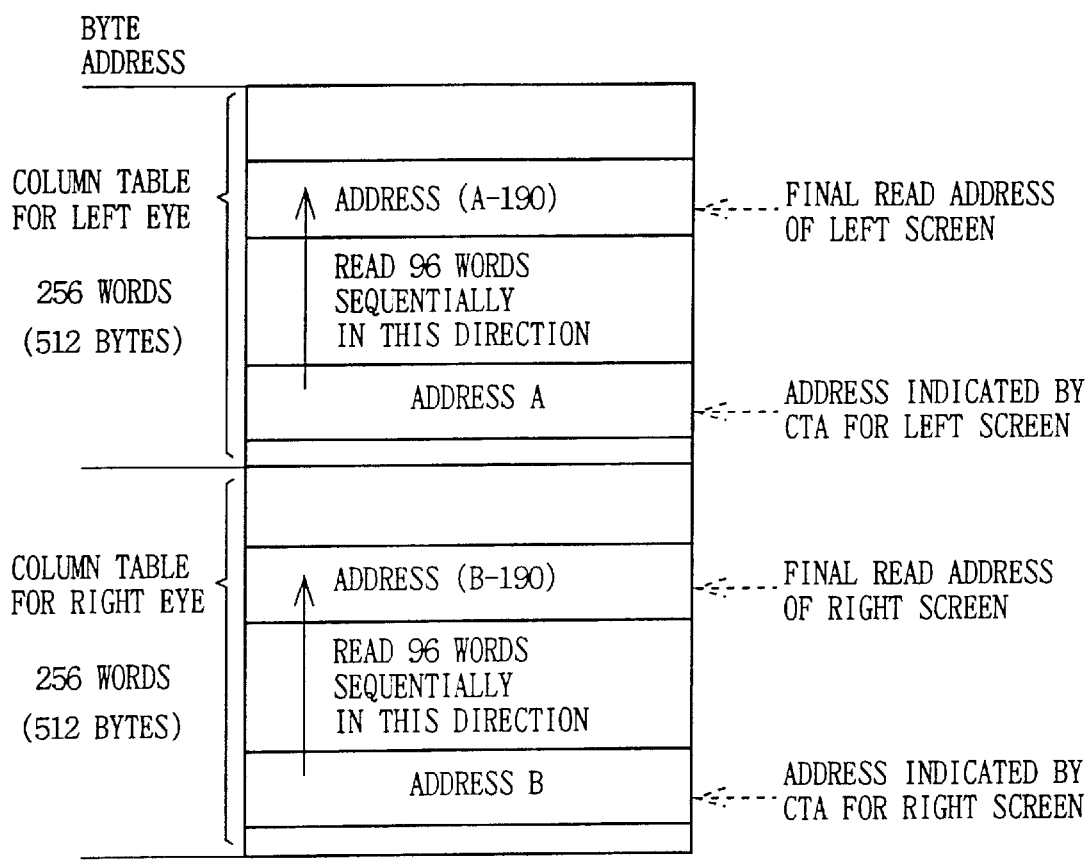
FIG. 42 is a diagram showing arrangement in a column table on the image work memory.
Figure 43:
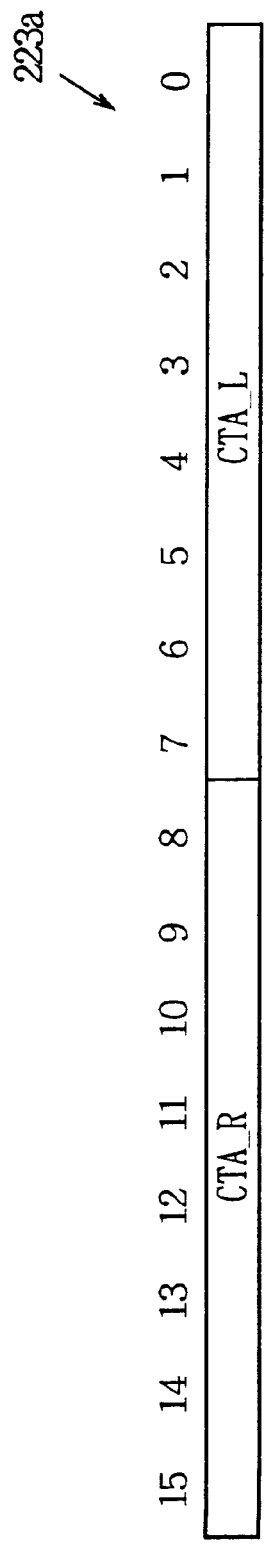
FIG. 43 is a diagram showing a register for storing the column table reference start address CTA provided in the image processing IC.

FIG. 42 shows arrangement in the column table on the image work memory 225. As shown in FIG. 42, the column table is allocated on the image work memory 225 as a 512-word data array. The image processing IC 223 receives the column table reference start address CTA from the mirror control circuit 211. This column table reference start address CTA is automatically transferred from the mirror control circuit 211 when display on the left screen is started (when L_SYNC rises) as 8-bit data corresponding to those for the left eye and the right eye. The transferred column table reference start address CTA is set in a register 223a in the image processing IC 223 (refer to FIG. 43). In FIG. 43, the CTA_L. is a column table reference start address for the left and the CTA_R is a column table reference start address for the right. The image processing IC 223 reads the timing data COLUMN_LENGTH from a corresponding entry in the column table on the basis of the column table reference start address CTA set in the internal register 223a and sets it in the internal register 223b (refer to FIG. 44). The timing data COLUMN_LENGTH is a numerical value defining one column time with resolution of 200 ns. The reading of the timing data from the column table is made once for 4 columns. It is made 96 (=384/4) times respectively for the left eye and the right eye in one display frame period, 192 times in total.

In FIG. 42, for example, if the timing data is read from the address A in the column table for the left eye (an address indicated by the column table reference start address for the left CTA_L) when starting left screen display, and then, the timing data is read out in the order from addresses (A-2), (A-4), . . . in byte address. As stated above, this reading is made once for 4 column time, 96 (=384/4) times for the left eye and the right eye, respectively, in one display frame period. The final read address for the left screen is the address (A-95×2)=(A-190). Similarly, timing data of the address B—address (B-190) are read from the column table for the right eye.

This embodiment also has a function of special display, such as waving the display screen, by rewriting the timing data in the column table into special data string according to instructions from the game program.

Next, display operation in this embodiment will be described. When the power is turned on into the body device 2 through the controller 6, the CPU 221 activates the game program and transfers the column table stored in the program memory 41 of the program cartridge 4 to the area 2254 in the image work memory 225. Now, if the game has already started, the left and right mirrors 217L and 217R are vibrating with the period of 20 ms in synchronization with the synchronous clock FCLK produced from an internal oscillator (not shown) in the mirror control circuit 211. At this time, the flags 71L and 71R pass in the photointerrupters 72L, 72R (refer to FIG. 35) and then 2-bit flag signals are provided from the photointerrupters 72L and 72R to the motor drive/sensor circuits 215L and 215R, respectively. In the 2-bit flag signal, one bit is an output signal of the flag interrupter 73, and the other bit is an output signal of the direction interrupter 74 (refer to FIG. 37) The motor drive/sensor circuits 215L and 215R shape the waveforms of the provided flag signals and then outputs them to the mirror control circuit 211.

The mirror control circuit 211 determines the moving direction of the flag on the basis of a combination of the logic states of the 2 bits included in the flag signal (Refer to FIG. 38 and FIG. 39). Further, considering the result of the determination, the mirror control circuit 211 detects timing of starting a display period of the left screen (refer to FIG. 32) and the timing of starting a display period of the right screen (refer to FIG. 33). At this time, the mirror control circuit 211 raises the left display start signal L_SYNC in response to the detection of the timing of starting the display period of the left screen and raises the right display start signal R_SYNC in response to the detection of the timing of starting the display period of the right screen. The mirror control circuit 211 also generates low order 8-bit data CTA (CTA_L and CTA_R) of the column table reference start address in response to the detection of the timing of starting the display period of the left and right screens.

Figure 45:
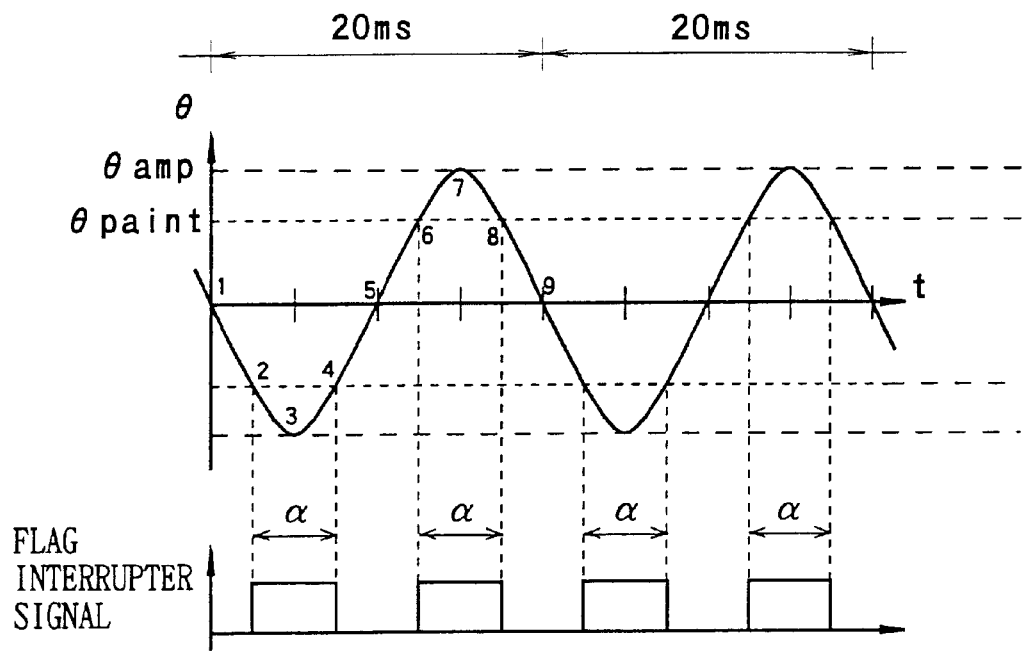
FIG. 45 is a diagram showing the relation between the vibration phase of the mirror and a flag interrupter signal when the mirror has no offset.
Figure 46:
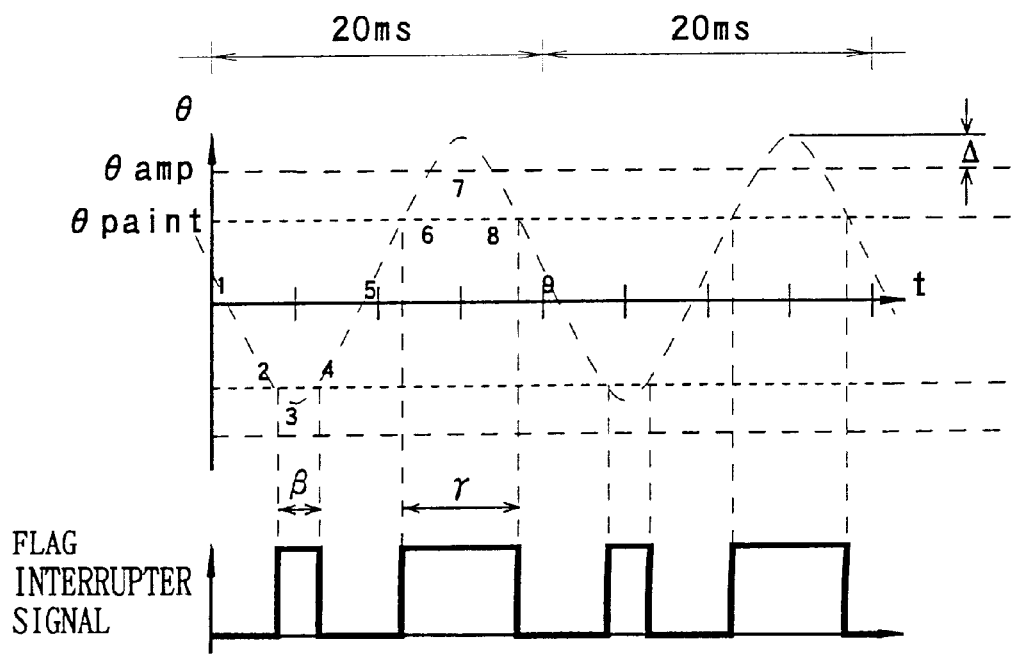
FIG. 46 is a diagram showing the relation between the vibration phase of the mirror and a flag interrupter signal when the mirror has offset.

Now, a method of generating the column table reference start address CTA will be described. FIG. 45 shows the relation between the vibration phase of the mirror without offset and the output signal of the flag interrupter 73 (hereinafter referred to as a flag interrupter signal). FIG. 46 shows the relation between the vibration phase of the mirror with offset and the flag interrupter signal. The offset of the mirror is caused by errors in assembling, external disorder, (for example, when the game device is inclined during use), etc. If the mirror has no offset, the pulse widths α of the high level portions of the flag interrupter signal are equal every time, as shown in FIG. 45. On the other hand, when the mirror has offset, the pulse widths of the high level portions of the flag interrupter signal have different values for the first and last pulse widths (the pulse width β from 2 to 4 and the pulse width γ from 6 to 8) in one period (20 ms), as shown in FIG. 46. Here, the ratio of the pulse widths of the high level portions in one period (β/γ) corresponds to the quantity of offset Δ of the mirror. The column table reference start address must be changed in accordance with this quantity of offset Δ. This is due to the fact that the vibration phase (angle range) of the mirror used to display images differs between when the mirror has offset and when it has no offset. Accordingly, the mirror control circuit 211 computes a ratio between pulse widths of the high level portions in the display period immediately before and obtains the column table reference start address CTA on the basis of the result of this computation. Conversion from the ratio of pulse widths into the column table reference start address CTA may be achieved by using a conversion table, or may be achieved by calculation.

The synchronous clock FCLK, the left display start signal L_SYNC and the right display start signal R_SYNC are provided from the mirror control circuit 211 to the image processing IC 223. Further, from the mirror control circuit 211 to the image processing IC 223, after the left display start signal L_SYNC is provided, the column table reference start address for the left, CTA_L, is provided, and then the column table reference start address CTA_R for the right is provided. The image processing IC 223 controls the left and right LED drivers 213L and 213R on the basis of these signals and column table reference start addresses provided from the mirror control circuit 211.

Figure 47:
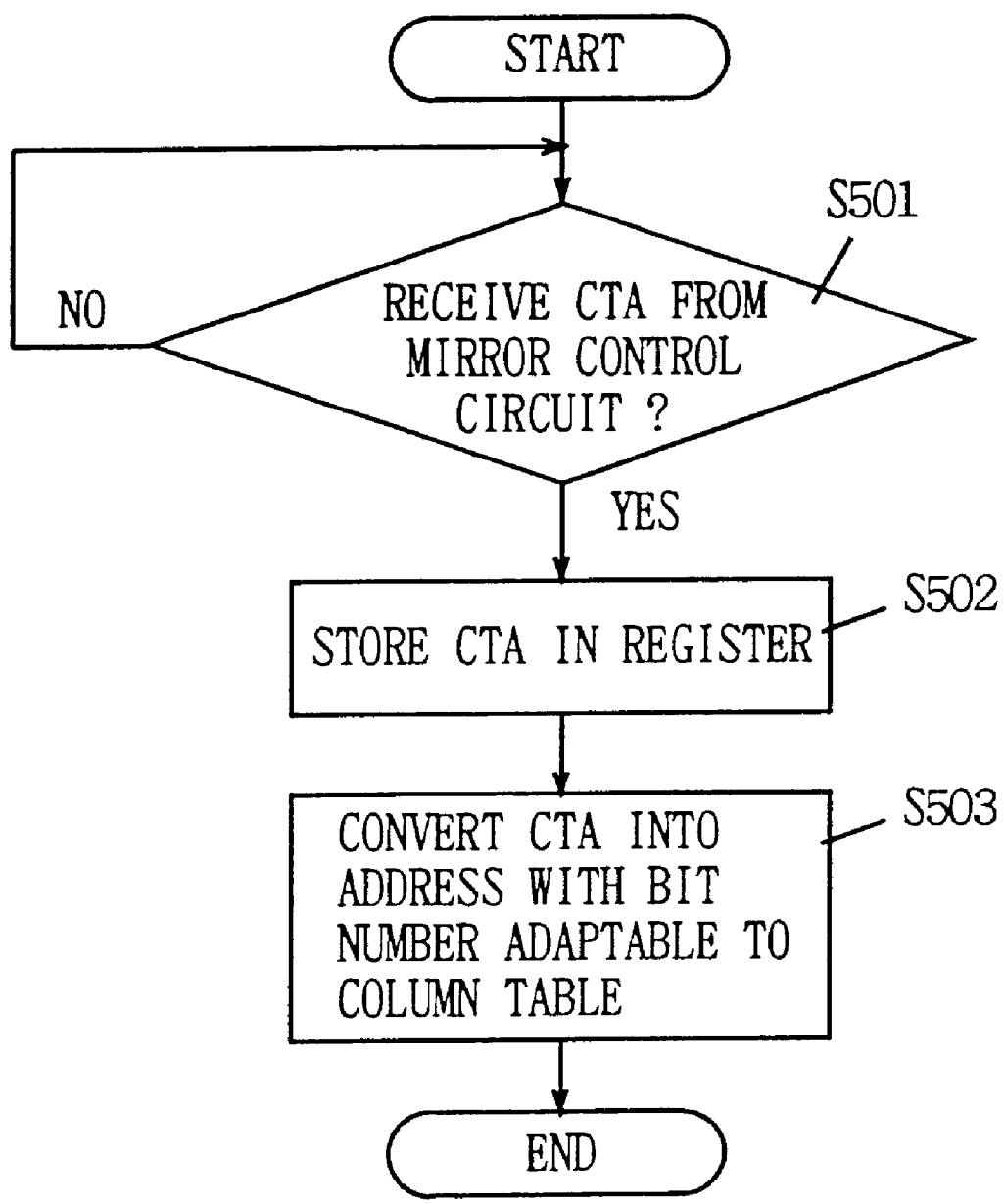
FIG. 47 is a flow chart showing the operation when the image processing IC receives serial data from the mirror control circuit.

FIG. 47 shows operation when the image processing IC 223 receives the serial data from the mirror control circuit 211. Referring to FIG. 47, receiving each 8-bit serial data, i.e. the column table reference start addresses CTA_L and CTA_R from the mirror control circuit 211 (Step S501), the image processing IC 223 stores the column table reference start addresses CTA_L and CTA_R into predetermined areas in the register 223a (refer to FIG. 43), respectively. (Step S502) Next, the image processing IC 223 adds a predetermined number of offset bits to the column table reference start address CTA_L or CTA_R stored in the register 223a to convert the column table reference start address CTA_L or CTA_R into an address with the number of bits adaptable to the addressing of the column table (Step S503).

The image processing IC 223 starts reading the timing data from the column table according to the column table reference start address for the left or the right obtained in the Step S503.

Figure 48:
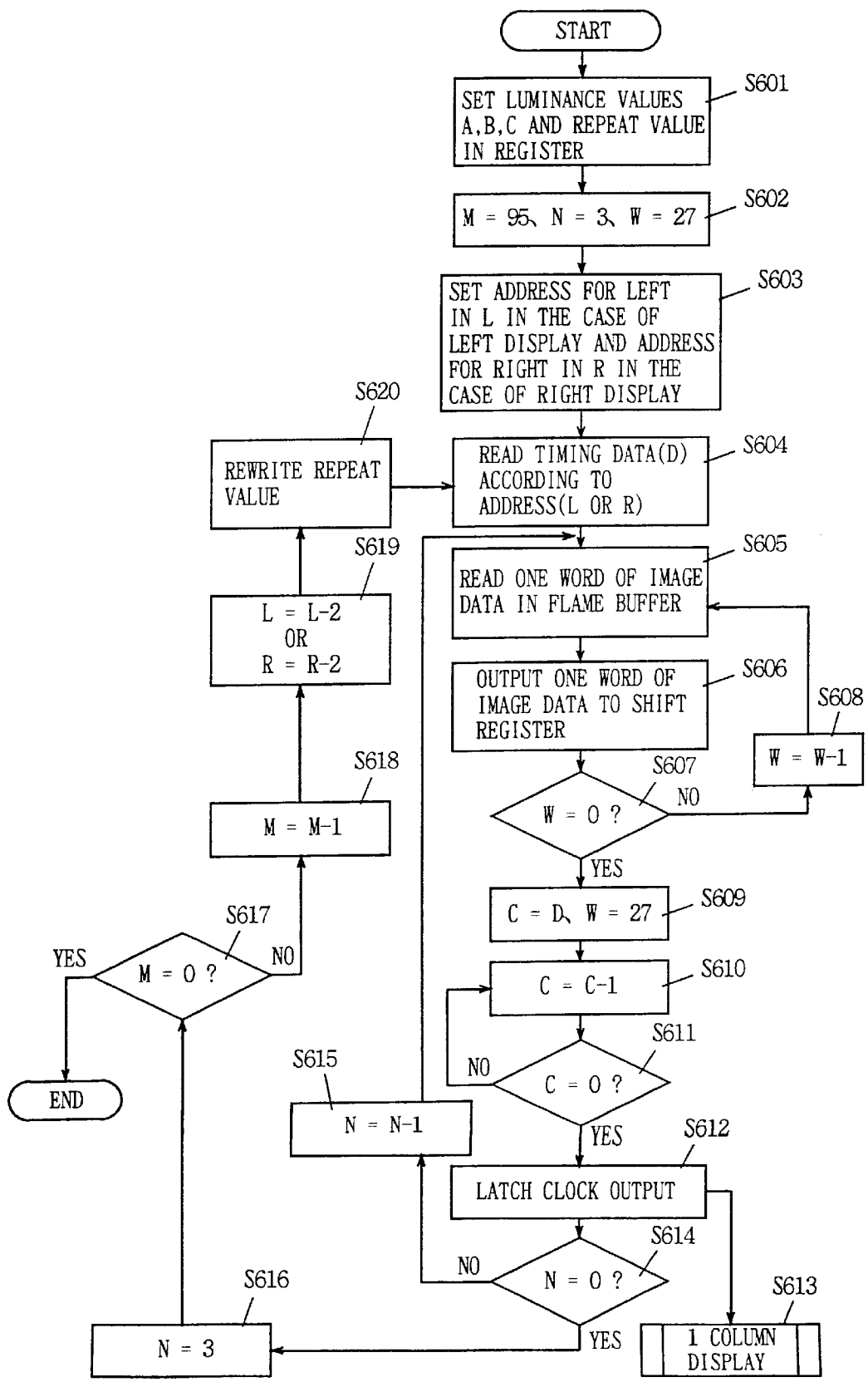
FIG. 48 is a flow chart showing the operation when the image processing IC reads timing data from the column table and displays image data.

FIG. 48 shows the operation when the image processing IC 223 reads the timing data from the column table to control display. Referring to FIG. 48, the image processing IC 223 first takes luminance values A, B, C and a repeat value outputted from the CPU 221 to store them in a prescribed area of the internal register 223b in FIG. 44 (Step S601). The CPU 221 outputs the luminance values A, B, C and the repeat value according to the described content of the game program stored in the area 411 (refer to FIG. 5) of the program memory 41.

Next, the image processing IC 223 sets initial values in the counters M, N, W (Step S602). The counter M is a counter for counting columns of 384 on the screen for every four columns, and the initial value set therein is 95. This initial value 95 is based on 384/4=96. The counter N is a counter for counting four columns corresponding to one count value of the counter M, and the initial value set therein is 3. The counter W is a counter for counting the remaining number of transmission for the image data transmitted by eight dots (=16 bits) from the SAM 2247 in FIG. 9 to fill one column, and the initial value set therein is 27. This initial value 27 is based on 224/8=28.

Next, the image processing IC 223 sets the column table reference start address for the left or right obtained in the Step S503 into an internal register L or R (not shown) (Step S603). That is to say, the image processing IC 223 sets the column table reference start address for the left into the register L when displaying a left image (when the left display start signal L_SYNC rises) and sets the column table reference start address for the right into the register R when displaying a right image (when the right display start signal R_SYNC rises).

Next, the image processing IC 223 reads timing data D from a corresponding address in the column table (stored in the area 2254 in the image work memory 225) according to the column table reference start address set in the register L or R (Step S604). Next, the image processing IC 223 reads one word (8 dots=16 bits) of the image data in the frame buffer in FIG. 9 (Step S605). Next, the image processing IC 223 provides one word of the image data read at Step S605 for the LED driver 212L or 212R through the SAM 2247 in FIG. 9 (Step S606).

Each of the LED drivers 212L and 212R includes a shift register 2131, a latch circuit 2132 and a luminance control circuit 2133. The shift register 2131 can accumulate one column (224 dots: 224×2=448 bits) of the image data transmitted from the SAM 2247 (refer to FIG. 9). The latch circuit 2132 latches the accumulated data of the shift register 2131 responding to a latch clock from the image processing IC 223. The luminance control circuit 2133 controls light-on, light-off and luminance at the LED arrays 214L or 214R on the basis of the image data latched by the latch circuit 2132. The one word of the image data transmitted from the SAM 2247 at the Step S606 are temporarily stored in the shift register 2131.

Next, the image processing IC 223 determines whether the count value of the counter W is 0 (Step S607). If the count value of the counter W is not 0, the image processing IC 223 decrements the counter W by 1 (Step S608) to return the operation to Step S605. When the count value of the counter W is 0 by repeating the Steps S60S to S608, i.e., when one column of the image data is stored in the shift register 2131, the image processing IC 223 sets the timing data D read at the Step S604 in the down counter C (Step S609). Next, the image processing IC 223 decrements the down counter C by 1 (Step S610). The down counter C is decremented periodically, every 200 ns in this embodiment. When the count value of the down counter C has been decremented to 0 (Step S611), i.e., when a carrier signal is outputted from the down counter C, the image processing IC 223 outputs the latch clock (Step S612). This latch clock is provided to the latch circuit 2132 in the LED driver 212L or 212R.

The latch clock from the image processing IC 223 is provided to the LED driver 212L or 212R, and then the image data for one column accumulated in the shift register 2131 is latched in the latch circuit 2132 to be provided to the luminance control circuit 2133. The light-on/off state of each LED in the LED array 214L or 214R is thus controlled. Consequently, one vertical column display is performed on the left or right screen (Step S613). At this time, the image processing IC 223 causes image data for the next column to be transferred from the SAM 2247 to the shift register 2131.

Since 2 bits of data for 1 dot is used in this embodiment, only four levels of tone representation can be originally performed. In this embodiment, however, correspondences between the tone value represented by 2 bit data and luminance (lighting period) of each LED can be freely changed according to the instruction on the game program, whereby the substantially representable number of tones dramatically increases. For example, when the luminance of the LED can be adjustable in the range of 0 to 30, the luminance control circuit 2133 sets the luminance to 0 (the LED is lit off), any one of 1 to 10, any one of 11 to 20 and any one of 21 to 30 when the tone value of 2 bits is 00, 01, 10, and 11, respectively. The luminance can be thus freely changed in the range of 0 to 30. The instruction how correspondences between the tone values 01, 10, 11 and the luminance of the LED is set is described on the game program.

The CPU 221 time-sequentially changes the luminance values A, B, C (set at the Step S601) set in the internal register 223b of the image processing IC 223 (according to the instruction from the game program). In this embodiment, the luminance values A, B, C can be changed by each one screen. Consequently, the representable number of tones is four in the range of one screen, while the available number of tones substantially increases between different screens. That is, since a display time for one screen is extremely short, it appears to the observer as if more than five kinds of luminance distributedly represented on several time-sequential screens actually existed on one screen.

Further, in this embodiment, control of the number of lighting of the LED for one dot display also increases the substantially representable number of tones. The lighting number of the LED is determined by the repeat value set in the internal register of the image processing IC 223 at the Step S601. In this embodiment, the repeat value can be changed by four columns. As a result, while the representable number of tones in the range of four columns is 4, the substantially representable number of tones extremely increases in the entire screen.

Figure 49:
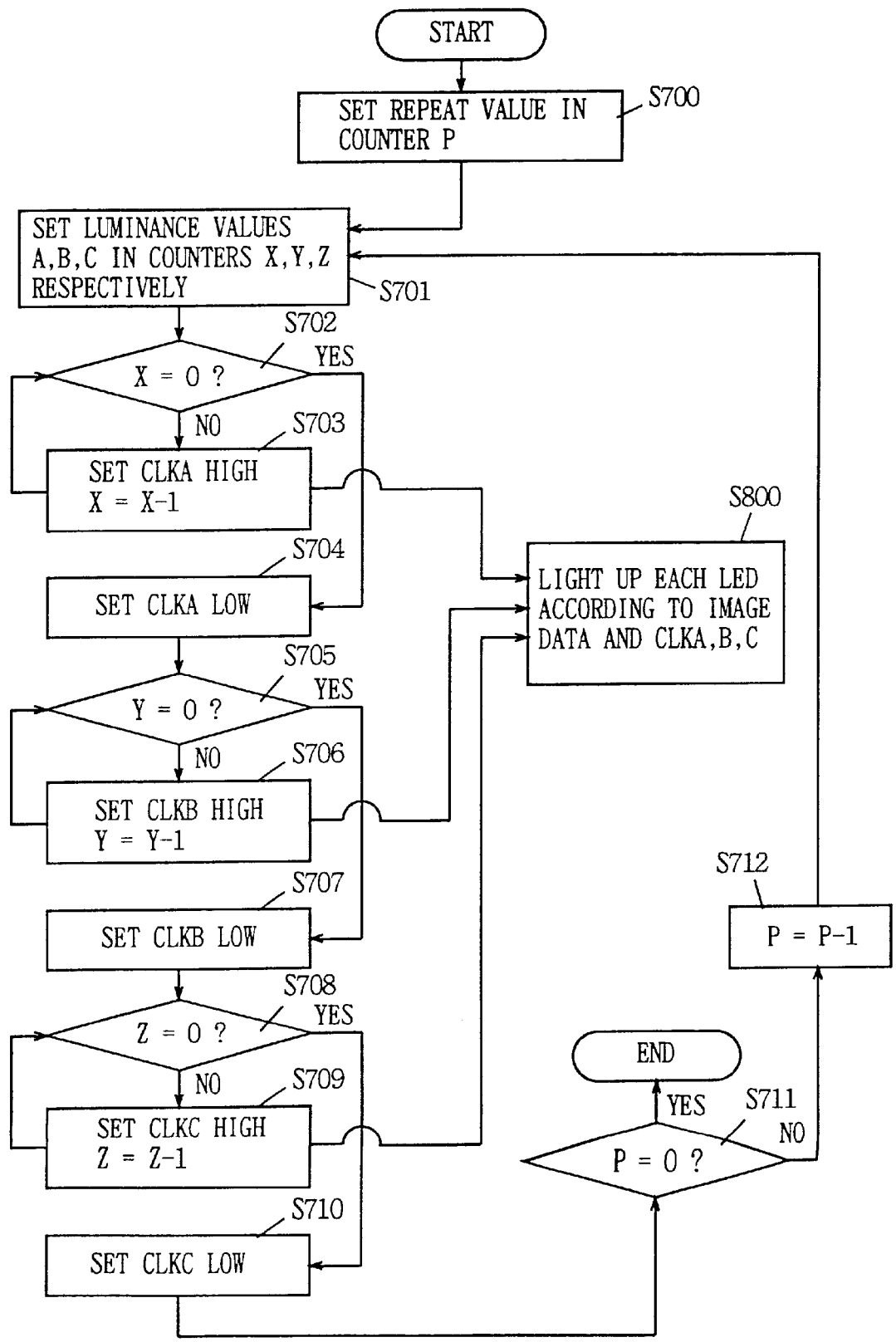
FIG. 49 is a flow chart showing more detailed operation of the one column display routine S613 in FIG. 48.

FIG. 49 is a flow chart showing more detailed operation of the one column display routine at Step S613 in FIG. 48.

Figure 44:
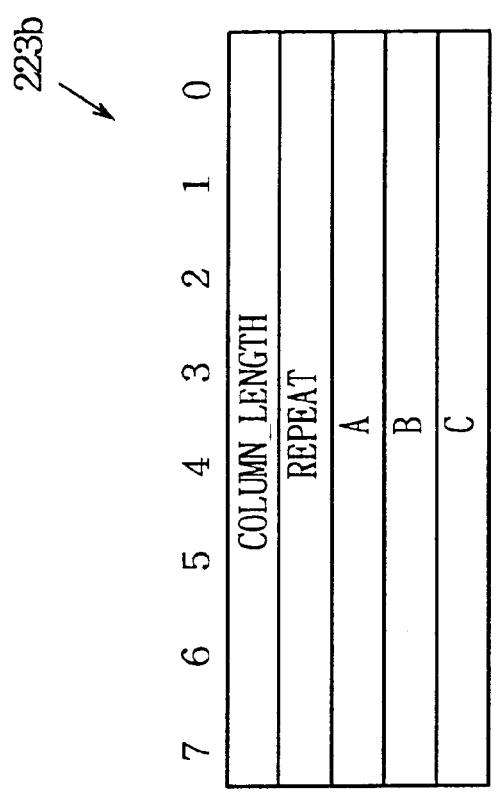
FIG. 44 is a diagram showing a register for storing timing data, a repeat value and a luminance value provided in the image processing IC.
Figure 50:
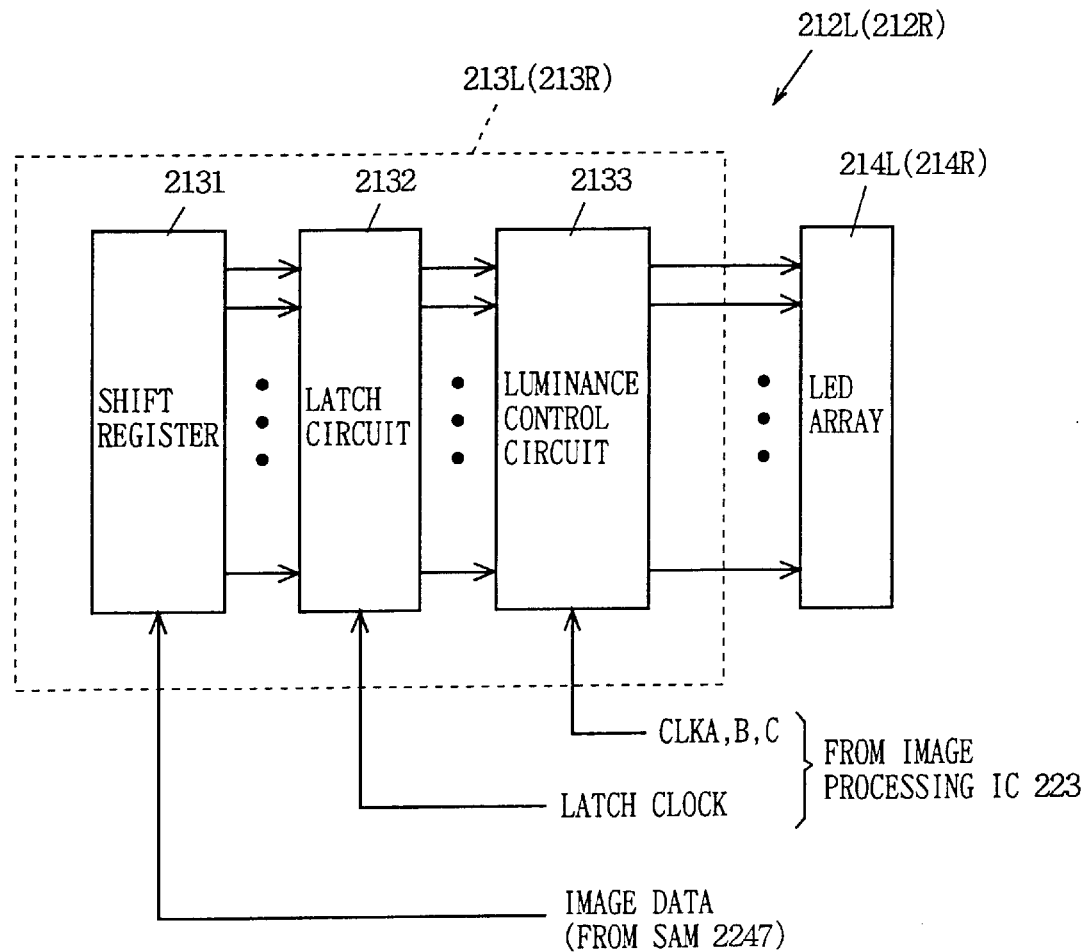
FIG. 50 is a block diagram showing more detailed structure of the LED unit.

Referring to FIG. 49, the image processing IC 223 sets the repeat value stored in the internal register 223b in FIG. 44 in the internal counter P (Step S700). Next, the image processing IC 223 sets the luminance values A, B, C stored in the internal register 223b in FIG. 44 in the internal counters X, Y, Z, respectively (Step S701). Next, the image processing IC 223 determines whether the count value of the counter X is 0 (Step S702). When the count value of the counter X is not 0, the image processing IC 223 sets a clock A to a high level decrements the counter X by 1 (Step S703). On the other hand, when the count value of the counter X is initially 0, or when the count value of the counter X is 0 by repeating the Steps S701 and S702, the image processing IC 223 sets the clock A to a low level. Through these operations, the clock A is generated with a pulse width corresponding to the luminance value A to be provided to the luminance control circuit 2133 in FIG. 50. Similarly, a clock B is generated with a pulse width corresponding to the luminance value B to be provided to the luminance control circuit 2133 at Steps S705 to S707, and a clock C is generated with a pulse width corresponding to the luminance value C to be provided to the luminance control circuit 2133 at Steps S708 to S711.

The luminance control circuit 2133 controls the light-on/off state of each LED in the LED array 214L or 214R, according to one column of the image data provided by the latch circuit 2132 and the clocks A, B, C provided by the image processing IC 223 (Step S800).

Figure 51:
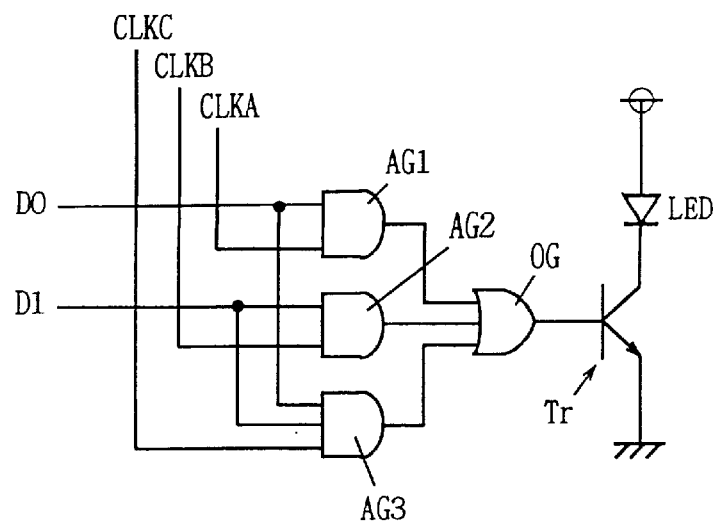
FIG. 51 is a diagram showing the structure of a lighton/off control circuit for one dot in the luminance control circuit 2133 in FIG. 50.

FIG. 51 is a diagram showing the structure of a light-on/off control circuit for one dot in the luminance control circuit 2133. In FIG. 51, the light-on/off control circuit includes three AND gates AG1 to AG3, an OR gate OG and a transistor Tr. The AND gate AGI is provided with the clock A and a lower bit of the image data for one dot D0. The AND gate AG2 is provided with the clock B and an upper bit of the image data for one dot D1. The AND gate AG3 is provided with the clock C and the upper bit D1 of the image data for one dot and the lower bit D0 thereof. The outputs from the AND gates AG1 to AG3 are provided to a base terminal in the transistor Tr through the OR gate OG. The light-on/off control circuit is provided for each LED in the LED array 214L or 214R.

Figures 52, 53:
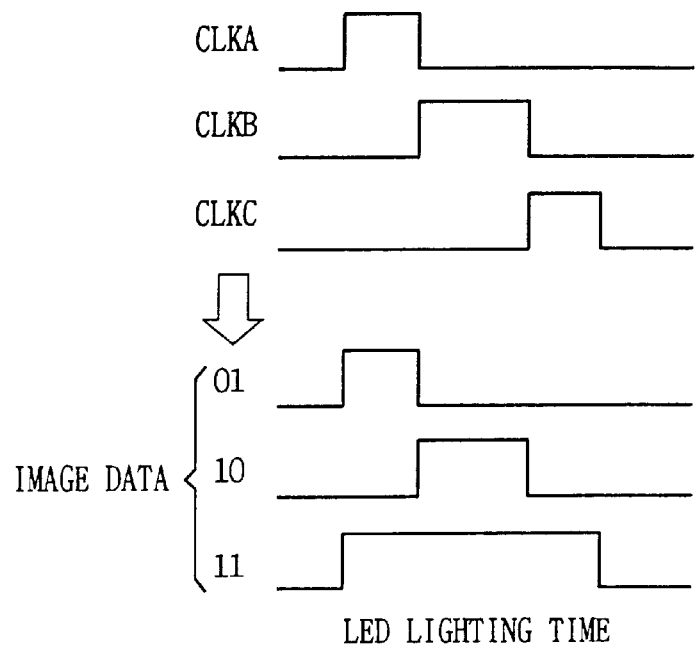
FIG. 52 is a timing chart describing the operation of the light-on/off control circuit in FIG. 51.
FIG. 53 is a diagram showing the relation between the logic state of the image data and the state of lighting of the LED.

FIG. 52 is a timing chart describing the operation of the light-on/off control circuit in FIG. 51. FIG. 53 is a diagram showing the relation between the logic state of the image data and the state of lighting of the LED. The operation of the lighting control circuit is subsequently described referring to FIGS. 52 and 53.

The upper bit D1 and the lower bit D0 of the image data are both 0 logic, all AND gates AG1 to AG3 are in a closed state, and all of their outputs are logic 0. Therefore, the base terminal of the transistor Tr is provided with a low level signal and the LED does not light up. When the upper bit D1 is logic 0 and the lower bit D0 is logic 1 in the image data, only the AND gate AG1 is in an open state, and the base terminal of the transistor Tr is provided with the clock A. Therefore, the LED lights up for a corresponding time to the pulse width of the clock A. When the upper bit D1 is logic 1 and the lower bit D0 is logic 0 in the image data, only the AND gate AG2 is in an open state, and the base terminal of the transistor Tr is provided with the clock B. Therefore, the LED lights up for a corresponding time to the pulse width of the clock B. When the upper bit D1 and the lower bit D0 in the image data are both logic 1, the AND gates AG1 to AG3 are all in an open state, and the base terminal of the transistor Tr is provided with all of the clocks A, B, C. Therefore, the LED lights up for a corresponding time to the entire pulse width of the clock A, B, C.

As described above, the light-on/off control circuit in FIG. 51 switches the lighting time of the LED according to the logic state of the image data. Therefore, the luminance of each dot changes according to the image data. The light-on/off control circuit switches the lighting time of the LED on the basis of the pulse widths of the clock A, B, C. Therefore, by changing each pulse width itself of the clock A, B, C, the correspondences between the tone value on the image data and the display luminance of dots can be changed. In this embodiment, change of setting each pulse width of the clocks A, B, C according to the instruction on the program increases the representable number of tones.

Returning to the flow chart in FIG. 49 again, after the Step S710, the image processing IC 223 determines whether the count value of the counter P is 0 (Step S711). When the count value of the counter P is not 0, the image processing IC 223 decrements the counter P by 1 (Step S712). The image processing IC 223 then returns to the operation at the Step S701 to repeat the operations at the Steps S701 to S710 for the number of times defined by the repeat value. When the count value of the counter P is 0, the image processing IC 223 ends the operation of one column display at the Step S613.

As described above, each dot in one column is displayed by intermittently lighting up the LED for the number of times defined by the repeat value. Therefore, in this embodiment, the correspondence between the tone value on the image data and the display luminance of the dots can be also changed by changing the repeat value. In this embodiment, when the dots of the same luminance are displayed, one of two methods can be selected: a method for displaying in 0 or the small number of repeat times by thickening each pulse width of the clock A, B, C, and a method for displaying in the large number of repeat times by narrowing each pulse width of the clock A, B, C.

Figure 55A:
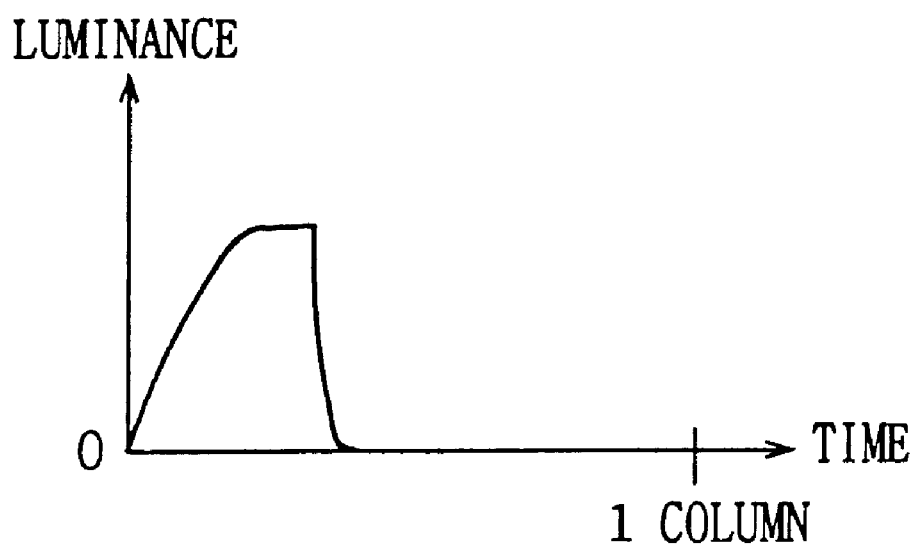
FIGS. 55(a) and 55(b) are diagrams showing the changing state of luminance under the conditions of FIG. 54, respectively.
Figure 55B:
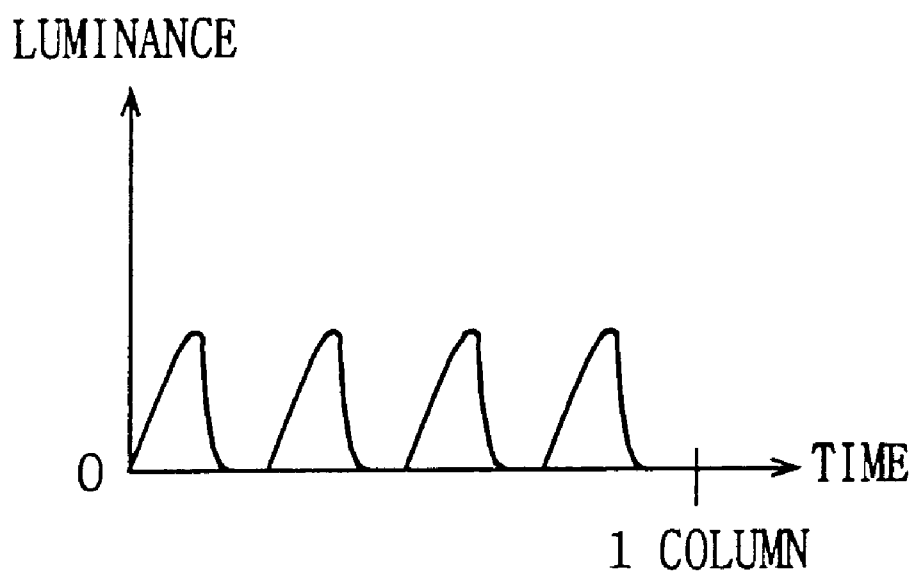

FIG. 54 shows a state of display of one LED lighting with the repeat value set to 0 (1) and a state of display of four LED lighting with the repeat value set to 3 (2). In the display state (1), the LED is continuously lit up at one time, and the relation between the luminance of the LED and time is such as shown in FIG. 55 (a). In this situation, since the interval until the next lighting is long, the dots seem to be rough. On the other hand, in the display state (2), since the LED lights up four times for displaying one dot, the relation between the luminance of the LED and time is such as shown in FIG. 55 (b). In this situation, while the brightness of the entire screen is a little darker, a joint part between dots seems smooth.

Returning to the flow chart in FIG. 48 again, the image processing IC 223 determines whether the count value of the counter N is 0 (Step S614). When the count value of the counter N is not 0, since image data display for four columns does not end, the image processing IC 223 decrements the counter N by 1 (Step S615). The image processing IC 223 then repeats the operations in Steps S605 to S614. When image data display for four columns ends and the count value of the counter N is 0, the image processing IC 223 sets the counter N to the initial value 3 (Step S616), and then determines whether the count value of the counter M is 0 (Step S617). When the count value of the counter M is not 0, since image data display for one screen does not end, the image data processing IC 223 decrements 1 the counter M by 1 (Step S618). Next, the image processing IC 223 decrements the column table reference start address for the left or right stored in the register L or R by two addresses in a byte address (Step S619). Thus, the timing data for the next column in the column table becomes an object of reading. Next, the image processing IC 223 rewrites the repeat value stored in the internal register 223b in FIG. 44 on the basis of the instruction from the CPU 221 (Step S620). The image processing IC 223 repeats the operations in the Steps S604 to S620. When display for one screen ends, the count value of the counter M is 0, and the image processing IC 223 terminates reading of the timing data from the column table.

Figure 56:
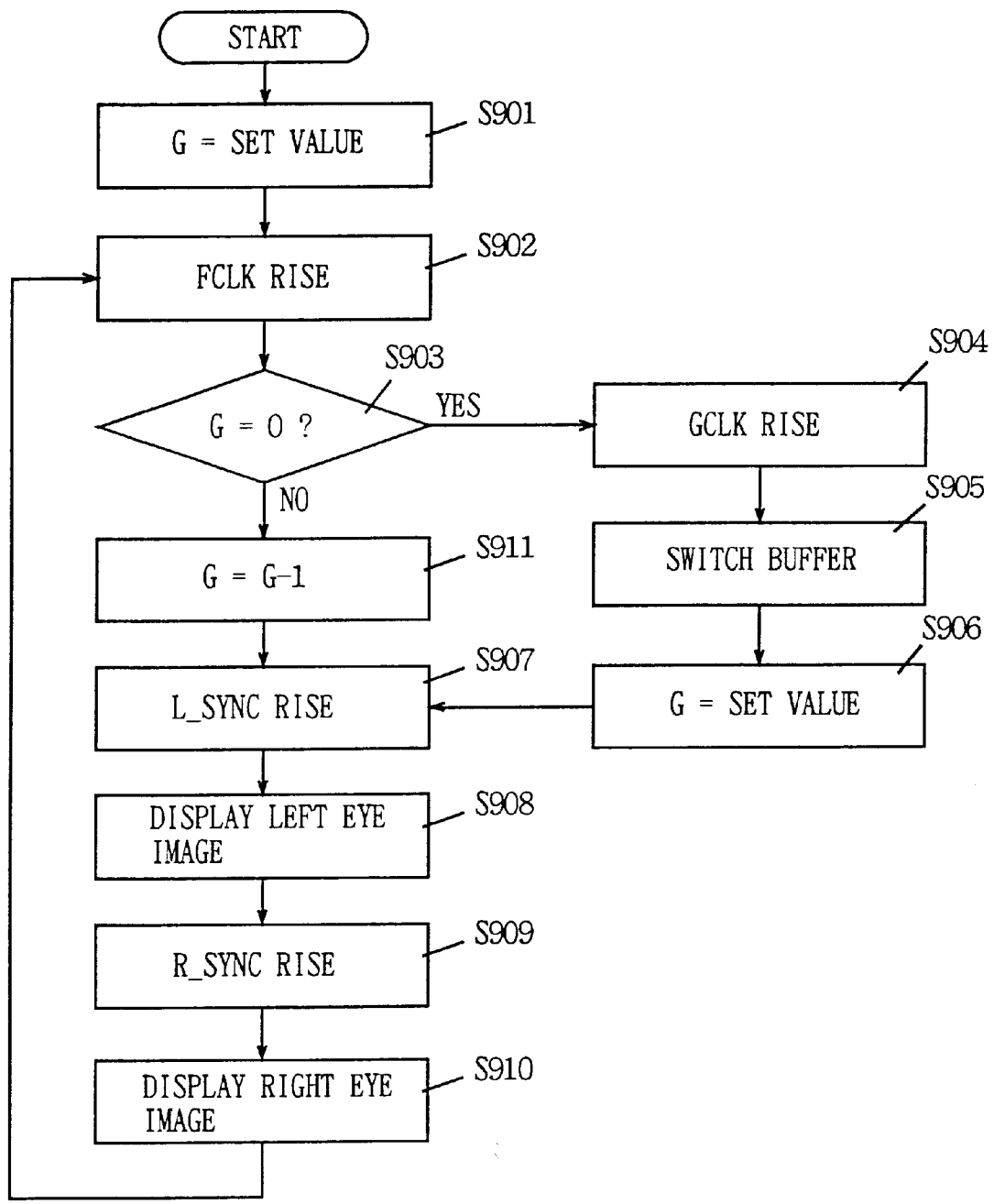
FIG. 56 is a flow chart showing the operation of the entire display system.

Next, referring to the flow chart in FIG. 56 and the timing charts in FIG. 57 and FIG. 58, operation of the entire display system will be described. First, the image processing IC 223 sets an initial value in the counter G (Step S901 in FIG. 56). The set value in the counter G corresponds to the number of display frames included in one game frame. At the initial setting, a value determined corresponding to the initial screen (0, for example) is set in the counter G. Next, a synchronous clock FCLK from the mirror control circuit 211 rises (Step S902). Accordingly, the image processing IC 223 determines whether the count value of the counter G is 0 or not (Step S903). Now, if the count value of the counter G is 0, the image processing IC 223 raises a game clock GCLK (Step S904). Next, the image processing IC 223 switches frame buffers which are objects of display (Step S905). For example, if the frame buffers 2241, 2243 were selected and image data accumulated therein was transferred to the image display unit 21 to be displayed in the previous time, the image processing IC 223 selects the frame buffers 2242, 2244 as objects of display in this time. Conversely, if the frame buffers 2242, 2244 were selected as objects of display in the previous time, the image processing IC 223 selects the frame buffers 2241, 2243 as objects of display this time. First, frame buffers determined by default (the frame buffers 2241, 2243, for example) are selected. Next, the image processing IC 223 sets a certain value in the counter G (Step S906). Usually, 0 is set in the counter G. When picture drawing work with a heavy load is made in the next game frame, a value of 1 or above is set in the counter G according to the degree of the load. The determination as to whether the picture drawing load is heavy or not depends on the game program, and it follows instructions from the CPU 221.

Next, the left display start signal L_SYNC from the mirror control circuit 211 rises (Step S907). Then, the image processing IC 223 performs display processing for the left eye image (Step S908). That is to say, the image processing IC 223 reads the column table reference start address CTA_L for the left transmitted from the mirror control circuit 211 (refer to FIG. 47), and reads timing data in order from a corresponding address in the column table (refer to FIG. 48). At this time, a latch pulse is outputted from the image processing IC 223 at time intervals defined by each read timing data. Accordingly, the width of each column displayed in the LED unit 212L is changed according to the timing data described in the column table, and correction is made so that each column has a uniform width. In this embodiment, however, correction of the column width is made for every four columns to reduce the load on processing by the image processing IC 223. Next, the right display start signal R_SYNC from the mirror control circuit 211 rises (Step S909), and then display processing for the right eye image is performed by the image processing IC 223 (Step S910). In this display processing of the image for the right eye, almost the same processing as the display processing of the image for the left eye in Step S908 is performed.

Figure 57:
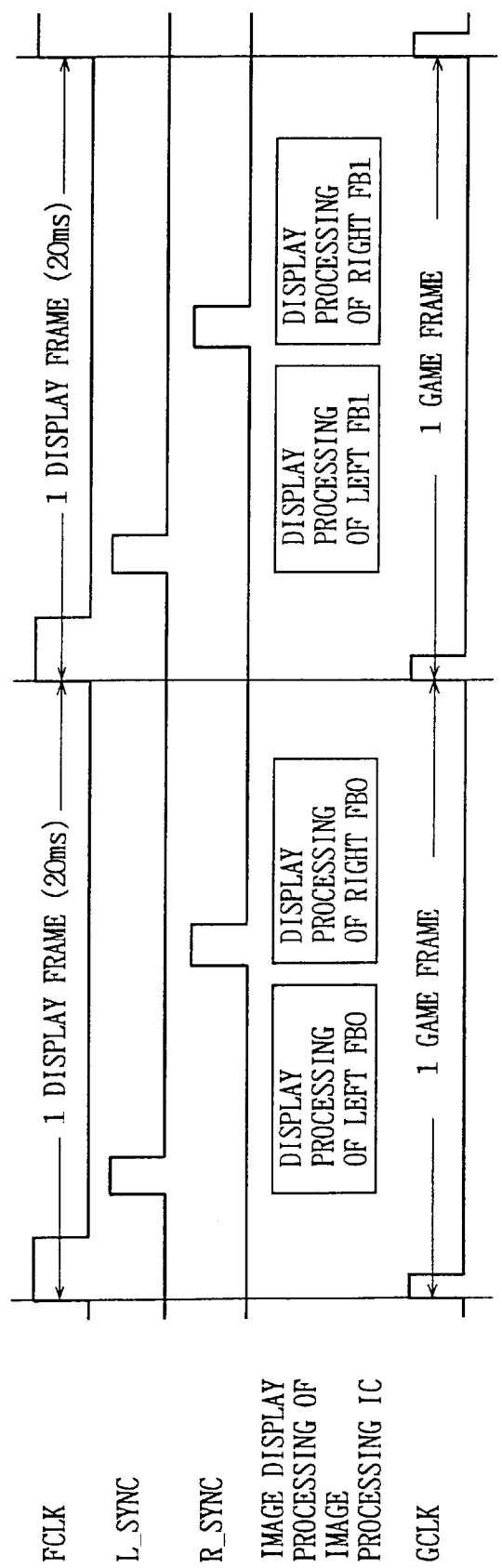
FIG. 57 is a timing chart showing the operation of the entire display system when one display frame is included in one game frame.
Figure 58:
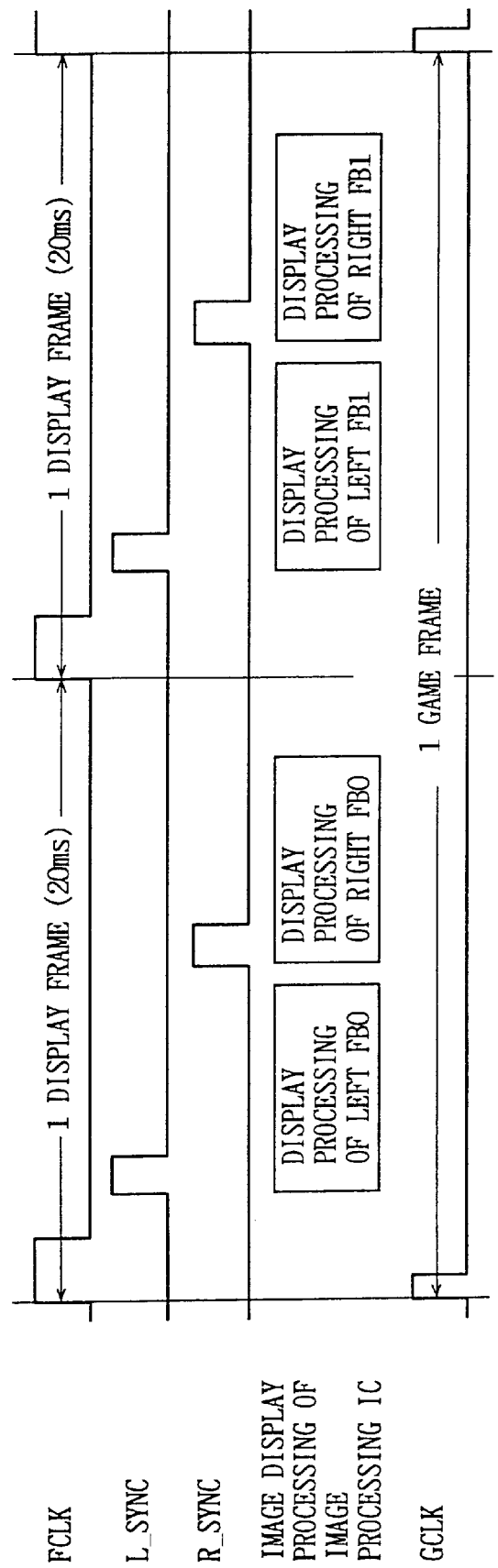
FIG. 58 is a timing chart showing the operation of the entire display system when a plurality of display frames are included in one game frame.

As is clear from the description above, also as shown in FIG. 57, the display processing for the left eye image and the display processing for the right eye image are performed while being shifted in time in one display frame. Therefore, the load on the image processing IC 223 is reduced. Also, the peak power consumption is distributed and the maximum power consumption is reduced. Hence, as permission ability for current and voltage can be set low, designing is easy and the cost can be reduced.

Subsequently, the image processing IC 223 returns to the operation in the Step S902. When the next display frame comes and the synchronous clock FCLK rises (Step S902), the image processing IC 223 determines whether the count value of the counter G is 0 or not (Step S903). If the count value of the counter G is 0, the image processing IC 223 performs the operations in and after the Step S704 again. On the other hand, if the count value of the counter G is not 0, the image processing IC 223 decrements the counter G by 1 (Step S911). Subsequently, the image processing IC 223 repeats the operations in and after the Step S907. At this time, as the frame buffer which is an object to display is not switched, the same picture as the previous time is displayed in the left and right display systems. That is to say, in this embodiment, as shown in FIG. 58, if a plurality of display frames are included in one game frame (defined by the game clock GCLK), the same picture is displayed in respective display frames. This is due to the fact that the picture drawing processing by the image processing IC 223 may not finish in one display frame when drawing an image with heavy load (with a large amount of data), as stated hereinbefore. Subsequently, the image processing IC 223 repeatedly loops through the operations in Steps S902–S911.

Now, in this embodiment, the CPU 221 can rewrite the column table in the image work memory 225 in the course of the game in accordance with instructions from the game program. This enables display of a special picture, such as waving, in the image display unit 21. Data for rewriting the column table may be stored in the program memory in advance, or the CPU 221 may rewrite the data in the column table by calculation on the basis of calculation expressions provided on the game program. In this way, in this embodiment, it is possible to process a picture into a special picture according to instructions from the game software program while using usual picture data as they are, so that the variation of representable pictures can be increased without increasing the amount of data.

Figure 59:
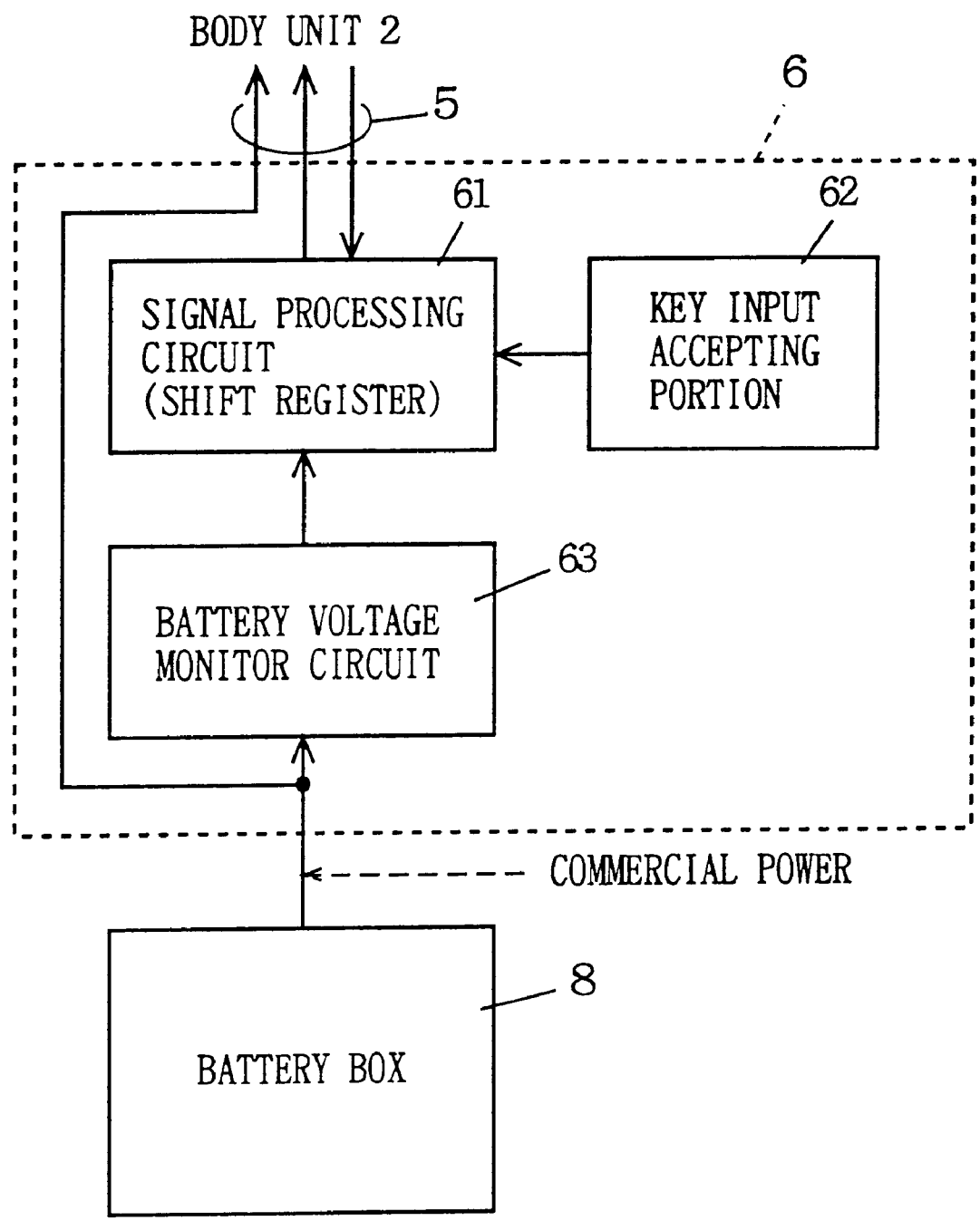
FIG. 59 is a block diagram showing an example of a controller having a battery voltage monitoring function.

FIG. 59 shows an example of the structure when the controller 6 has a voltage monitoring function. In FIG. 59, the controller 6 includes a signal processing circuit 61 formed of a shift register, a key input accepting portion 62 and battery voltage monitor circuit 63. The controller 6 includes a plurality of keys operated by the player, and the key input portion 62 generates key operating signals in response to these key operations. On being provided with an instruction of reading a key input from the CPU 221 in the body unit 2, the key processing circuit 61 takes the key operating signals accepted at the signal input accepting portion 62 to output the-signals in serial to the CPU 221. On the other hand, the battery voltage monitor circuit 63 normally monitors a drops of the outputted voltage of the battery box 8, and activates (for example, sets to a high level) a warning signal of 1 bit when the value of the outputted voltage is below a predetermined value. The warning signal is provided to the signal processing circuit 61. The signal processing circuit 61 outputs the provided warning signal with the key operating signals to the CPU 221. The CPU 221 performs a predetermined operation when the warning signal from the controller 6 is active. For example, the CPU 221 displays a message or graphics suggesting change of the battery and lets the speaker 228 generate a warning suggesting change of the battery. The body unit 2 may be provided with an indicator for warning which is lit up or driven.

Although the above embodiment has been described as an electronic game device, the image display device of the present invention is not restricted to the same, but can widely be applied to devices with display, such as training devices, educational equipments, guiding devices, etc.

Furthermore, although the above embodiment is constructed as a device for displaying a stereoscopic picture with parallax, the present invention can be also applied to a device for display a two-dimensional (plane) picture without parallax.

In the above embodiment, although the luminance values A, B, C which define the correspondences between the tone value on the image data and lighting luminance of the LED are reset for each screen, the luminance values may be reset for each one column or a plurality of columns. Furthermore, when the image display device is constructed such as to sequentially display by one dot, the luminance values can be reset by one dot. Similarly, the repeat value may be reset for each screen, column or dot.

Furthermore, while the above embodiment scans a linear light beam emitted from the LED arrays in the horizontal direction to display a two-dimensional image, the present invention can also be applied to image display devices where light emitting elements such as LEDs are arranged in a dot matrix (for example, a liquid crystal display).

The above embodiment which includes display units disposed adjacent to the both eyes allowed only one player to play. Therefore, the left and right image data read from the image memory 224 may be provided to a television or a projector for display so that a plurality of persons can play. In the present embodiment, however, since the image data from the image memory 224 is read in the vertical direction, it is impossible to display the image data as it is on the television or the projector. Therefore, the image data read from the image memory 224 is temporarily stored in a frame buffer not shown, and the reading direction is changed from the vertical direction to the horizontal direction to be provided to the television or the projector. Furthermore, a digital value of 2 bits of each dot have to be converted to intensity of a television signal. A circuit for converting the image data read from the image memory 224 to signals adapted to be displayed on the television or the projector may be provided in the body unit 2, may be connected between the electronic game device 1 and the television or the projector, or may be provided in the television or the projector.

As described above, when the left and right images are displayed on the television or the projector, the left and right images may be displayed with shifted timing, different colors, or different polarization angles for allowing stereoscopic view. When the images are displayed with shifted timing, a player will watch the left and right images wearing glasses with a shutter mechanism (e.g. a liquid crystal shutter) which performs alternate ON/OFF operation of left and right lenses in synchronization with switching timing of the left and right images on the television. When the left and right images are displayed with different colors, the player will watch the images wearing glasses with color filters. In this case, a color filter which allows only the left image to pass through a left lens and a color filter which allows only the right image to pass through a right lens are attached to the glasses. When the images are displayed with different polarization angles, the player will watch the images wearing glasses with polarization filters. In this case, a polarization filter which allows only the left image to pass through a left lens and a polarization filter which allows only the right image to pass through a right lens are attached to the glasses.

While the invention has been described in detail, the foregoing description is in all aspects illustrative and not restrictive. It is understood that numerous other modifications and variations can be devised without departing from the scope of the invention.

What is claimed is:

1. An image display device for displaying an image on the basis of digital image data, comprising:

a plurality of regularly arranged light emitting elements, each of said light emitting elements being one-dimensionally arranged along an axis;

a lighting time controller operable to control lighting time of each of said light emitting elements according to tone values in said digital image data; and a lighting time changing circuit which cooperates with said lighting time controller and changes the lighting time of each of said light emitting elements in accordance with the tone values on said digital image data, said image display device further comprising a scanner which scans a linear light beam emitted from each of said light emitting elements in a direction perpendicular to said axis.

2. The image display device according to claim 1, further comprising lighting number of times controller operable to control a number of times that each of said light emitting elements is lighted to display one dot, wherein a tone is determined for one dot on the basis of a combination of the lighting time of each of said light emitting elements controlled by said lighting time controller and said lighting time changing circuit and the lighting number of times of each of said light emitting elements controlled by said lighting number of times controller.

3. The image display device according to claim 1, further comprising:

a storage device for program data; and a processor which operates on the program data stored in said storage device to generate said digital image data, wherein information for changing the lighting time of each of said light emitting elements is described in said program data; and said lighting time changing circuit changes the lighting time of each of said light emitting elements in accordance with each of the tone values on said digital image data on the basis of an instruction from said processor.

4. The image display device according to claim 1, further comprising a clock pulse generating source operable to generate a plurality of clock pulses, wherein said lighting time controller selectively combines each of said clock pulses according to the tone values on said digital image data to generate a drive pulse for driving each of said light emitting elements; and said lighting time changing circuit changes a pulse width of each of said clock pulses to change a pulse width of said drive pulse.

5. The image display device according to claim 4, wherein said lighting time controller comprises a gate allowing each of said clock pulses to selectively pass according to the tone values on said digital image data.

6. The image display device according to claim 1, wherein said tone values are represented by N bits;

said lighting time controller selects an arbitrary tone from $2^N$ kinds of the tones corresponding to said tone values;

said lighting time changing circuit changes each of the $2^N$ kinds of the tones corresponding to said tone values; and each of said light emitting elements displays more than the $2^N$ kinds of tones.

7. A method for displaying an image with a plurality of regularly arranged light emitting elements on the basis of digital image data; comprising the steps of:

controlling lighting time of each of said light emitting elements in accordance with tone values in said digital image data; and changing the lighting time of each of said light emitting elements in accordance with each of the tone values on said digital image data, wherein said light emitting elements are provided in a one-dimensional array having a longitudinal axis, and said method comprises the further step of scanning a linear light beam emitted from each of said light emitting elements in a direction perpendicular to said longitudinal axis.

8. The method of claim 7 comprising the additional step of controlling a lighting number of times that each of said light emitting elements displays a dot, such that a tone is determined for one dot on the basis of a combination of the lighting time of each of said light emitting elements controlled by said lighting time control step and said lighting time changing step and the lighting number of times of each of said light emitting elements controlled by said lighting number of times control step.

9. The method of claim 7 comprising the further steps of processing stored program data to generate said digital image data, wherein:

information for changing the lighting time of each of said light emitting elements is described in said program data; and said changing step changes the lighting time of each of said light emitting elements corresponding to each of the tone values on said digital image data on the basis of an instruction from said processing step.

10. The method of claim 7, comprising the further step of generating a plurality of clock pulses; wherein said controlling step selectively combines each of said clock pulses according to the tone values on said digital image data to generate a drive pulse for driving each of said light emitting elements; and wherein said changing step changes a pulse width of each of said clock pulses to change a pulse width of said drive pulse.

11. The method of claim 7, wherein said tone values are represented by N bits of digital data; and wherein said controlling step selects an arbitrary tone from $2^N$ kinds of the tones corresponding to said tone values;

said changing step changes each of the $2^N$ kinds of the tones corresponding to said tone values; and each of said light emitting elements displays more than the $2^N$ kinds of tones.

* * * * *